Figure 1:
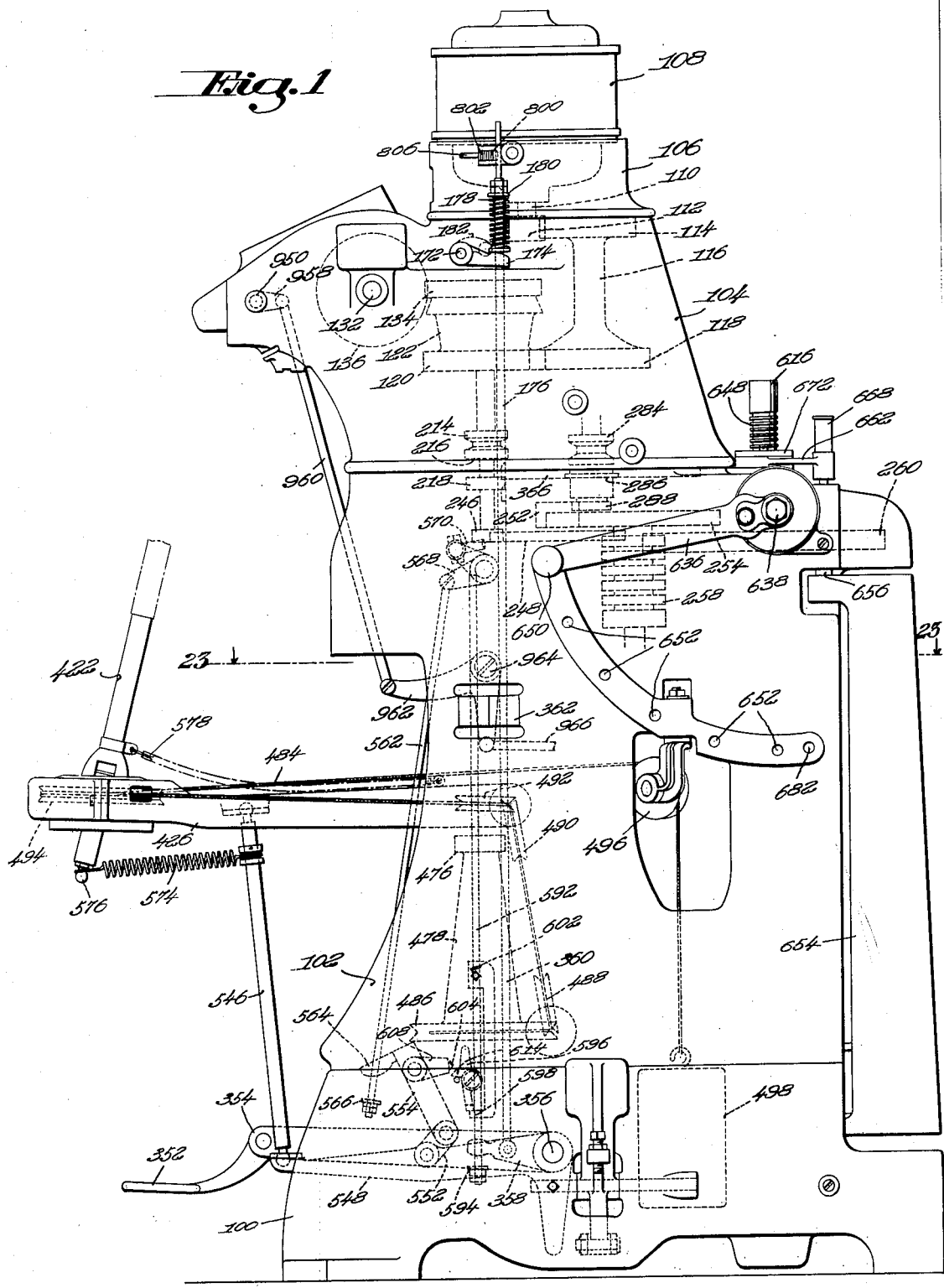

Oct. 3, 1944.   A. R. MORRILL   2,359,662
SHOE MACHINE
Filed Nov. 4, 1940   37 Sheets-Sheet 1

Witness
Frederick L. Greenleaf.

Inventor
Alfred R. Morrill
& Fish Hildreth
Corey & Finney attys.

Oct. 3, 1944.  A. R. MORRILL  2,359,662
SHOE MACHINE
Filed Nov. 4, 1940  37 Sheets-Sheet 5
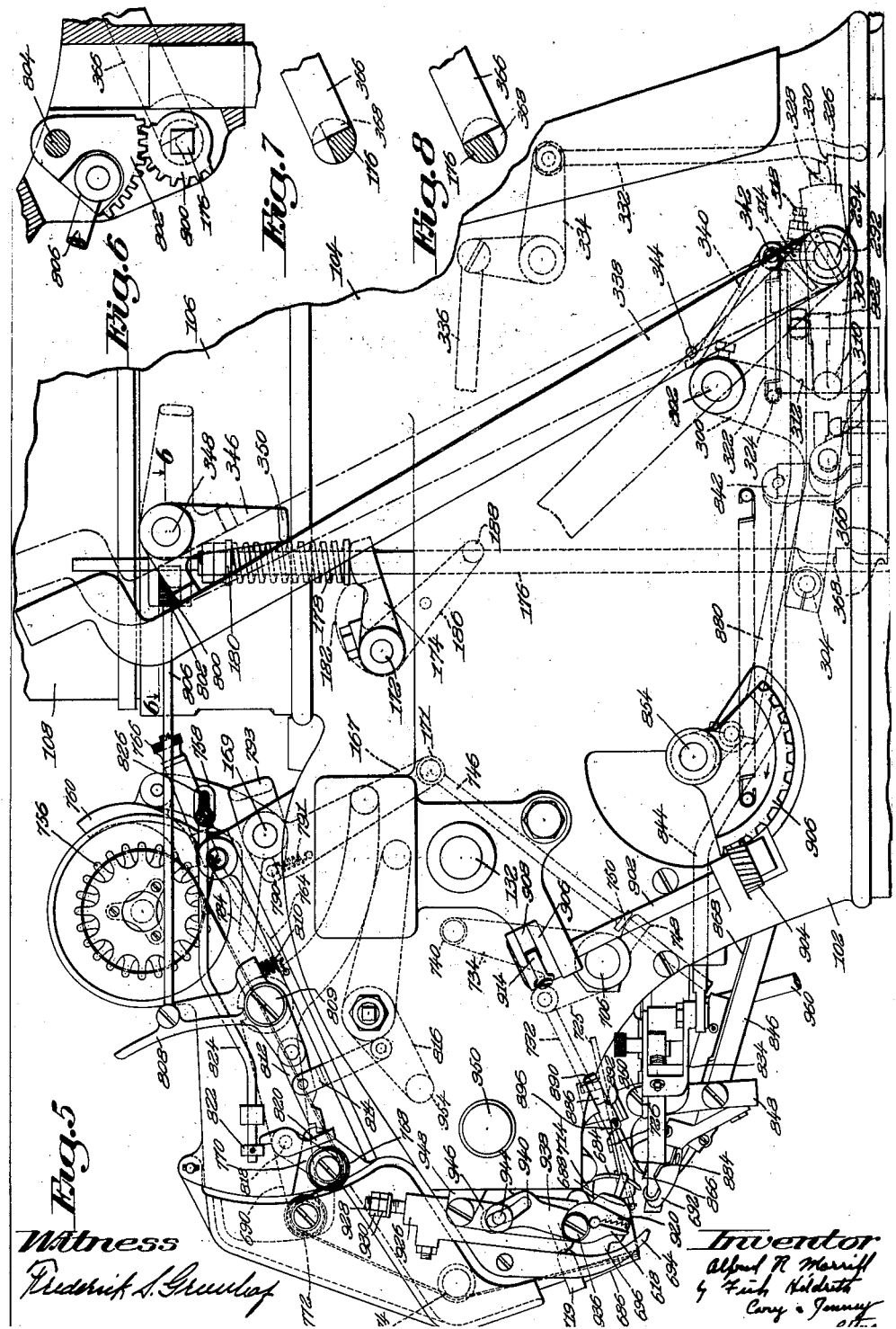

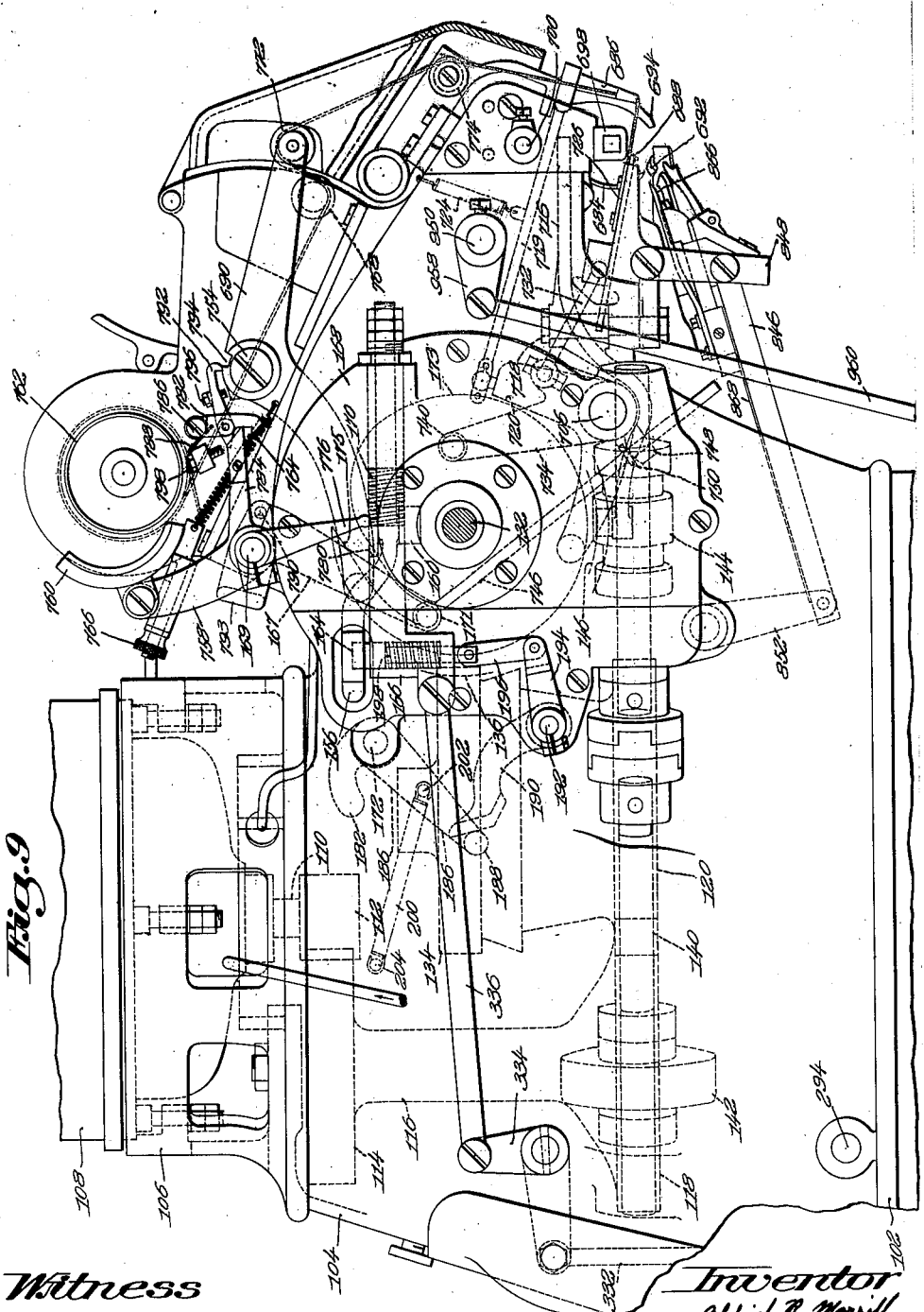

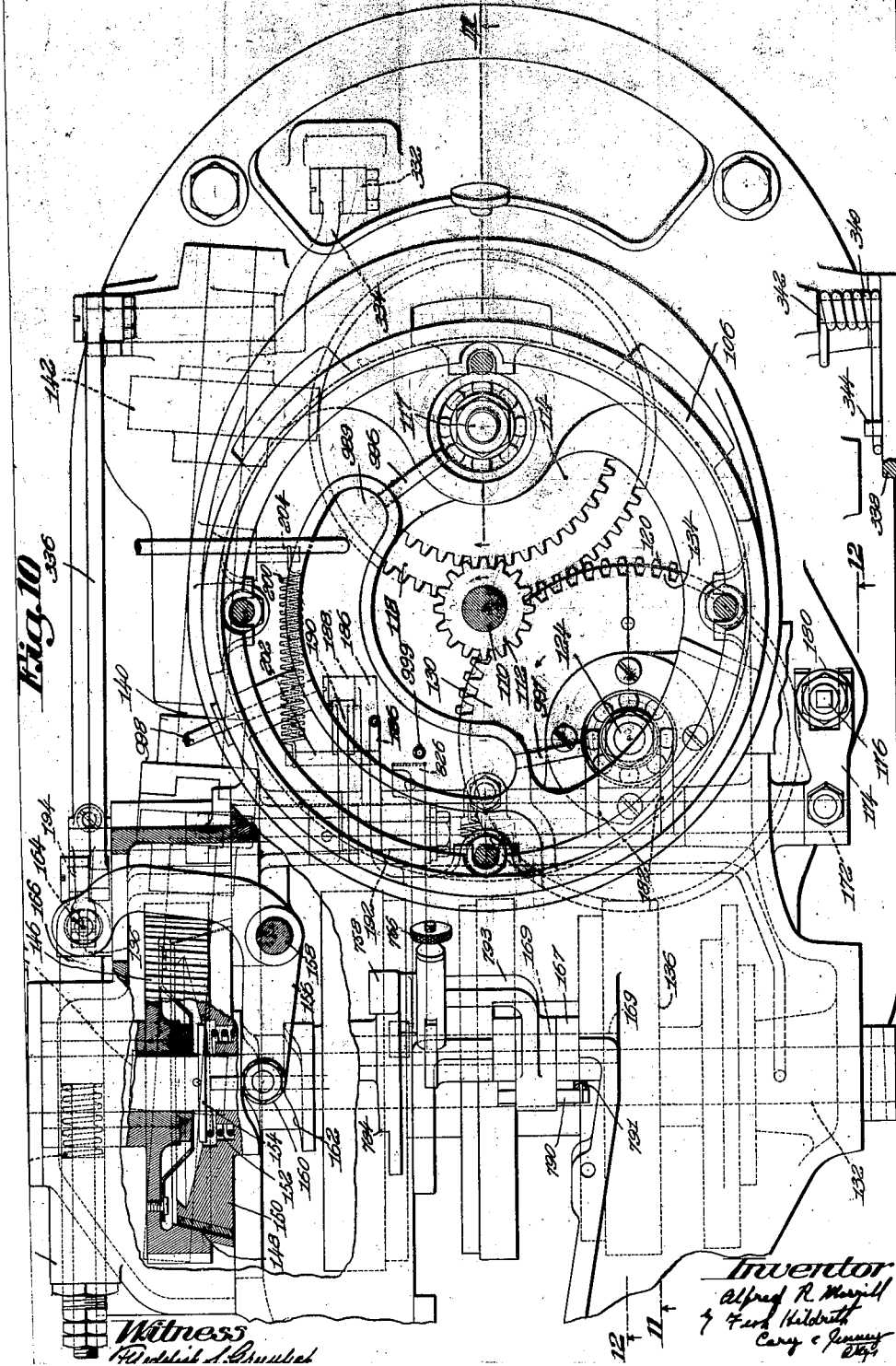

Oct. 3, 1944.  A. R. MORRILL  2,359,662
SHOE MACHINE
Filed Nov. 4, 1940  37 Sheets-Sheet 8
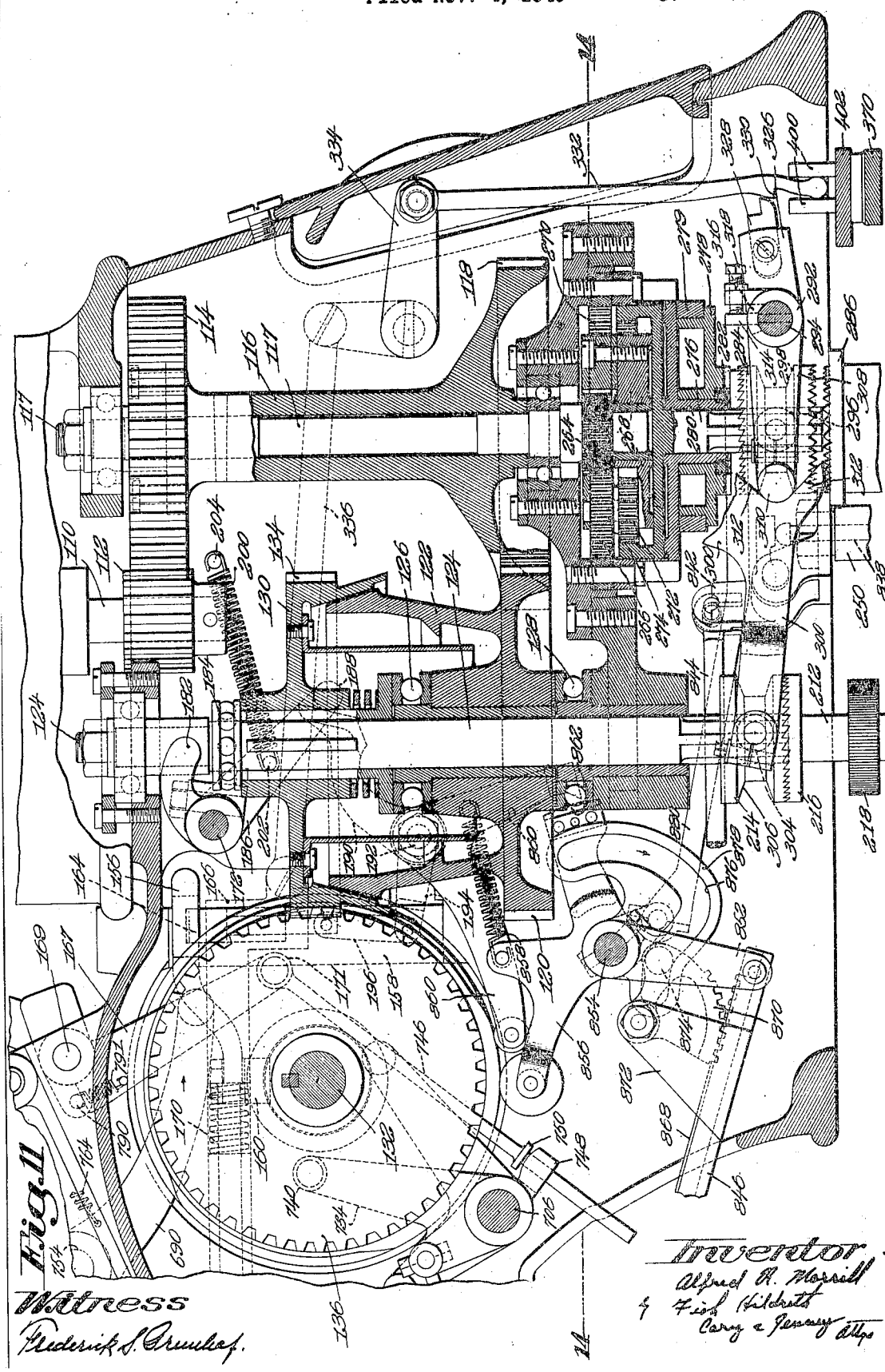

Oct. 3, 1944.  A. R. MORRILL  2,359,662
SHOE MACHINE
Filed Nov. 4, 1940  37 Sheets-Sheet 9
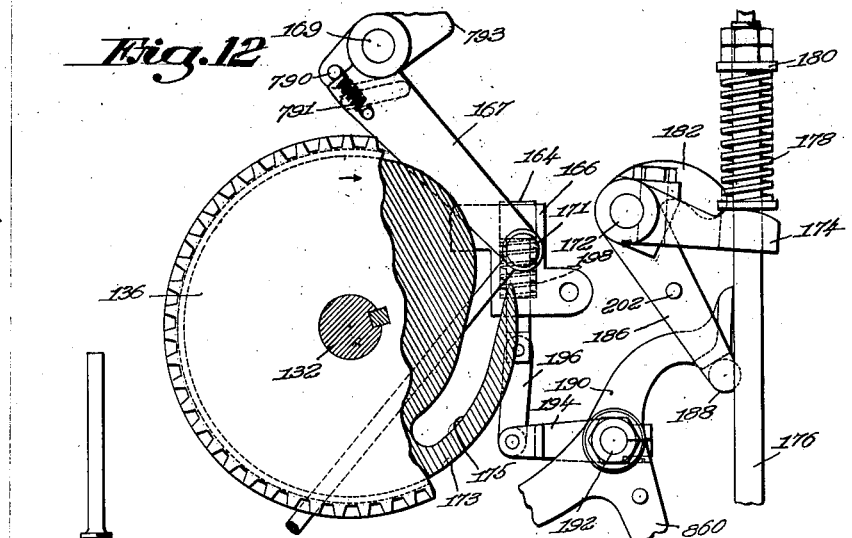
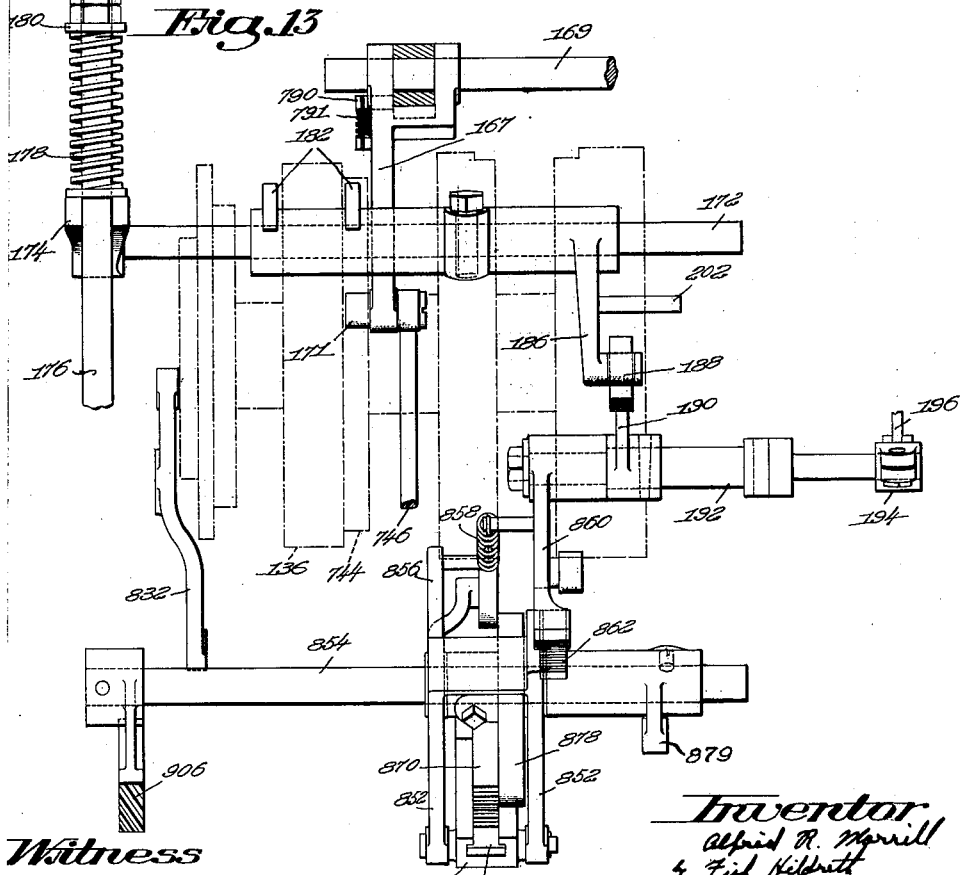

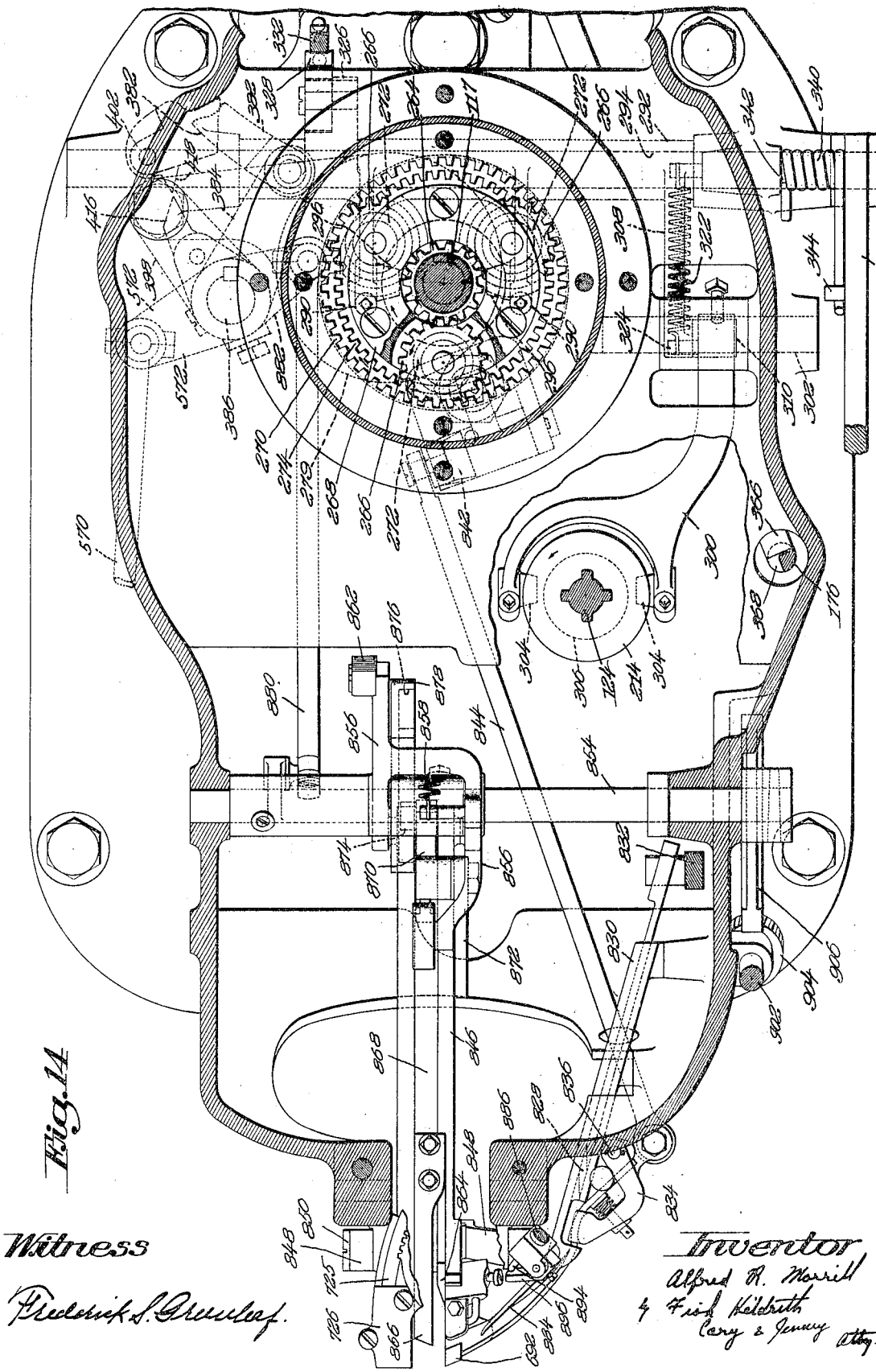

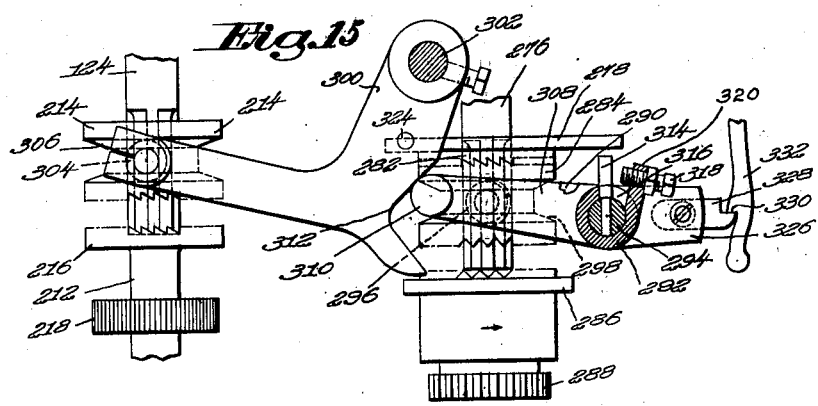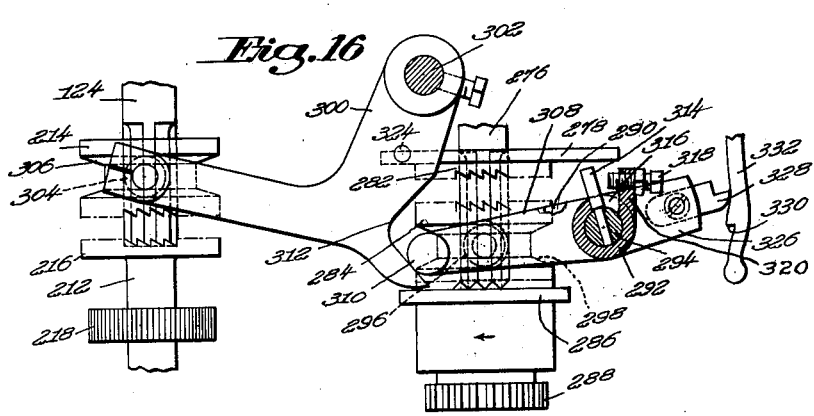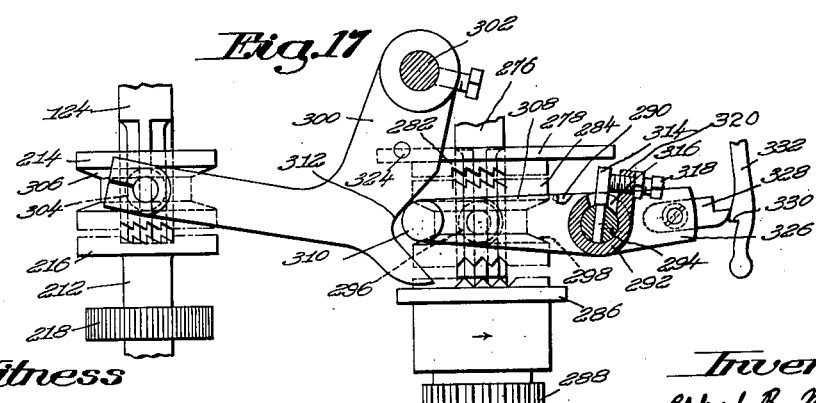

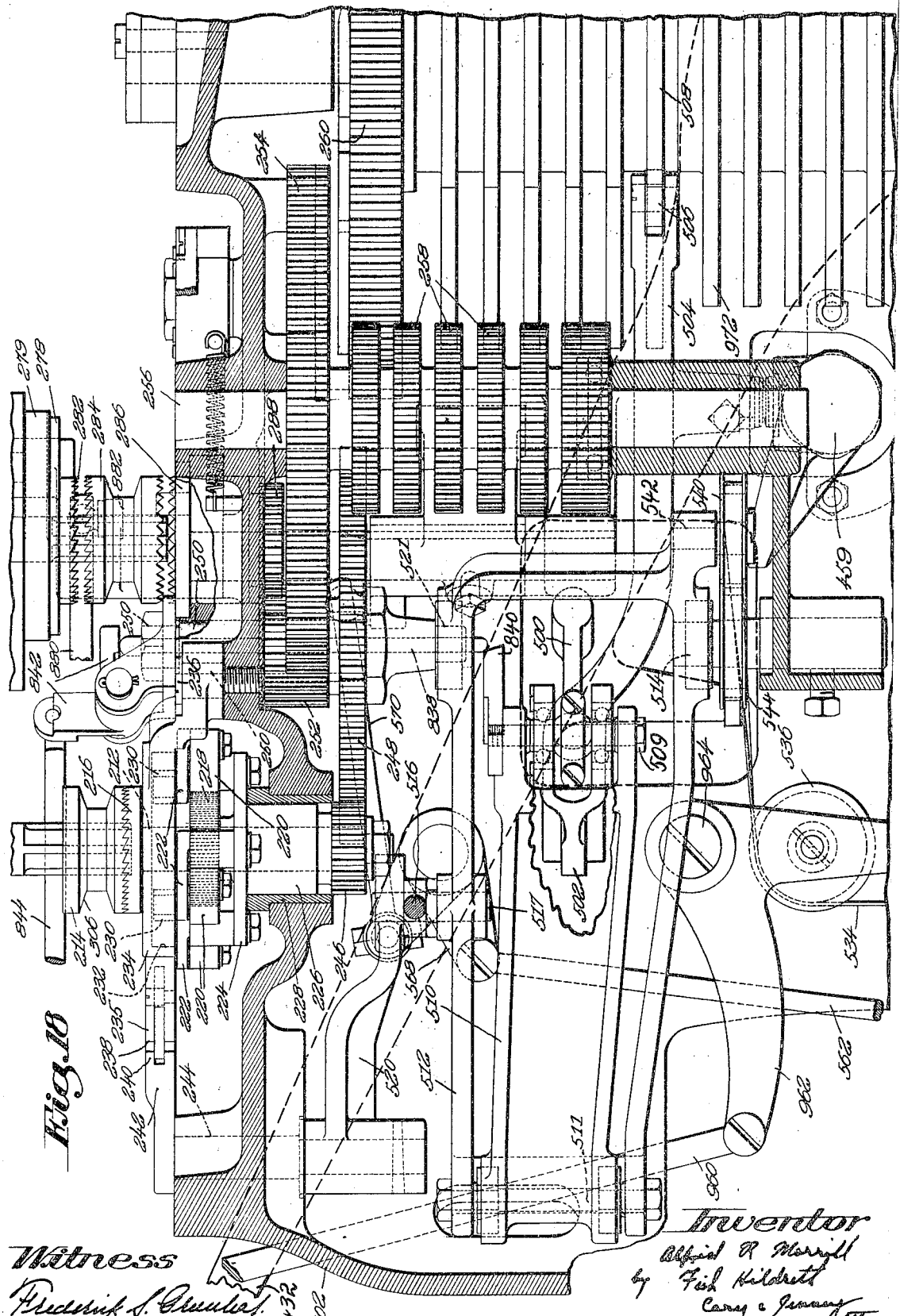

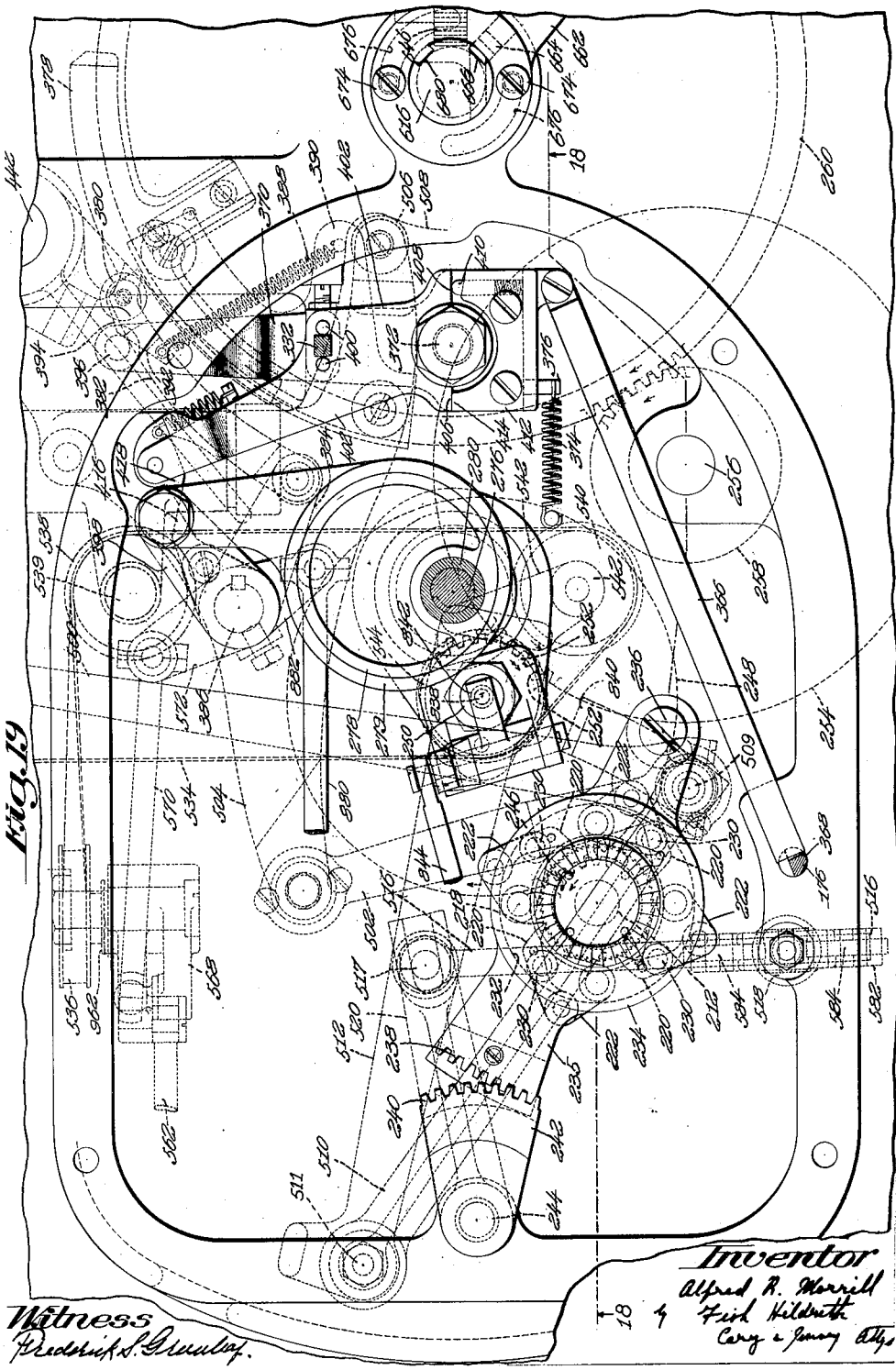

Oct. 3, 1944.  A. R. MORRILL  2,359,662
SHOE MACHINE
Filed Nov. 4, 1940  37 Sheets-Sheet 14
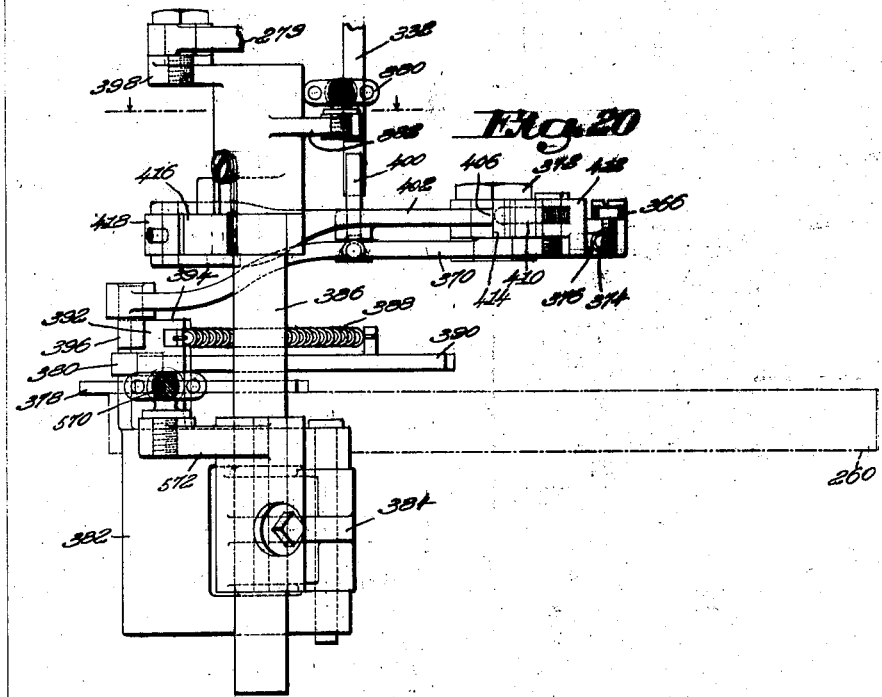
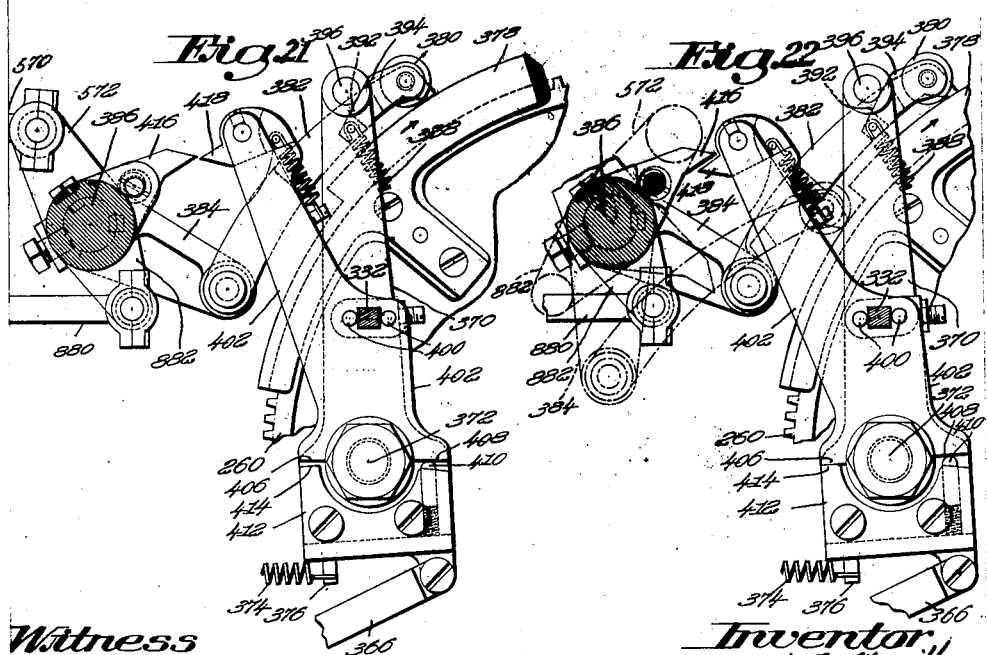

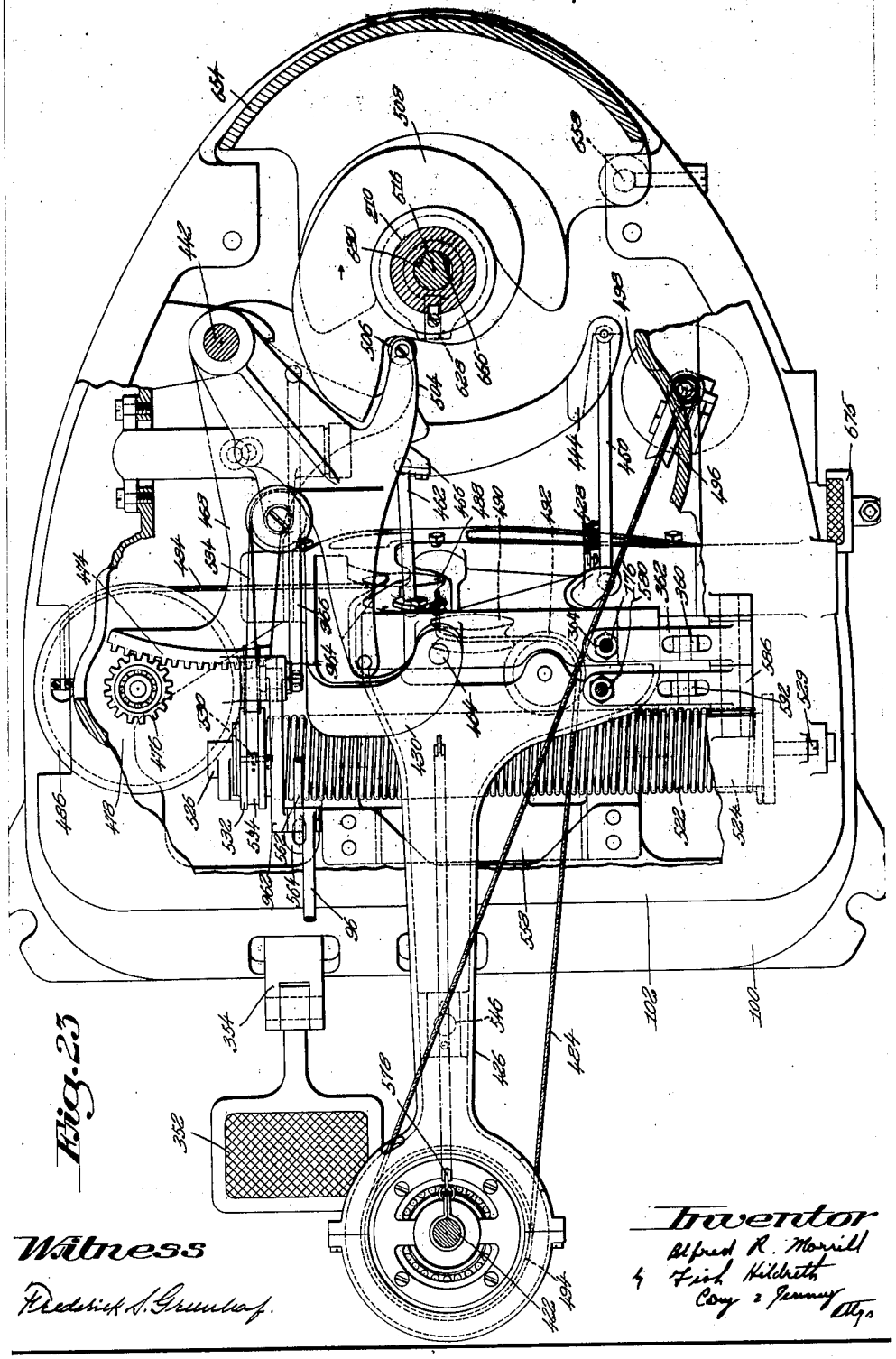

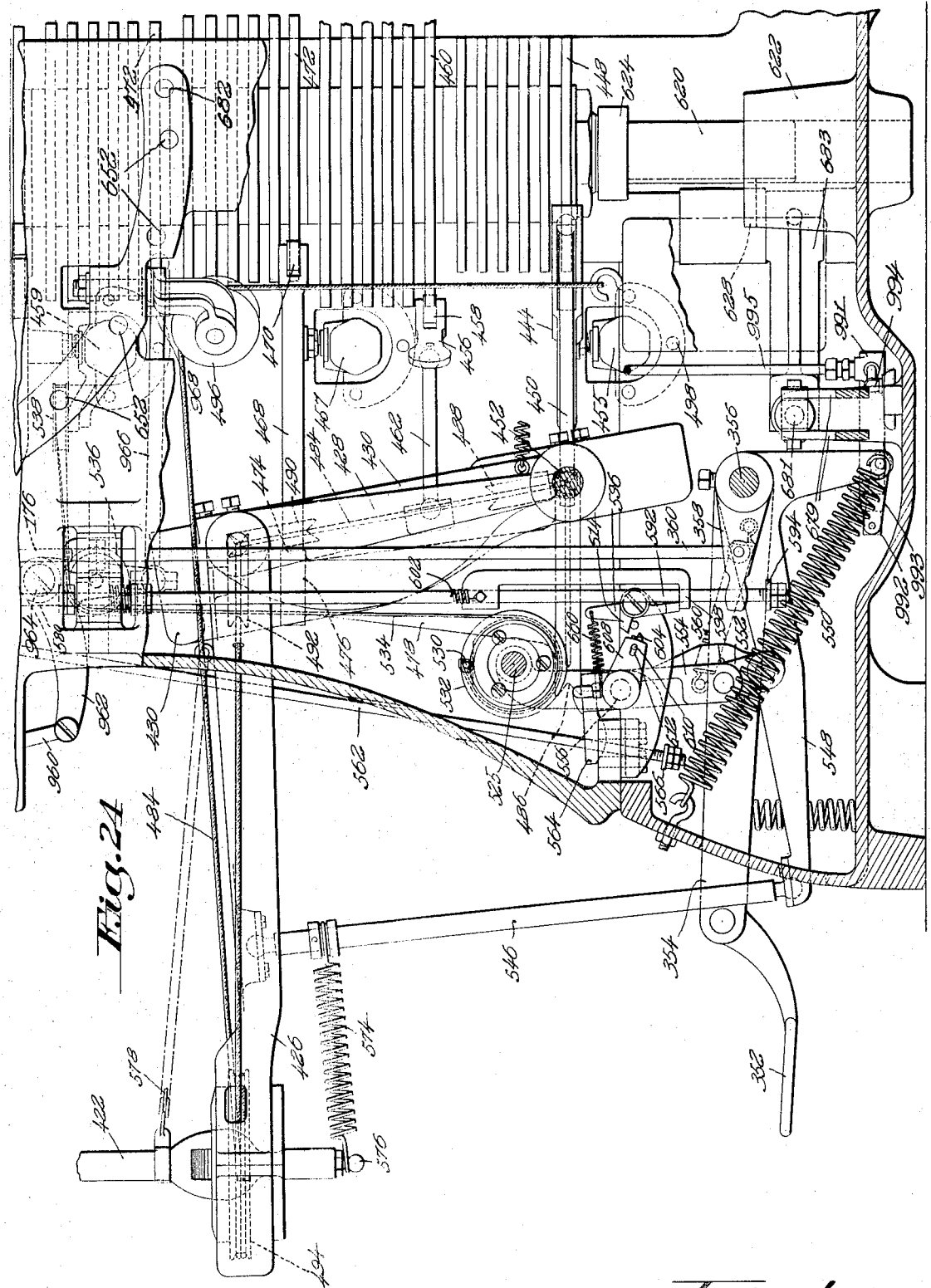

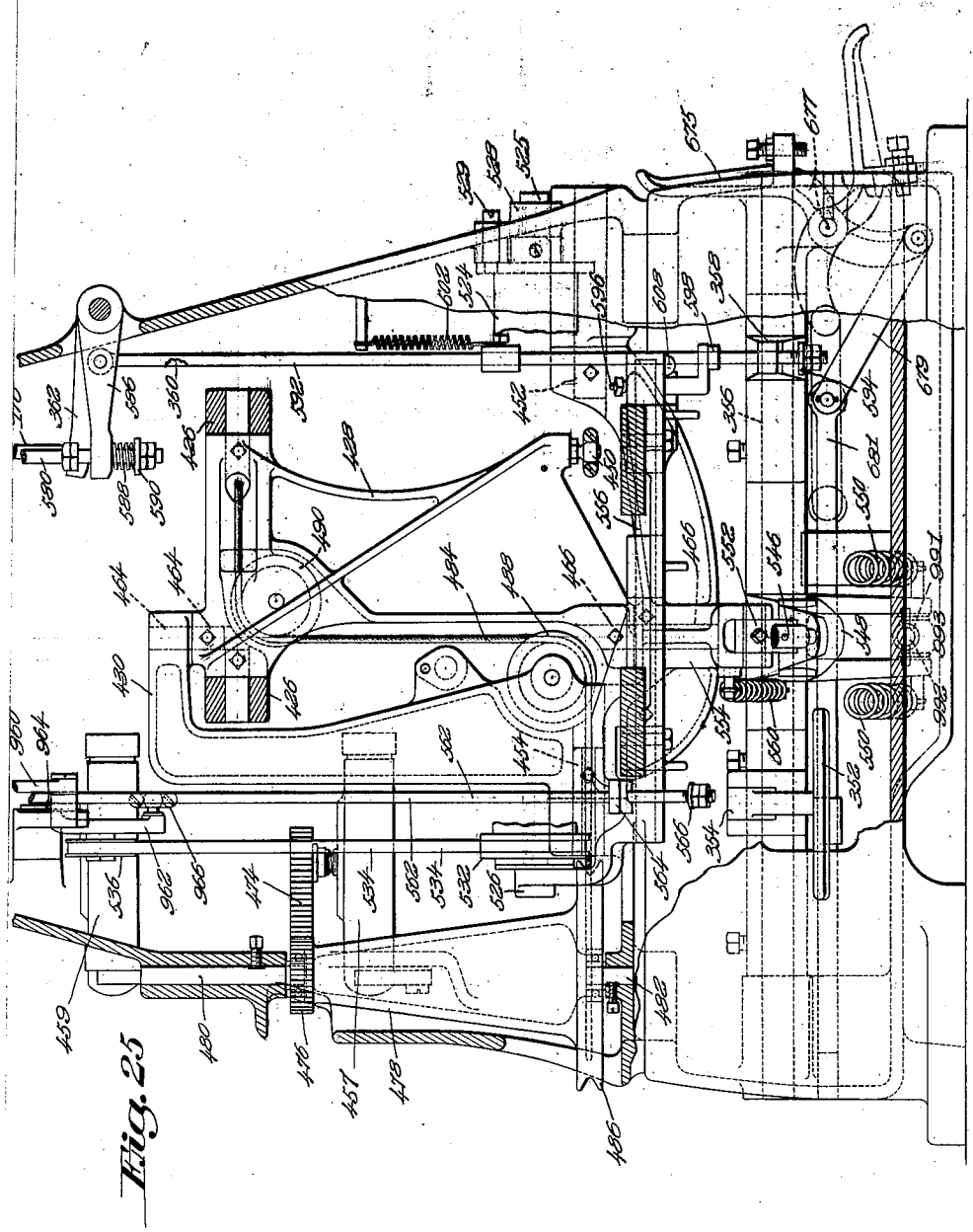

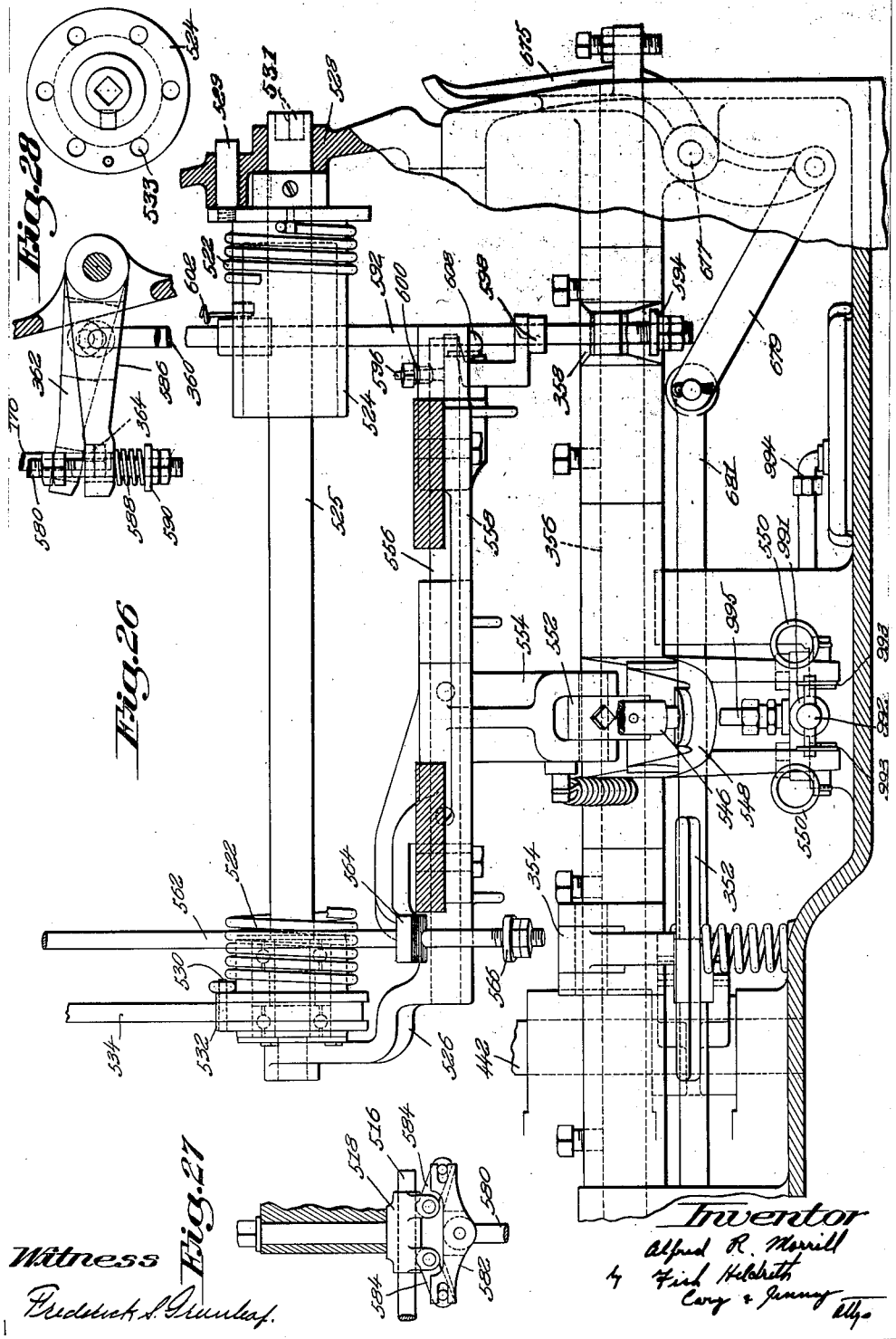

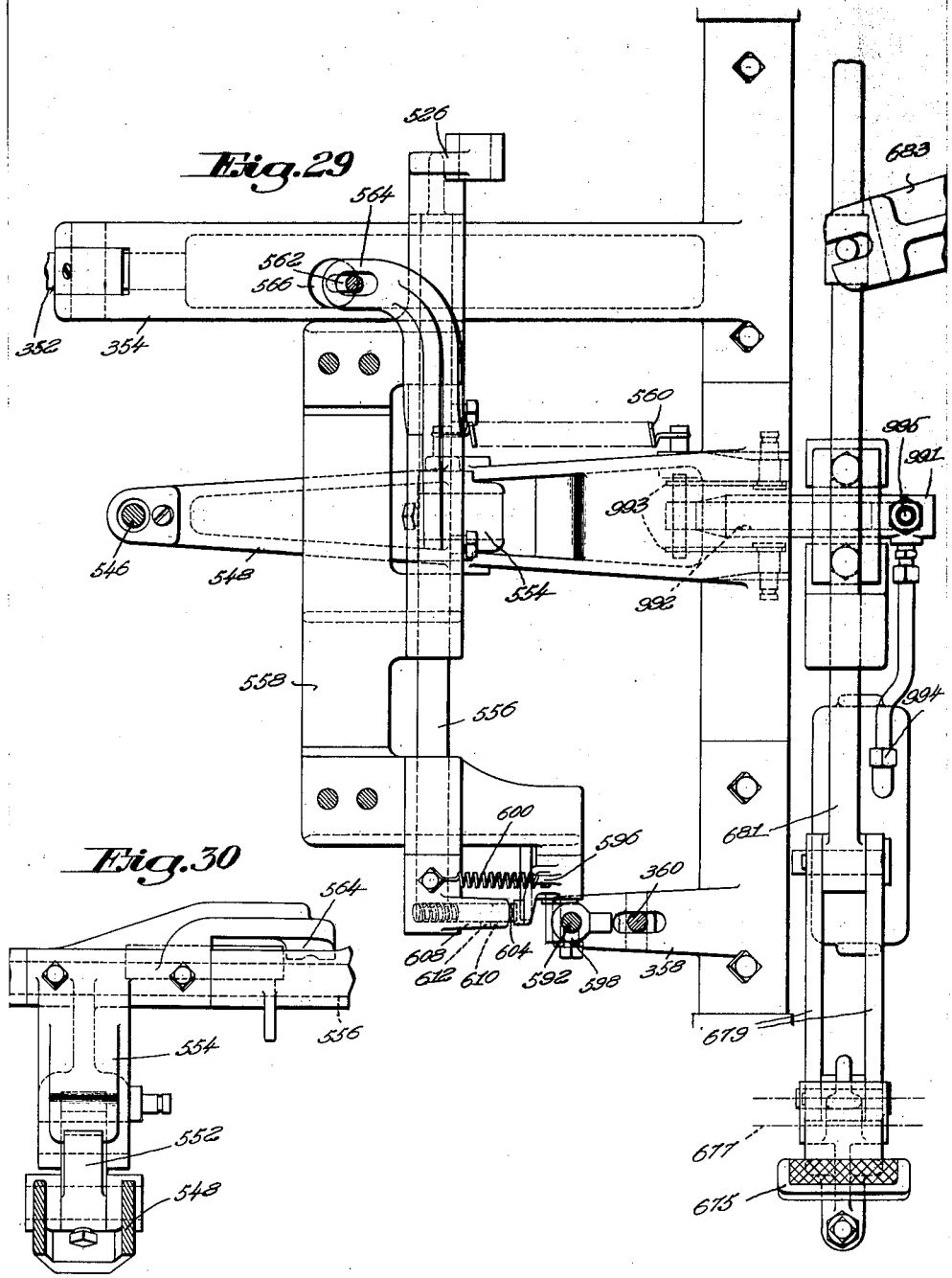

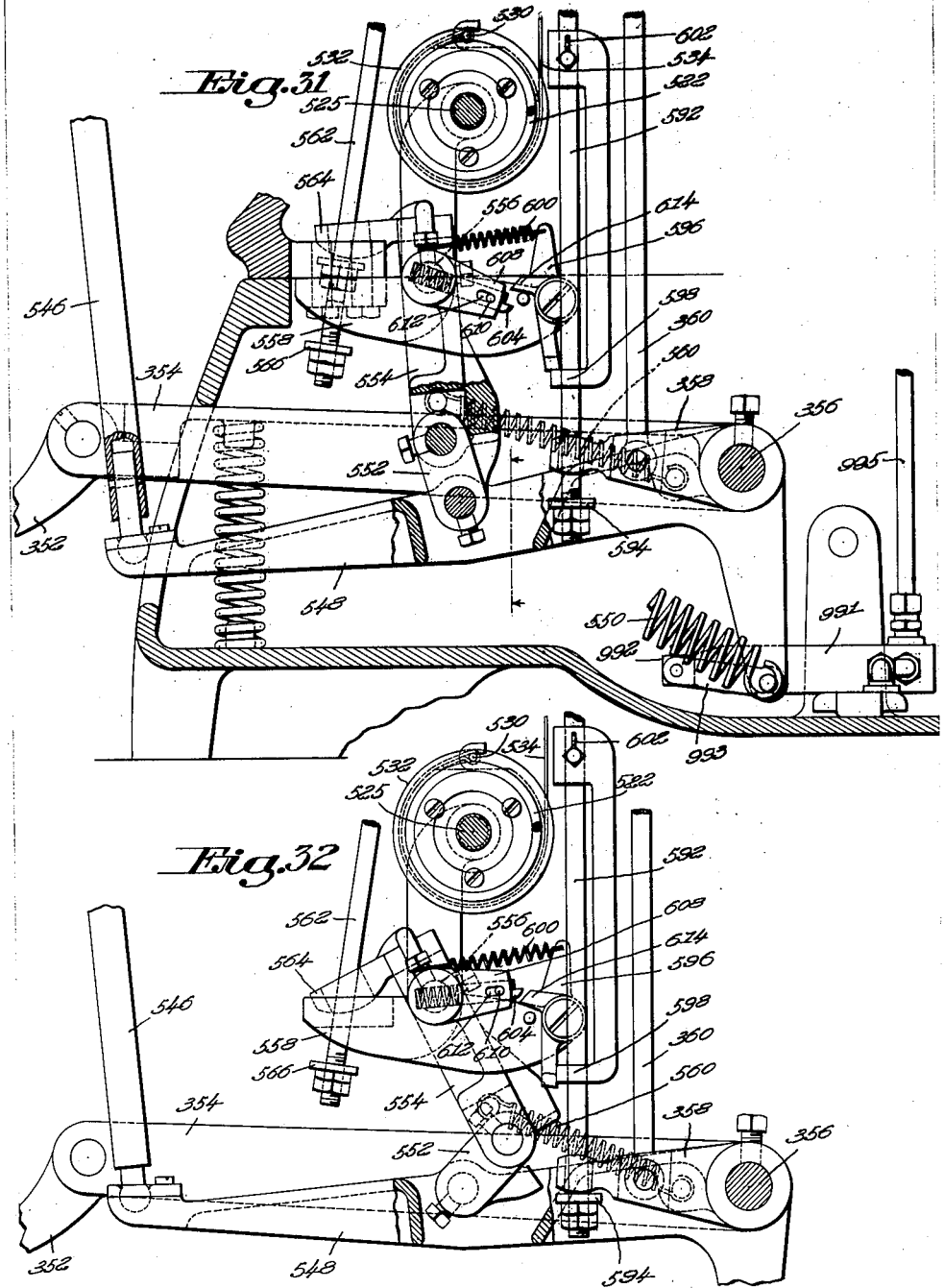

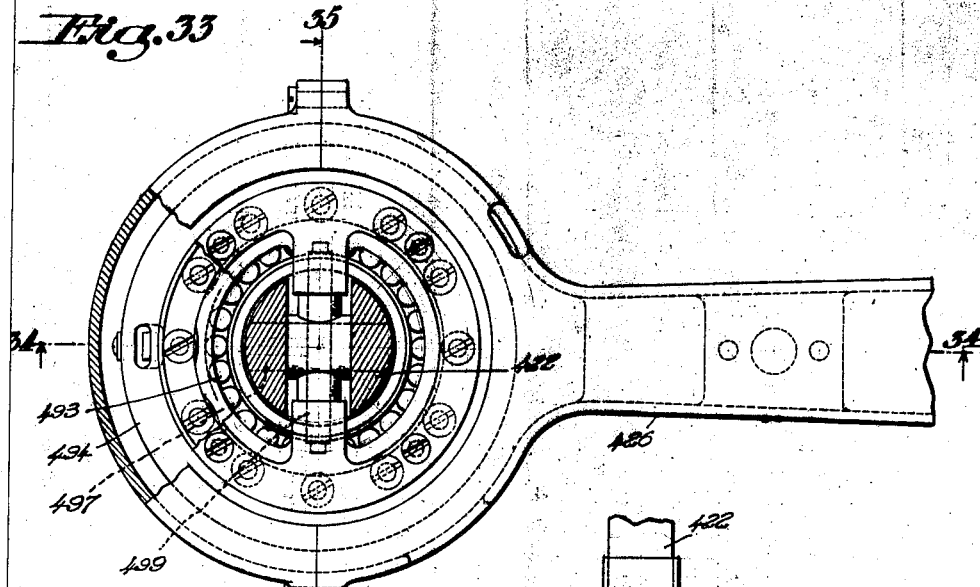
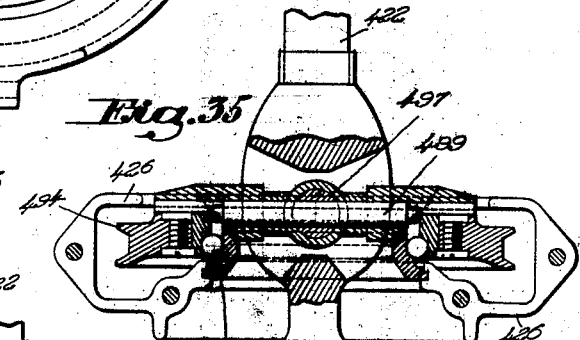
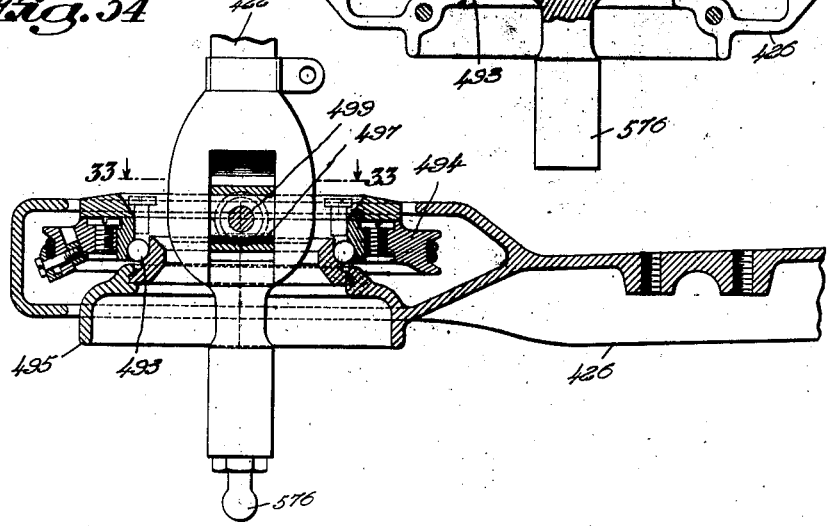

Oct. 3, 1944.   A. R. MORRILL   2,359,662
SHOE MACHINE
Filed Nov. 4, 1940   37 Sheets-Sheet 22
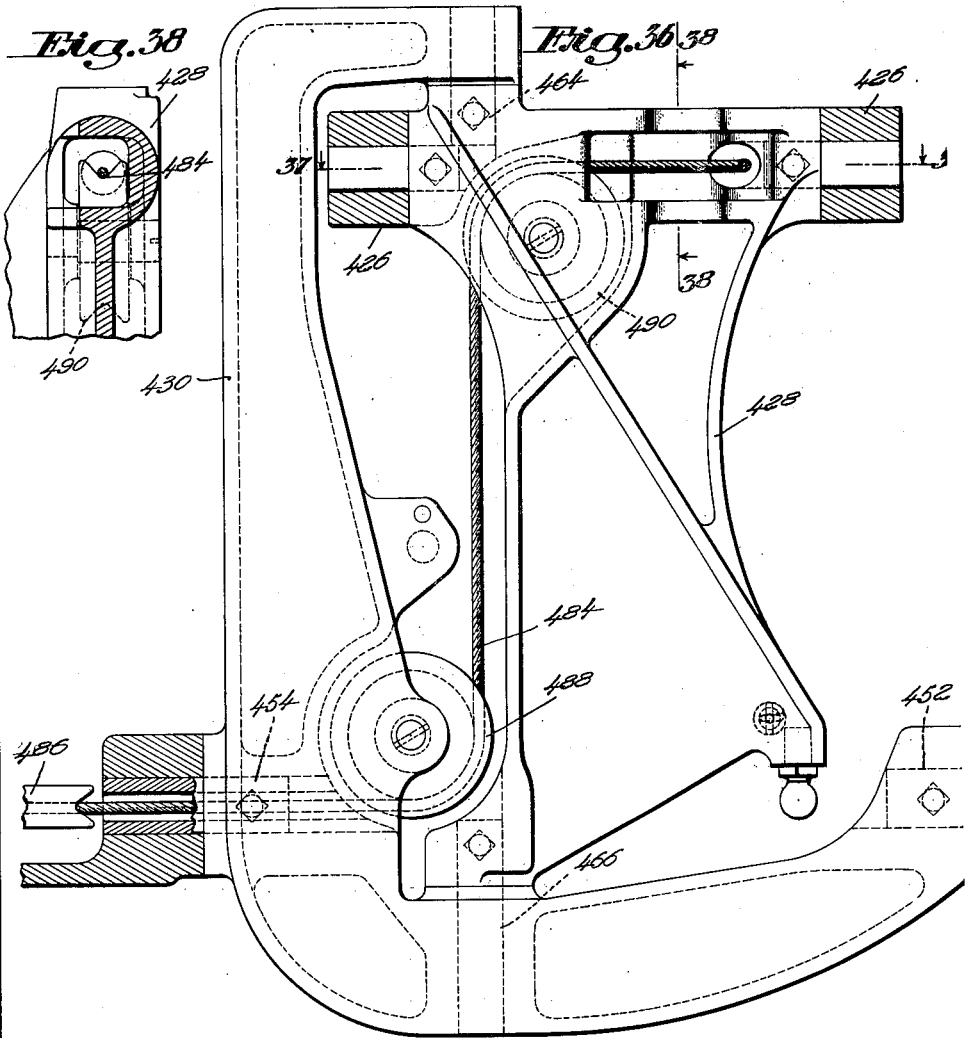
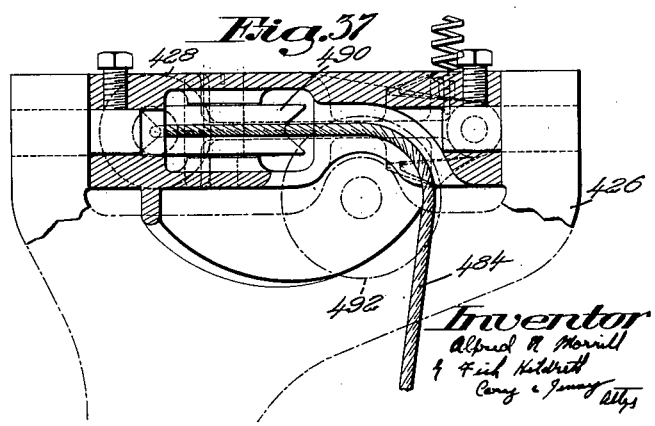

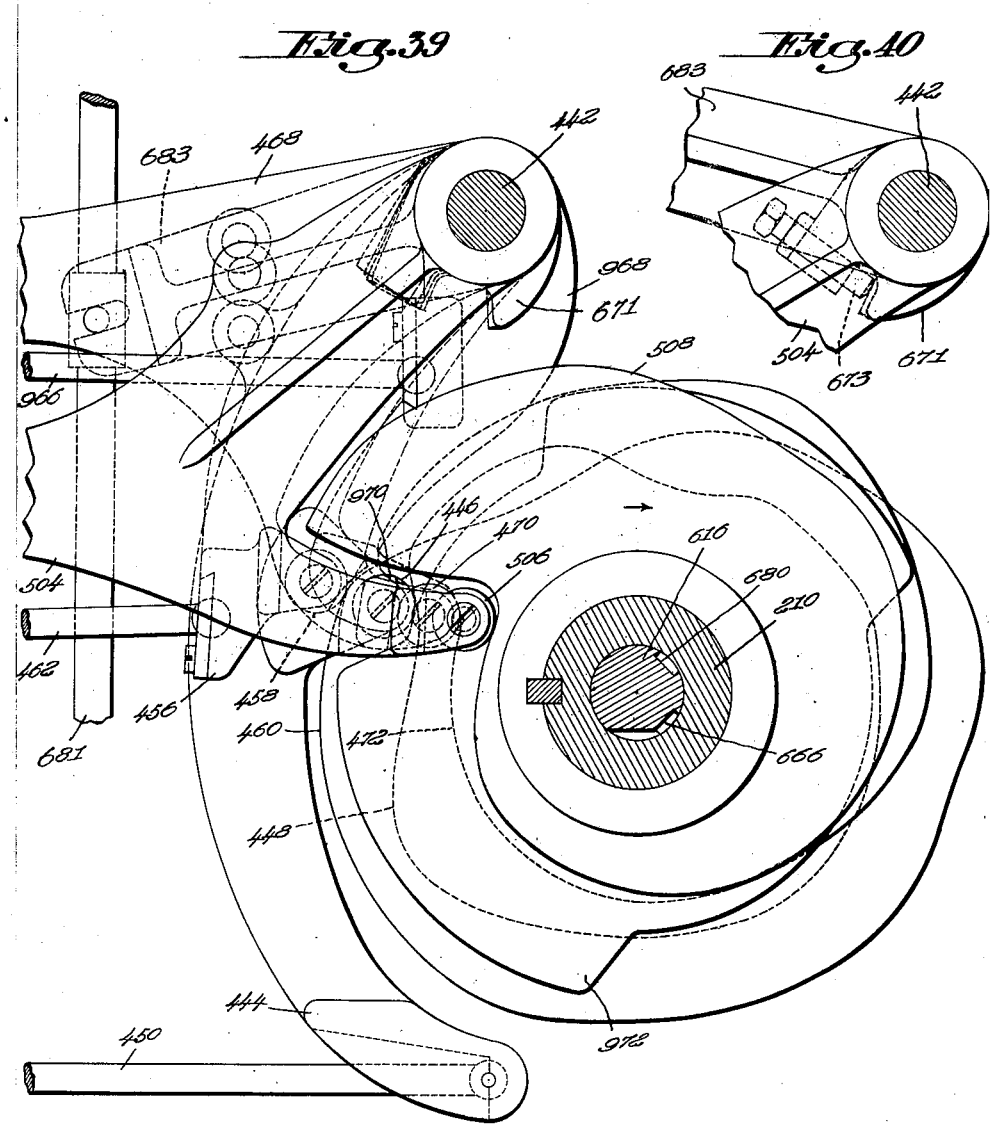

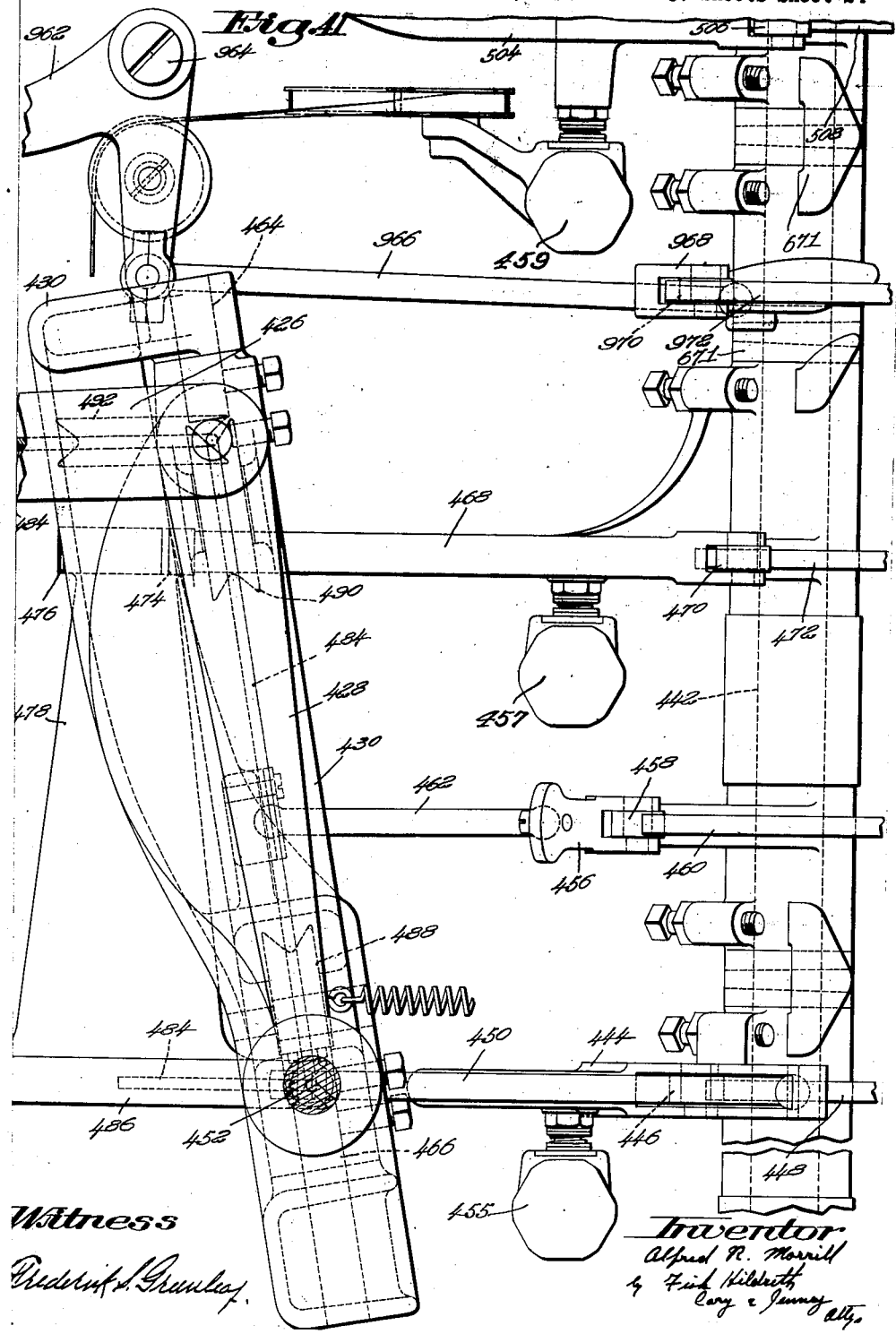

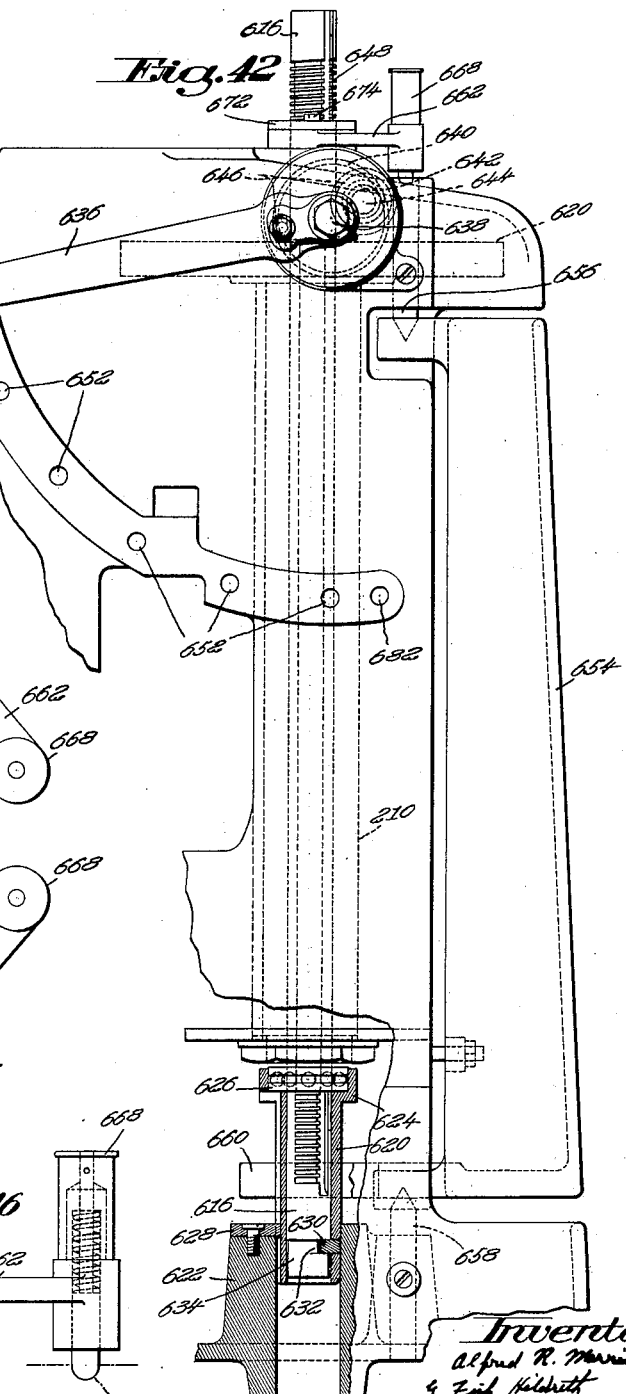

Oct. 3, 1944.  A. R. MORRILL  2,359,662
SHOE MACHINE
Filed Nov. 4, 1940 37 Sheets-Sheet 26
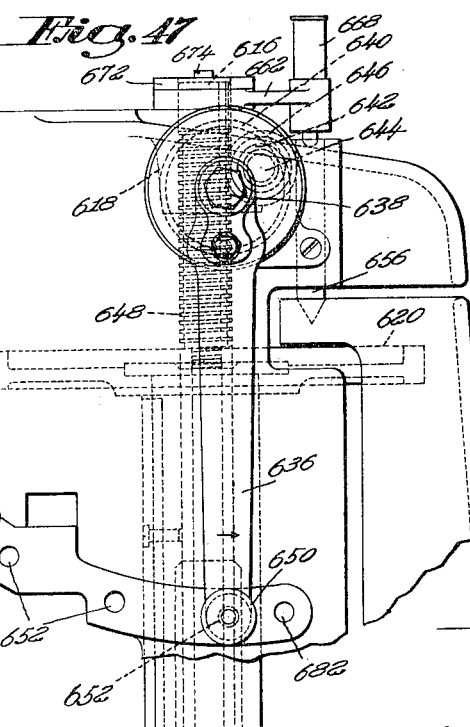
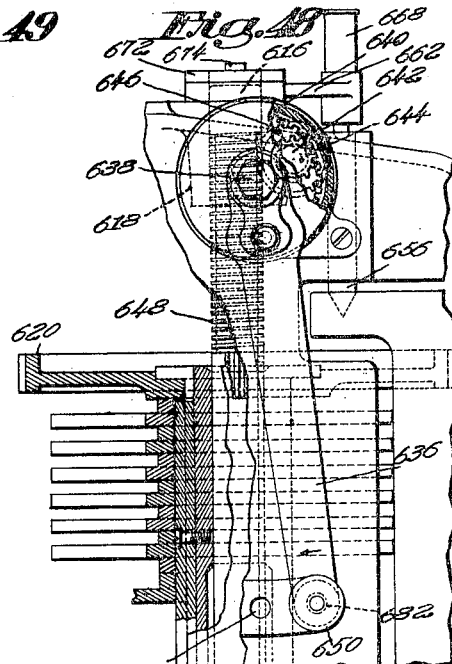
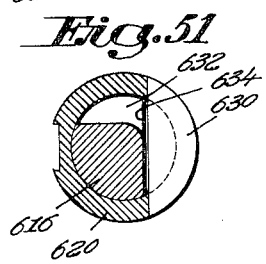
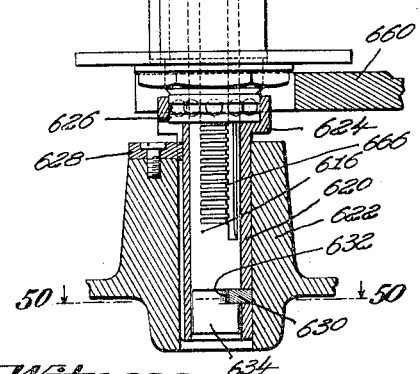
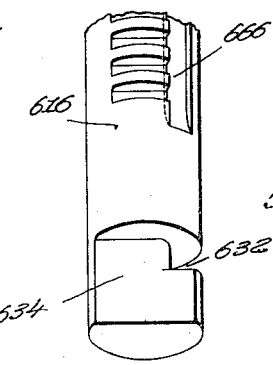
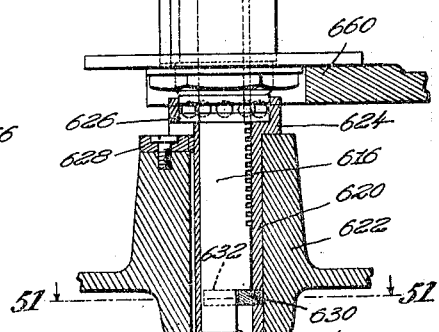

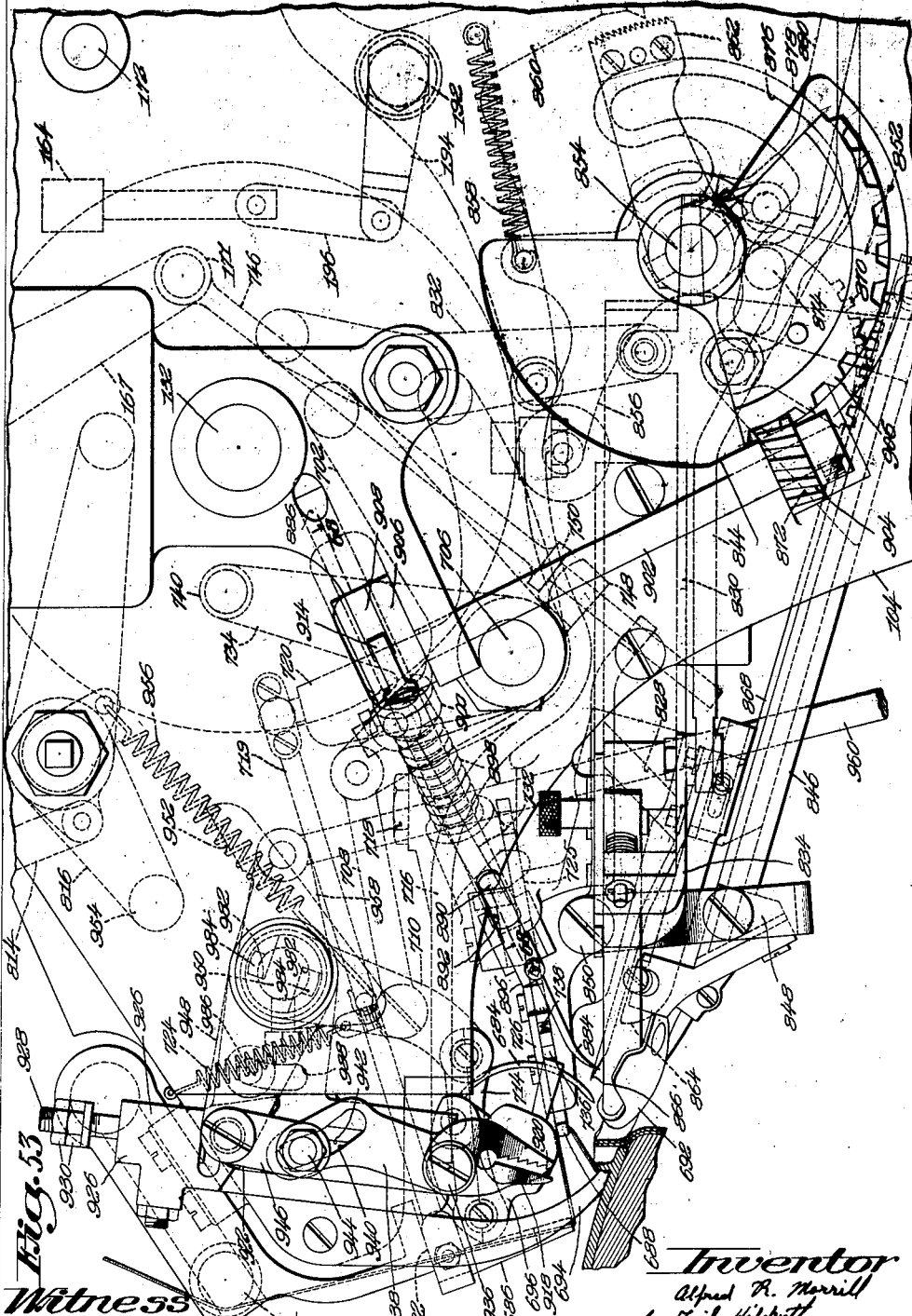

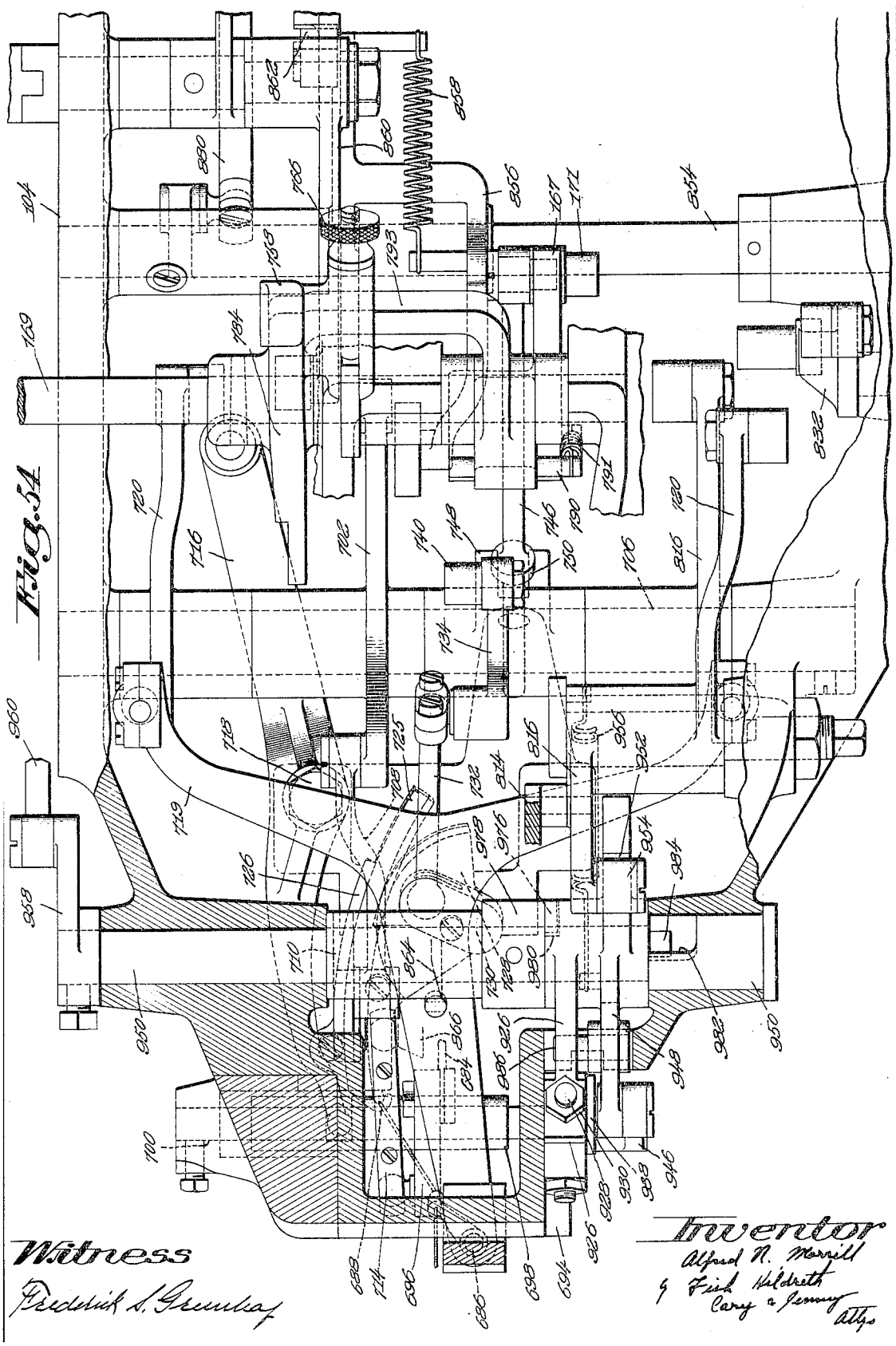

Oct. 3, 1944.  A. R. MORRILL  2,359,662
SHOE MACHINE
Filed Nov. 4, 1940   37 Sheets-Sheet 29

Oct. 3, 1944.  A. R. MORRILL  2,359,662
SHOE MACHINE
Filed Nov. 4, 1940  37 Sheets-Sheet 30
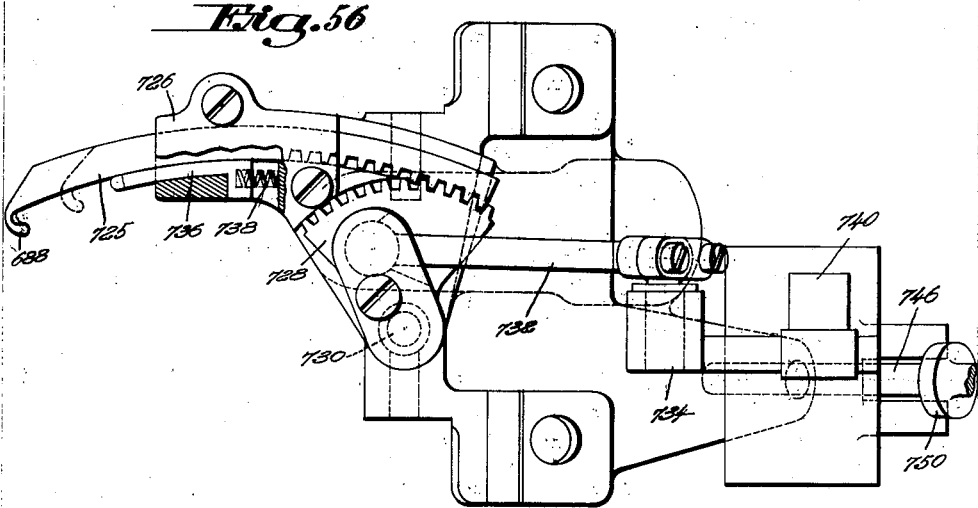
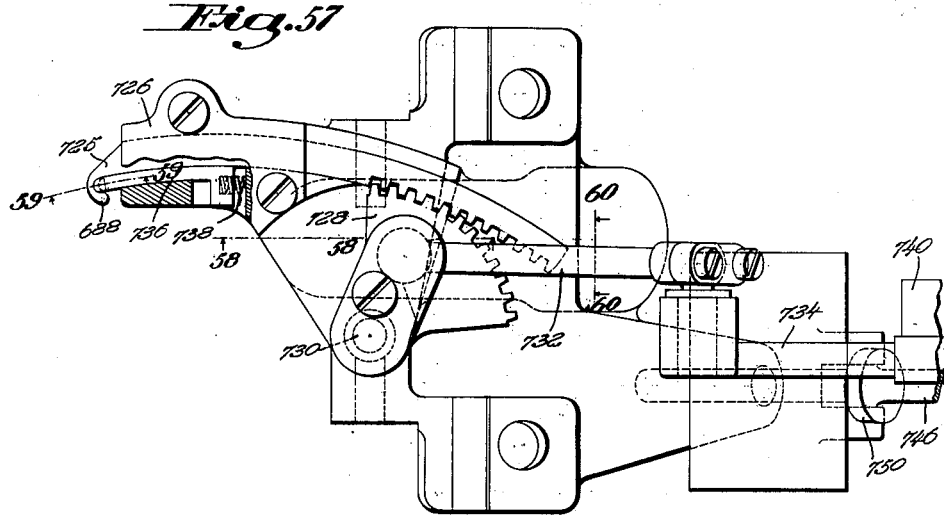
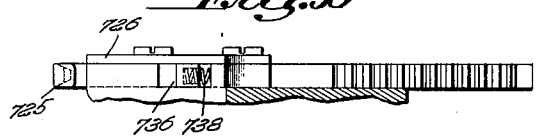
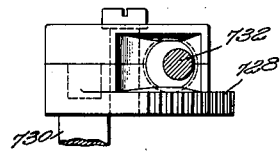

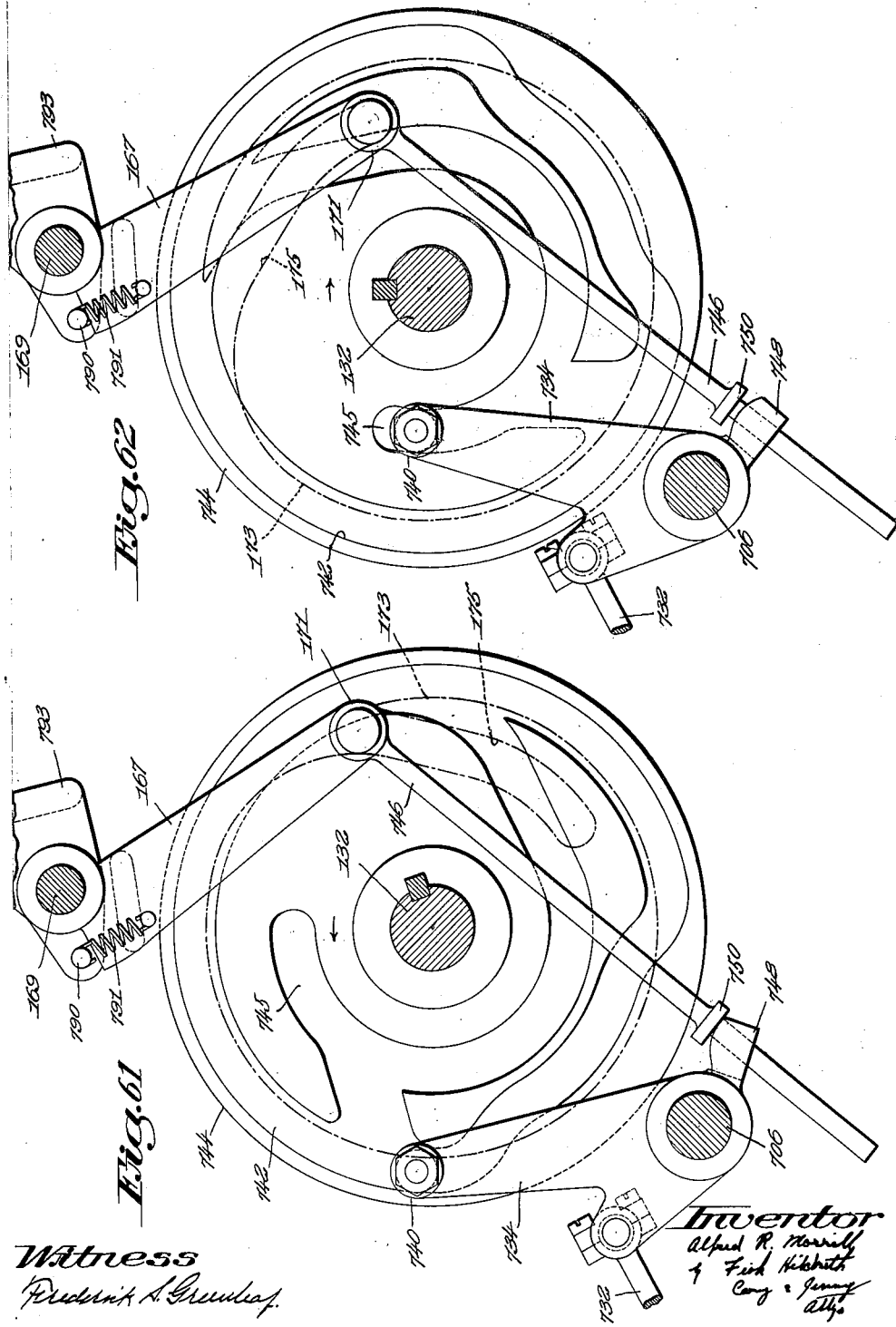

Oct. 3, 1944. A. R. MORRILL 2,359,662
SHOE MACHINE
Filed Nov. 4, 1940 37 Sheets-Sheet 32
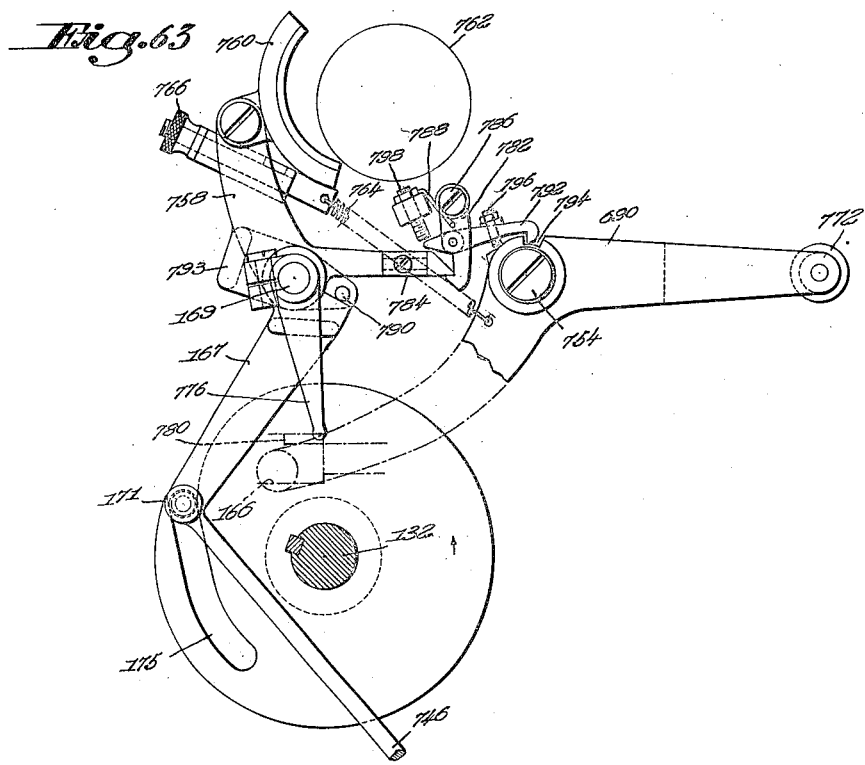
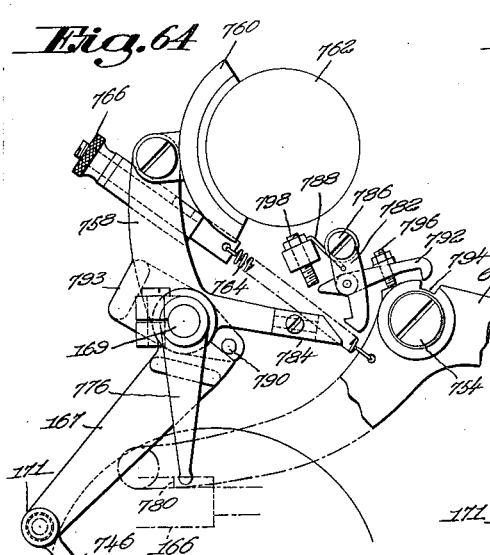
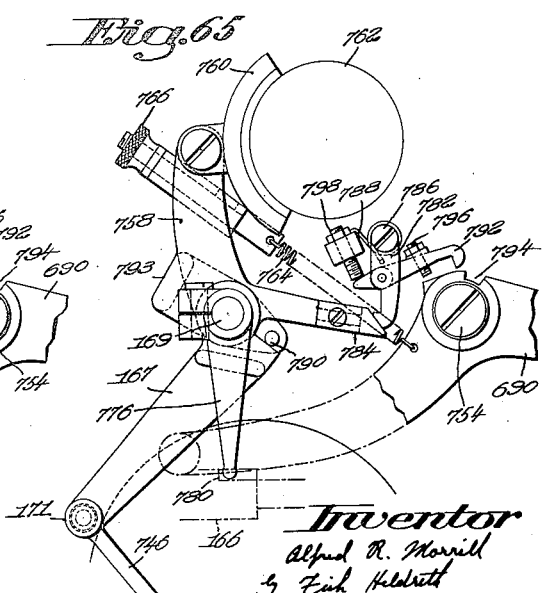

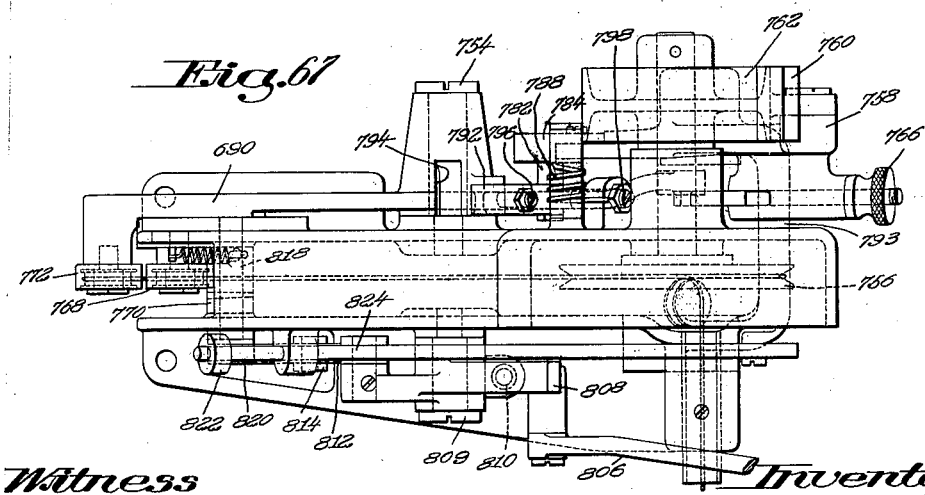

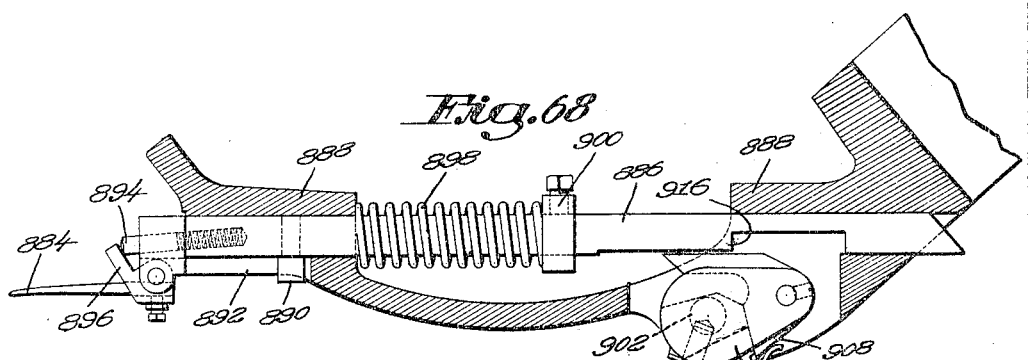
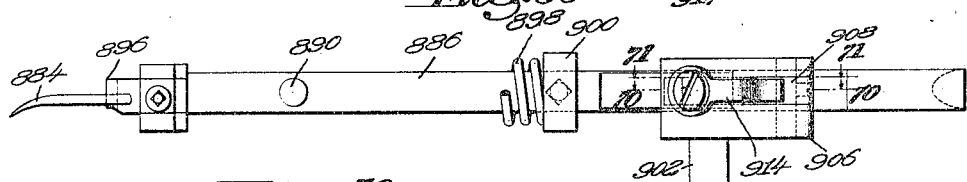
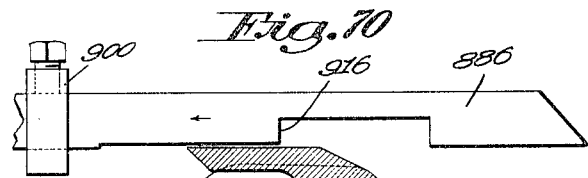
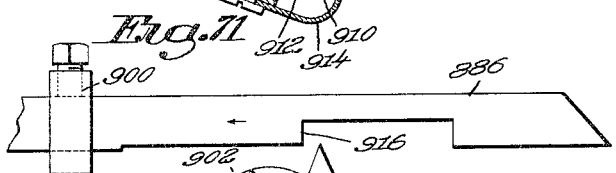
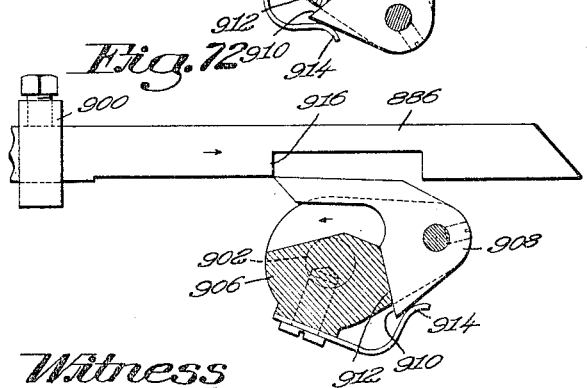
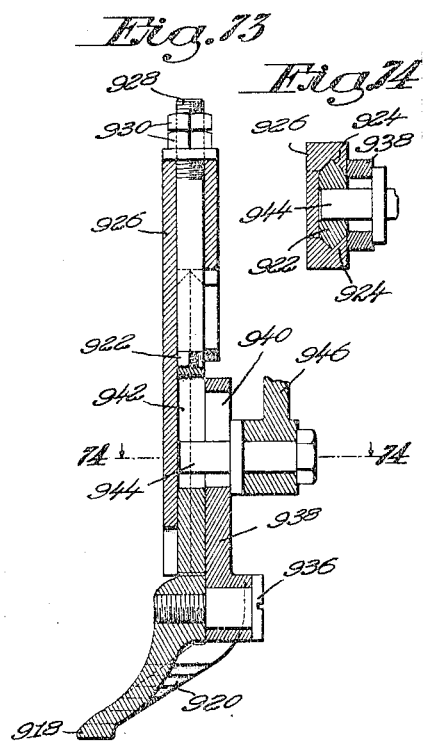

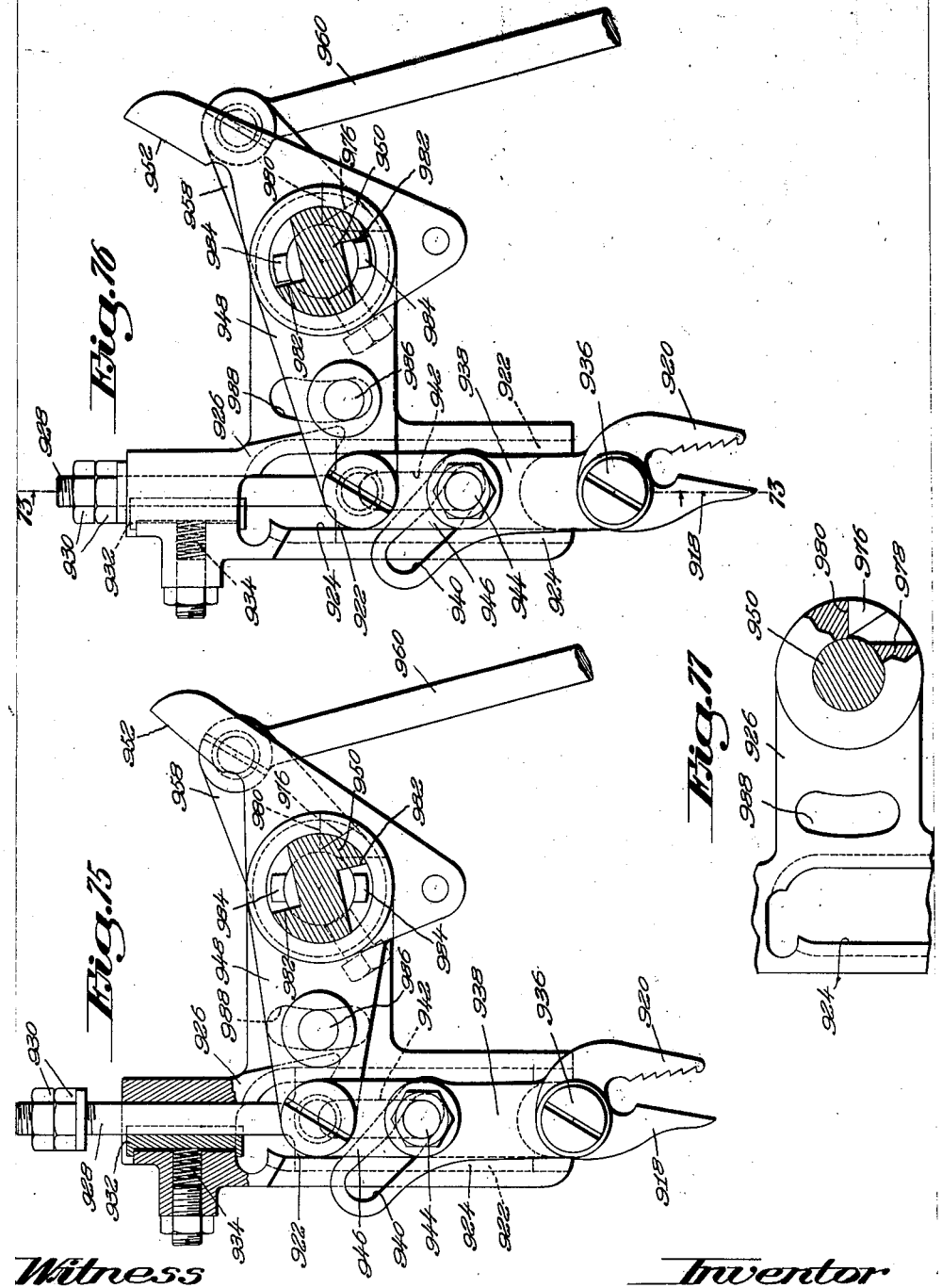

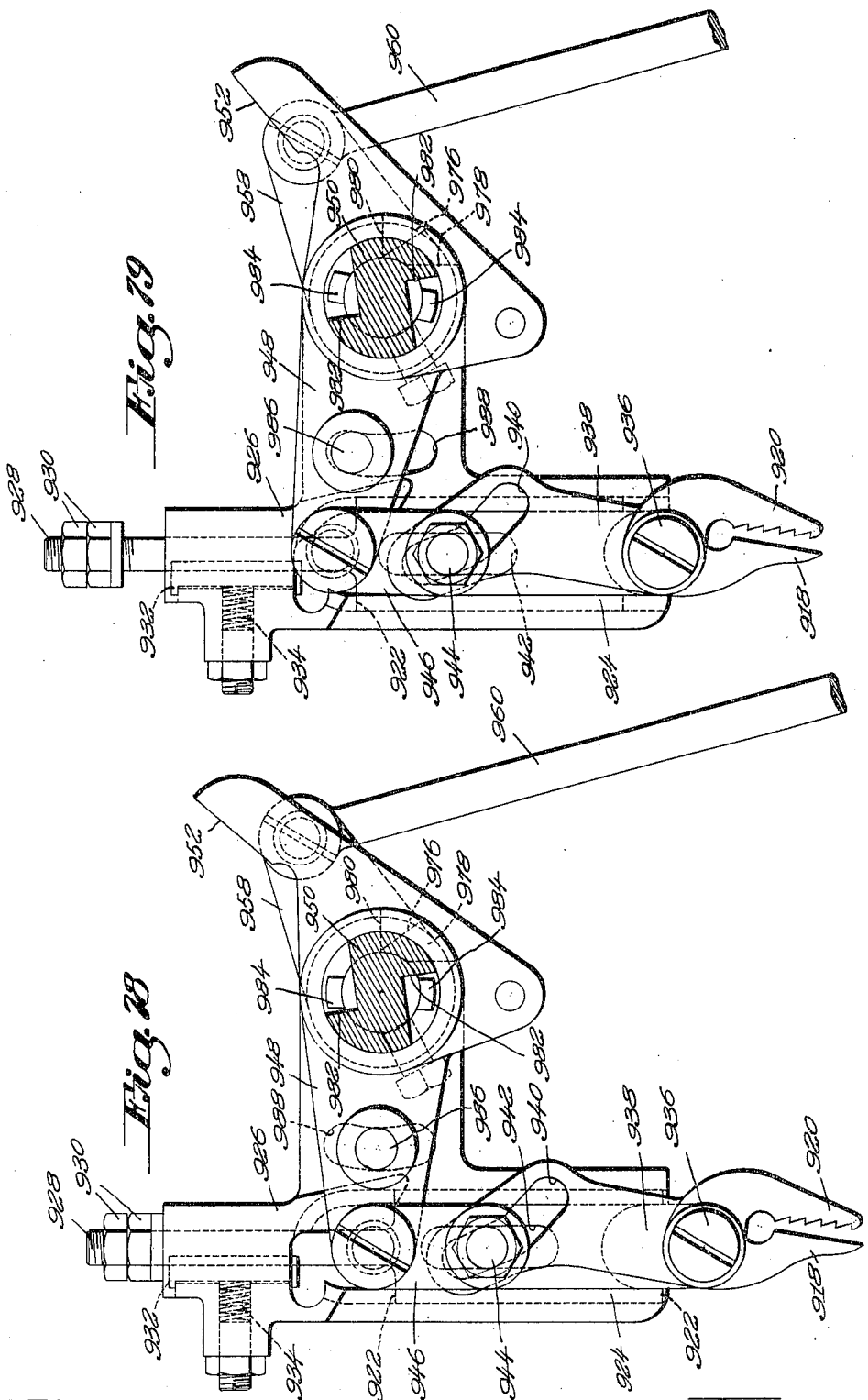

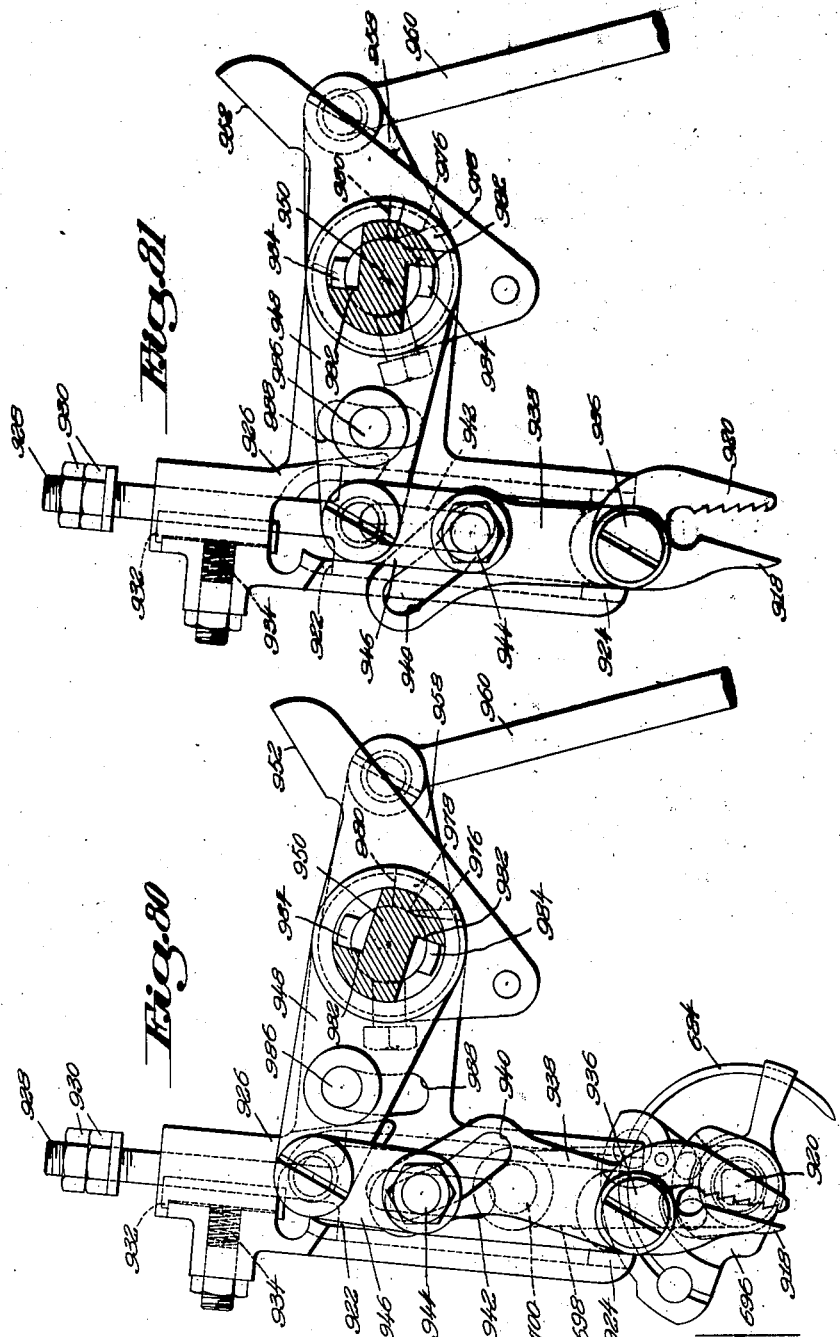

Patented Oct. 3, 1944

2,359,662

UNITED STATES PATENT OFFICE 2,359,662

SHOE MACHINE

Alfred R. Morrill, Beverly, Mass., assignor to United Shoe Machinery Corporation, Flemington, N. J., a corporation of New Jersey Application November 4, 1940, Serial No. 364,223

51 Claims. (Cl. 112—46)

The present invention relates to shoe machines, and is herein shown as embodied in a machine for operating on shoes of the type in which the shoe is supported upon a jack, and in which the jack and the means for operating on the shoe are moved relatively to transfer the point of operation about the shoe, and to change the relative positions of the shoe and the operating means to cause the shoe to be presented properly to the operating means as the point of operation is transferred about the shoe, all of the relative movements of the shoe and the operating means being produced and controlled by automatically acting mechanisms. While the several mechanisms of the present invention are particularly applicable to automatic shoe machines of the type above referred to, certain features of the invention are also capable of use in other types of automatic machines, or in machines in which the shoe is held in position by the operator. It is also to be understood that except as defined in the claims, the several features of the invention are not limited to any particular construction and arrangement of parts.

The machine hereinafter specifically described as embodying the several features of the present invention, is an automatic machine for sewing the welt and upper to the insole of a welted shoe, and is comparable with the disclosures of the prior patents to Morrill, Nos. 2,162,026 and 2,155,438, in that certain of the instrumentalities illustrated perform equivalent functions, such instrumentalities including a sewing head capable of sewing the inseam of a welted shoe, a shoe supporting jack, pattern control mechanism for imparting turning, tipping and feeding movements to the jack and shoe supported thereon to transfer the point of operation about the margin of the shoe sole, together with mechanism operative in jacking the shoe to adjust the pattern mechanism in accordance with the size of the shoe being operated upon, and driving and stopping mechanism arranged to operate automatically at the completion of the sewing operation to release and to move the jacked shoe away from the sewing mechanism, and to return the several operating mechanisms including the jack and the pattern devices associated therewith to a convenient starting position preparatory for the removal of the completed shoe and the jacking of a new shoe in the machine.

It is a principal object of the present invention to provide an automatic machine for operating upon shoes which is simpler and more compact in construction than the machines of the prior art, and which, to this end, will embody therein an improved and simplified arrangement and mode of operation of the parts.

It is a further object of the invention to provide a novel and improved construction and arrangement of the machine including a novel arrangement and mode of operation of certain operating controls which will adapt the machine for the most efficient and convenient operation by the operator, and which will contribute to ease of manipulation and servicing of the machine in connection with both automatic and manual performance of the several operating functions of which the machine is capable.

Other objects of the invention are concerned more specifically with improvements in the construction and operation of various parts of an automatic shoe machine, which are well adapted for use both in automatic machines generally, and more specifically in a welt sewing machine of the general type embodied in the sewing head of the present machine.

Figure 2:
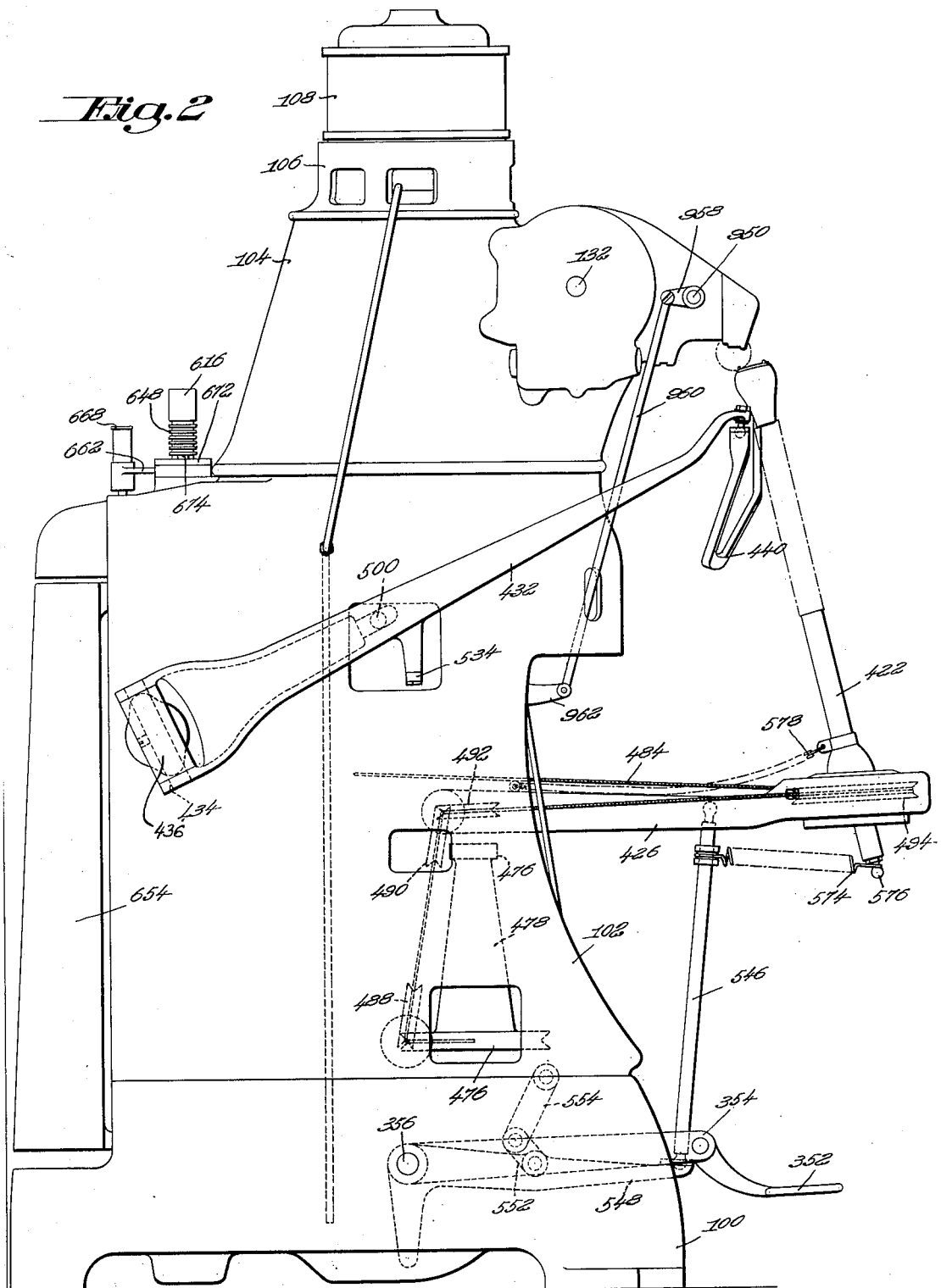
Figure 3:
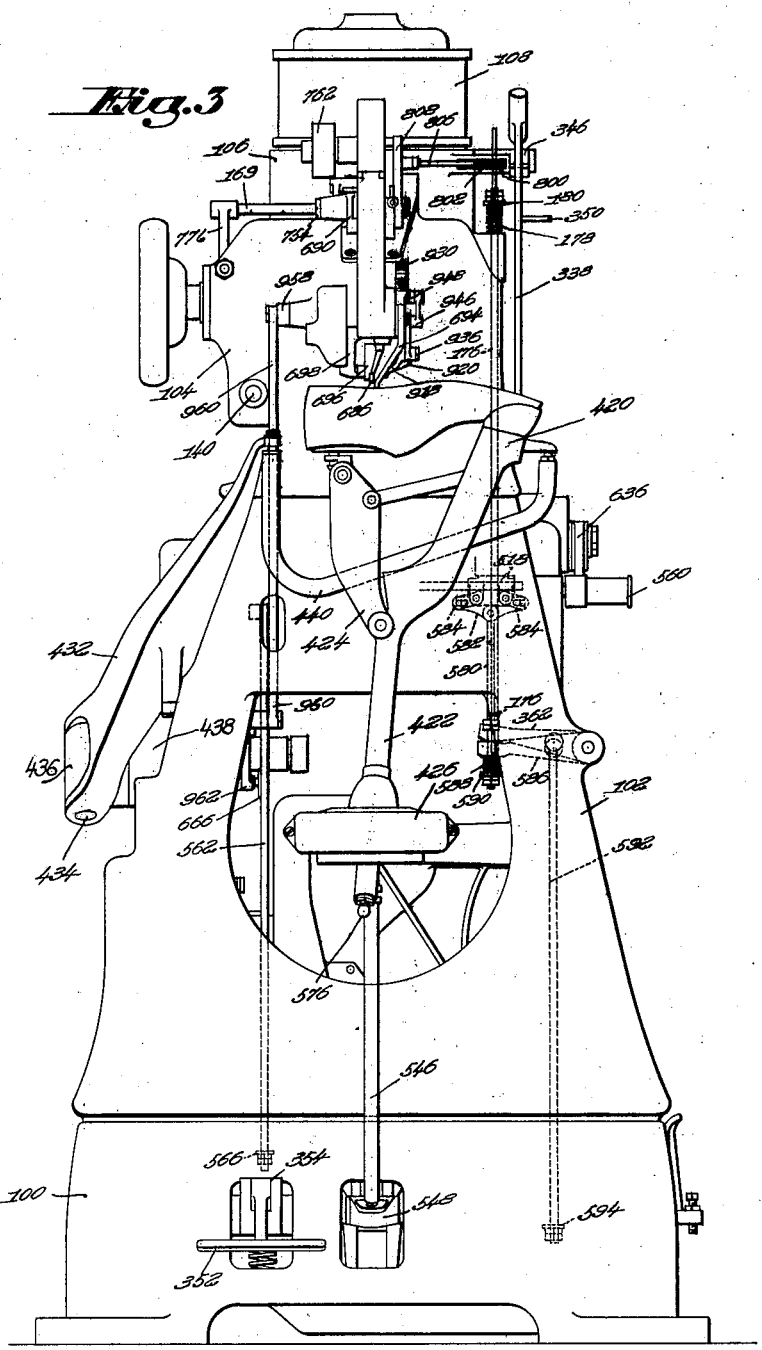
Figure 4:
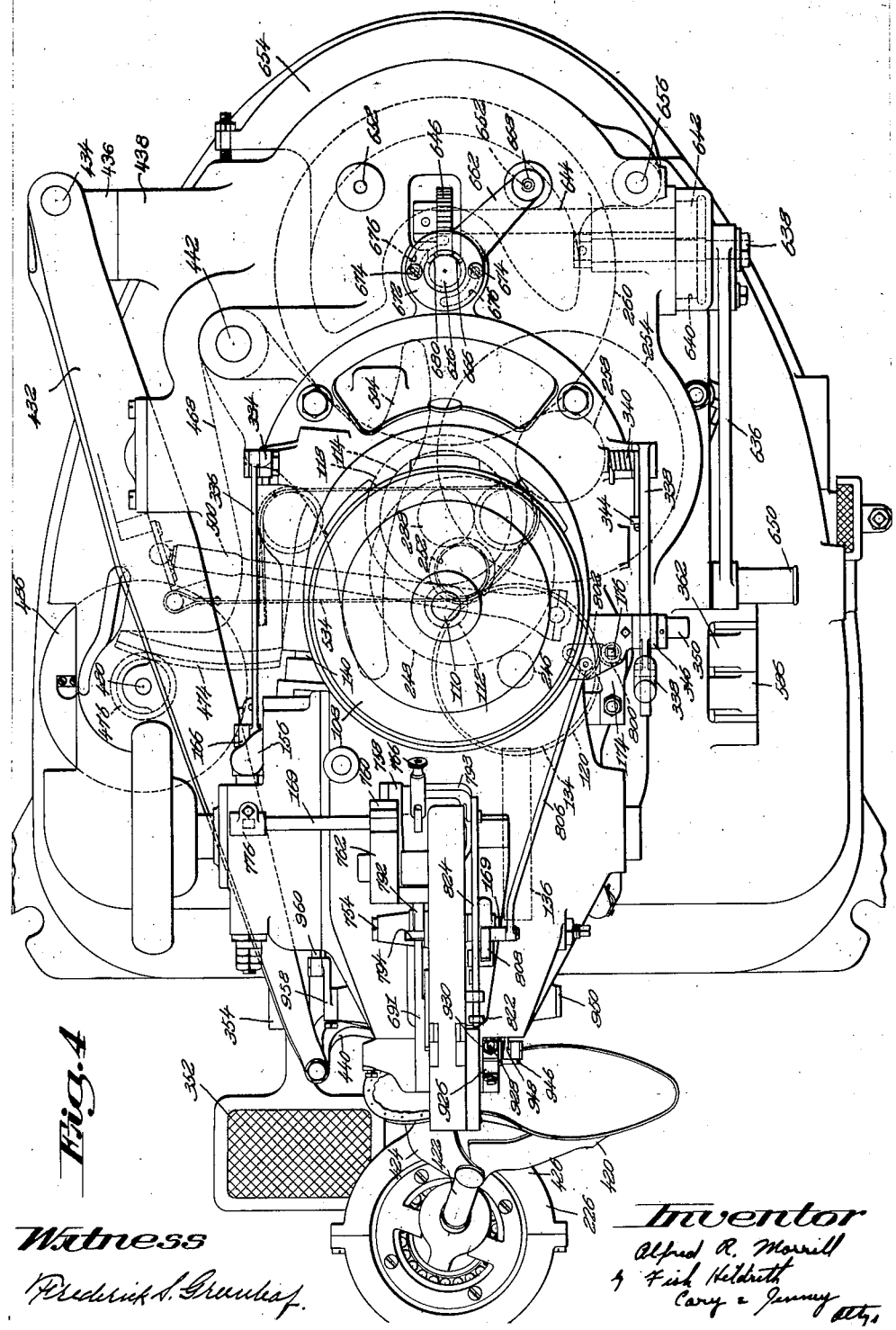
Figure 55:
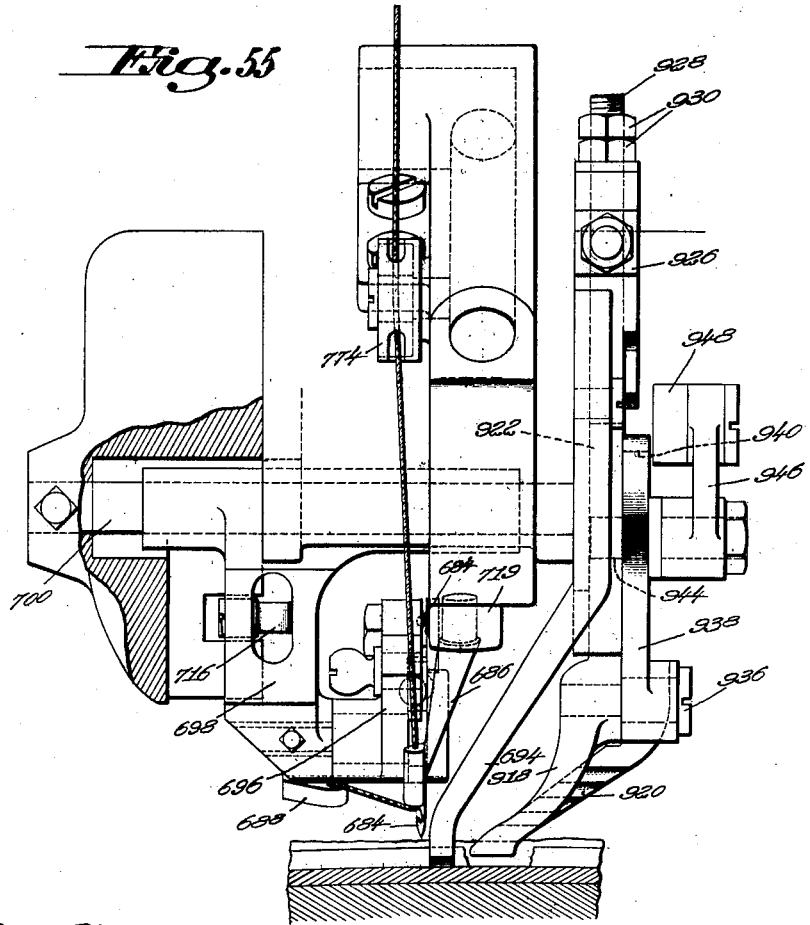
Figure 82:
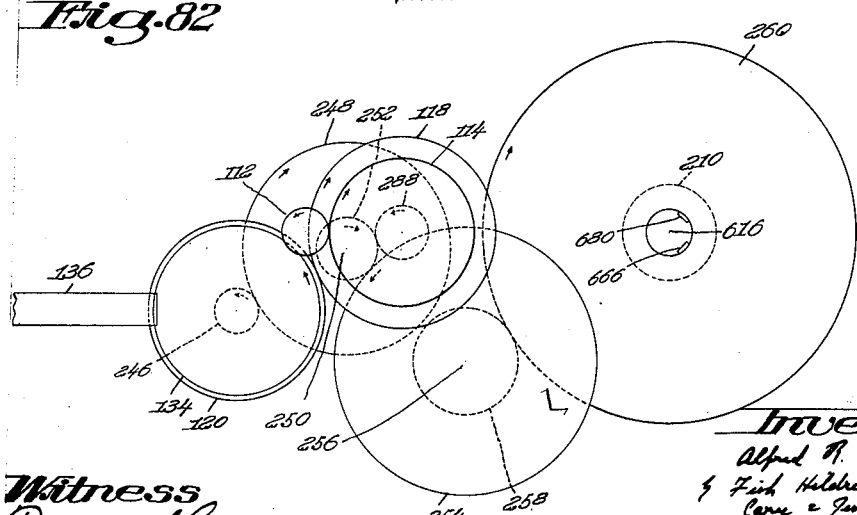

With these and other objects in view as may hereinafter appear, the several features of the invention consist in the devices, combinations and arrangement of parts hereinafter described and claimed, which together with the advantages to be obtained thereby, will be readily understood by one skilled in the art from the following description taken in connection with the accompanying drawings, in which Fig. 1 is a view in rght side elevation of the machine, but with the jack removed; Fig. 2 is a view in left side elevation of the machine, but with a portion of the jack and its supporting spindle removed; Fig. 3 is a view in front elevation of the machine; Fig. 4 is a plan view of the machine; Fig. 5 is a view in right side elevation showing substantially the head section of the machine housing the sewing and driving and stopping mechanisms, but with a rear portion of the casing broken away; Fig. 6 is a detail plan view on the line 6—6 of Fig. 5, illustrating particularly the connection of the thread break stop mechanism with the treadle rod; Figs. 7 and 8 are fragmentary detail plan views of parts shown in Fig. 6, of which Fig. 7 shows the treadle rod in running position with relation to the treadle latch rod, and Fig. 8 shows the treadle rod turned through 90° to its thread break stop position; Fig. 9 is a view in left side elevation showing substantially the head section of the machine housing the sewing and driving and stopping mechanisms; Fig. 10 is a plan view of the rear portion of the head setcion of the machine partly in section, the driving motor having been removed and a portion of the casing broken away to show the driving and reversing mechanism for the sewing cam shaft; Fig. 11 is a sectional elevation taken through the head section of the machine substantially on the line 11—11 of Fig. 10, to illustrate particularly the driving and stopping mechanism; Fig. 12 is a fragmentary detail view partly in section looking from the right substantially on the line 12—12 of Fig. 10, illustrating a portion of the control mechanism for the lock bolt carrier and for stopping the sewing cam shaft in a predetermined angular position; Fig. 13 is a detail view looking from the rear, to illustrate substantially the parts shown in Fig. 12, and additionally the welt cutting and advancing rock shaft; Fig. 14 is a sectional plan view taken substantially on the line 14—14 of Fig. 11, to illustrate several of the actuating and control mechanisms located in the head section of the machine; Figs. 15, 16 and 17 are similar detail views in right side elevation on an enlarged scale, illustrating particularly the eccentric, reversing and secondary driving clutches for the pattern cam shaft as shown also, for example, in Fig. 11, Fig. 11 showing the parts in normal running position, Fig. 15 showing the parts with the eccentric clutch engaged during operation of the stop motion in stopping the machine, Fig. 16 showing the parts with the reversing clutch engaged and with the auxiliary driving clutch and the eccentric driving clutch disengaged for effecting a power drive of the pattern cam shaft in the reverse direction, and Fig. 17 showing the parts with all three clutches disengaged, thus wholly disconnecting the pattern cam shaft from its power driving connections and from the connections with the sewing cam shaft, so that either or both cam shafts may be independently turned by hand; Fig. 18 is a view in right side elevation partly in section taken substantially on the line 18—18 of Fig. 19, illustrating substantially the parts housed in the upper part of the middle section of the machine including portions of the driving and stopping mechanism, the drive to the pattern cam shaft, and the feed lever linkage connections; Fig. 19 is a sectional plan view taken on a line running generally between the head section and middle section of the machine, illustrating substantially the parts shown in Fig. 18, and including additionally the stop motion eccentric and the trip mechanism for throwing the stop motion into operation; Fig. 20 is a detail view in front elevation illustrating particularly the trip mehanism for throwing the stop motion into operation, and the stop motion eccentric rock shaft, this figure showing substantially the parts illustrated in plan in Figs. 21 and 22, and in the assembly plan view Fig. 19; Figs. 21 and 22 are similar plan views of the mechanism shown in Fig. 20, the parts being shown in Figs. 19, 21 and 22 in a number of different operating positions, of which Fig. 19 shows the parts in their normal stop position ready for the starting of the machine, Fig. 21 shows the parts in a position taken during stopping, the treadle latch bar having been withdrawn to put the stop motion in operation, the positioning lever for the auxiliary clutch control rod having been biased for movement forwardly or to the left from the position of Fig. 21, and Fig. 22 shows successive positions of the eccentric driven rock shaft during operation of the eccentric, the full line position illustrating the control lever and auxiliary clutch control rod in their forward or operating positions taken as the control rod is raised to establish an operating connection with the auxiliary clutch shifting lever, but with the eccentric controlled rock shaft in its starting position, and the dot-and-dash position illustrating a subsequent position of the parts in which the eccentric has been rocked to the limit of its movement in a clockwise direction; Fig. 23 is a sectional plan view taken substantially on the line 23—23 of Fig. 1, illustrating particularly the jack supporting and controlling mechanisms; Fig. 24 is a view looking from the right, a portion of the casing being broken away to illustrate substantially the parts shown in Fig. 23, together with the machine starting treadle, and the toggle mechanism for tripping the jack into operation; Fig. 25 is a sectional view in front elevation corresponding substantially with Fig. 24, but with the portions of the machine casing, the jack supporting rod and the take-up spring for the jack feed connections broken away to show underlying parts; Fig. 26 is an enlarged detail sectional view in front elevation of certain of the parts shown in Fig. 25; Fig. 27 is a detail view in front elevation partly in section showing the pantograph lock shown also in plan in Fig. 19; Fig. 28 is a detail view looking from the right of the flanged drum for forming part of the spring take-up device for the jack feed connections; Fig. 29 is a plan view of substantially the parts shown in Fig. 26, but with the coiled take-up spring removed to show underlying parts; Fig. 30 is a fragmentary detail view in front elevation on an enlarged scale of the toggle connections for moving the jack between its raised operative and lowered inoperative positions; Fig. 31 is a view in right side elevation partly in section and on a somewhat enlarged scale of a portion of the mechanism shown in Fig. 24, including particularly the treadle lever, the take-up spring for the jack feed connections, the toggle connection for raising and lowering the jack, and the lubricant pump actuated therefrom, the parts being shown in this view with the toggle in its straightened position in which the jack is in its depressed inoperative position; Fig. 32 is a view similar to Fig. 31, illustrating particularly the toggle in its broken position in which the jack is in its raised operative position; Fig. 33 is a detail sectional plan view taken on the line 33—33 of Fig. 34, illustrating particularly the gimbal supporting connection between the jack support and the jack spindle; Fig. 34 is a sectional view taken on the line 34—34 of Fig. 33; Fig. 35 is a sectional view taken on the line 35—35 of Fig. 33; Fig. 36 is an enlarged detail view in front elevation partly in section, illustrating particularly the pitch and roll supporting levers for the jack shown in smaller scale in Fig. 25; Fig. 37 is a detail sectional plan view taken on the line 37—37 of Fig. 36; Fig. 38 is a detail sectional view taken on the line 38—38 of Fig. 36; Fig. 39 is a detail sectional plan view on a relatively large scale, illustrating particularly the several pattern cams on the pattern cam shaft, and the pattern levers associated therewith; Fig. 40 is a detail sectional plan view of the pattern lever pivot shaft and lever supported thereon, but with the shaft turned in a clockwise direction to disengage the levers from the pattern cams; Fig. 41 is a view in right side elevation, illustrating particularly the pattern cam levers and their connections with the jack supporting and controlling mechanisms; Fig. 42 is an enlarged detail view in right side elevation of the positioning mechanism for the pattern cams generally indicated on a smaller scale in Fig. 1, and with a portion of the casing broken away and underlying parts shown in section, the pattern mechanism being shown in this figure in position of highest adjustment; Fig. 43 is a detail plan view of the key ring for the pattern cam adjusting shaft; Fig. 44 is a detail plan view of a portion of the key ring broken away to illustrate particularly the control lever which is shown in this view in running position; Fig. 45 is a view similar to Fig. 44, but with the control lever shown in its release position; Fig. 46 is a view partly in section taken substantially on the line 46—46 of Fig. 45; Fig. 47 is a detail view substantially similar to Fig. 42, but with the pattern mechanism shown in the position of lowest running adjustment; Fig. 48 is a view similar to Figs. 42 and 47, but with the pattern mechanism shown in its release position in which the pattern cams are resting on the platform preparatory for removal; Fig. 49 is a detail plan view of the adjusting shaft shown in perspective in Fig. 52; Fig. 50 is a detail sectional view taken on the line 50—50 of Fig. 47; Fig. 51 is a detail sectional view taken on the line 51—51 of Fig. 48; Fig. 52 is a perspective view of the lower end of the adjusting shaft; Fig. 53 is a view in right side elevation of the forward portion of the head section of the machine, illustrating particularly the sewing mechanism, the welt feeding and slashing devices, and the lasting grippers; Fig. 54 is a plan view partly in section of substantially the parts shown in Fig. 53, but with a portion of the casing broken away and the lasting devices removed to illustrate underlying parts; Fig. 55 is a detail view in front elevation partly in section showing particularly the stitch forming and work guiding devices and the lasting grippers; Fig. 56 is a detail plan view on an enlarged scale of the thread finger and its actuating mechanism shown in Fig. 54, the thread finger being shown in full lines in its fully extended position, and in dot-and-dash lines at the normal limit of its retracted movement; Fig. 57 is a view similar to Fig. 56, but with the parts including the thread finger shown in its abnormally retracted thread gripping position; Fig. 58 is a detail sectional plan view looking from below, taken on the line 58—58 of Fig. 57; Fig. 59 is a detail sectional view looking from below taken on the line 59—59 of Fig. 57; Fig. 60 is a detail sectional view taken on the line 60—60 of Fig. 57; Figs. 61 and 62 are enlarged detail views looking from the right of the machine to illustrate the stop arm and the cooperating cam on the sewing cam shaft, and the thread finger cam lever together with its actuating cam, Fig. 61 showing the parts in position at the beginning of the cam shaft reversing movement and stopping, and Fig. 62 showing the parts in position at the end of the cam shaft reversing movement for the stop position of the machine; Figs. 63, 64 and 65 are somewhat fragmentary detail views looking from the left of the machine showing the main take-up lever, the stop arm, the thread tensioning brake, and the mechanism controlled through the operation of these parts, and the lock bolt carrier for releasing and engaging the thread tension, Fig. 63 showing the parts in the stop position of the machine with the tension brake latched in open position to release the thread tension, Fig. 64 showing the parts in the position taken as the take-up nears the completion of its first downward loop drawing stroke in the sewing of a new seam, and in which the tension brake has just been tripped into operation, and Fig. 65 showing the parts in their normal running position in which the latching device for throwing the tension brake into operation is disconnected from the take-up lever; Fig. 66 is a somewhat fragmentary detail view partly in section looking from the right of the machine, and illustrating particularly the thread brake stop mechanism for the machine; Fig. 67 is a plan view of substantially the parts shown in Fig. 66; Fig. 68 is a detail sectional plan view of the welt feed finger and its actuating mechanism taken on the line 68—68 of Fig. 53; Fig. 69 is a view in right side elevation of the parts shown in Fig. 68; Fig. 70 is a detail sectional view taken on the line 70—70 of Fig. 69; Figs. 71 and 72 are detail sectional views taken on the line 71—71 of Fig. 69, showing the parts in different position, Fig. 70 showing the parts with the thread finger in its normal retracted position, Fig. 71 showing the actuating rock shaft and latch rocked in a clockwise direction by movement of the eccentric in stopping the machine, and Fig. 72 showing the parts in the position in which the rock shaft has returned in a counterclockwise direction substantially to its initial position to advance the thread finger and to release the same; Fig. 73 is a detail sectional view in front elevation taken on the line 73—73 of Fig. 76, illustrating particularly the side lasting grippers and their support; Fig. 74 is a detail sectional view taken on the line 74—74 of Fig. 73; Fig. 75 is a detail view in right side elevation partly in section of the lasting gripper mechanism, in which the grippers are at the limit of their upward movement during active operation, have been opened, and are starting down; Fig. 76 is a view similar to Fig. 75, but with the grippers at the limit of their downward movement with jaws still open; Fig. 77 is a fragmentary detail view in right side elevation partly in section illustrating particularly the gripper supporting bracket and supporting shaft, with the gripper mechanism in operating position; Fig. 78 is a view of the gripper mechanism with the grippers in their extreme down position with the grippers closed and about to start their upward movement; Fig. 79 is a view of the gripper mechanism with the grippers at the limit of their upward movement with the grippers still in gripping position; Fig. 80 shows the stop position of the gripper mechanism in which the supporting bracket for the grippers has been shifted upwardly to stop position; Fig. 81 shows the gripper mechanism in starting position; and Fig. 82 is a somewhat diagrammatic plan view of the gear driving connections to the pattern cam shaft of the machine.

Certain features of the invention relate particularly to a novel and improved construction and arrangement of the several operating mechanisms in a machine of this general description which make possible a very substantial reduction in the size and weight of the machine, and an important reduction in the amount of floor space occupied thereby. The several operating instrumentalities of applicant's improved machine including the sewing mechanism, the driving and stopping mechanism, the jack supporting structure and pattern cam positioning and actuating mechanisms are housed most advantageously within a relatively slender column type of casing. In accordance with the invention, the driving motor of the machine is carried on a support formed integrally with and overtopping the sewing head, and the drive is taken therefrom directly downwardly through the machine column.

The driving and stopping mechanism is housed in a portion of the casing integral with the sewing head, and embodies therein a number of novel features contributing directly to the greater compactness and efficiency of the entire machine.

In accordance with a feature of the invention, applicant provides a novel and improved control mechanism for throwing the welt slashing device into and out of operation to slash that portion of the welt passing around the toe of the shoe. With the present construction, the operation of the welt slashing mechanism is controlled by means of a cam secured to one of the feed lever linkage connections so that operation of this device is related directly to the positioning movements of the feed lever to transfer the point of operation about the shoe, and is automatically adjusted by movement of the feed lever and associated linkage connections in accordance with the size of shoe being operated upon.

Certain features of the invention relate to the provision of a novel driving and stopping mechanism particularly adapted for use in automatic shoe machines. The driving connections for the present machine comprise a main transmission, motor driven, and including a main starting and stopping clutch, and individual branch transmissions therefrom to the sewing cam shaft and pattern cam shaft. In accordance with the present invention, novel and improved auxiliary driving connections are provided for controlling each of the sewing and pattern cam shafts in stopping the machine. These connections include for the sewing cam shaft, an auxiliary reverse slow motion drive and a stop motion clutch which is mounted on the sewing cam shaft, and is operated by means of a cam actuated bell-crank lever and a lock bolt mechanism to connect the sewing cam shaft with the reverse drive acting first to stop and thereafter to drive the sewing cam shaft backwardly to a predetermined angular position. The initial movement of the lock bolt mechanism acts through an appropriate connection to release the tension on the thread. The reverse movement of the cam shaft is employed to dip the needle for casting off the thread therefrom, and to extend the throw of the thread finger for clamping a portion of the thread extending from the work.

In applicant's improved automatic machine, the operation of the stop motion clutch and bell-crank associated with the sewing cam shaft is employed to open a clutch in the branch transmission to the pattern cam shaft, and to put in motion an auxiliary eccentric drive for the performance of certain additional operations in stopping the machine. The operations performed by the eccentric drive include the actuation of the welt cutter, the advancing of the welt, the actuation of the thread cutter, the straightening of the jack supporting toggle which causes the jack to move downwardly and then out under the influence of an actuating spring, and the return of the pattern cam shaft and jack controlled thereby to their initial starting position.

Certain features of the invention relate to a novel construction and arrangement of the clutches and control mechanism associated therewith for disconnecting the branch transmission from the main clutch to the pattern cam shaft, for throwing the drive for the eccentric into and out of operation, and for connecting the pattern cam shaft when so desired to be driven in a reverse direction. In the present construction, the driving instrumentalities for the pattern cam shaft including the driving clutch and the variable speed mechanism forming parts of the branch transmission, the drive for the eccentric, and the eccentric and reversing clutches, have been re-located to secure a more compact and advantageous arrangement of these mechanisms in the machine. Applicant provides an improved arrangement of the mechanism for throwing the auxiliary eccentric into and out of operation, and for disconnecting the clutch in the branch transmission, which is simpler and more compact in construction and mode of operation than those previously devised. Following the usual practice in these machines, a single clutch element is provided shiftable in opposite directions from an intermediate neutral position to engage alternatively the eccentric and the pattern cam shaft reverse driving connections. With the present construction, the operation of this clutch element is controlled by means of an eccentric clutch shifting lever which in turn automatically controls the position of a shifting lever for the driving clutch in the branch transmission, these parts being so arranged as to provide for the automatic positioning of all of these clutches for operation under a variety of conditions by simple positioning movements of the first-mentioned eccentric clutch shifting lever. Under conditions of normal operation, the eccentric clutch shifting lever is positioned to maintain the eccentric and pattern shaft reversing clutches in open position, and the pattern shaft driving clutch in closed position. In stopping the machine, the eccentric clutch shifting lever is actuated through mechanism controlled from the pattern cam shaft to close the eccentric clutch and to open the driving clutch, and is subsequently rendered operative by the eccentric mechanism after the machine is stopped to again open the eccentric clutch, and to close the driving clutch.

In accordance with another feature of the invention, a manually operable control is provided which may be rendered operative to position the eccentric clutch lever in any one of two additional positions, one for driving the cam shaft in a reverse direction, and another to permit the turning over of the sewing cam shaft and sewing mechanism associated therewith by hand independently of the pattern cam shaft. Movement of the hand lever in one direction from the normal operating position, operates to close the reverse clutch and to open the driving clutch; movement of the hand lever in an opposite direction from its normal operating position operates to shift all of the driving, reverse and eccentric clutches to open position, thus permitting the turning over of the sewing cam shaft by hand without disturbing the position of the pattern cam shaft.

Other features of the invention are concerned more particularly with improvements in the construction and operation of the shoe sewing mechanism adapted for use in an automatic machine, and include an improved thread break stop mechanism which is rendered operative by the breaking or mislooping of the needle thread to release the treadle rod and thereby to throw the machine stop motion into operation, an improved thread tension release mechanism controlled by the reversal of the sewing cam shaft in stopping the machine to release the tension on the thread, a novel construction and arrangement of the thread finger and mechanism rendered operative by the reversal of the sewing cam shaft in stopping the machine to cause the thread finger to grip the thread preparatory for the cutting of the same, and an improved mechanism controlled by the eccentric in stopping the machine, and rendered operative subsequent to the severing of the welt to advance the severed end through the welt guide and to cut the thread.

Referring more specifically to the drawings, Figs. 1, 2 and 3, the machine casing or frame is built up of several sections including a floor section 100 housing principally the oil sump and various foot treadle controls, a middle section 102 housing principally the jack supporting mechanism and the pattern mechanism of the machine, a head section 104 housing therein the welt sewing mechanism and the driving and stopping mechanisms of the machine, and a top section 106 supporting thereon the driving motor 108, reduction driving gears therefrom, and a distributing reservoir forming part of the oiling system for the machine.

In applicant's improved machine the drive is taken from the motor 108 directly downwardly through the sewing head casing section 104 to the stop motion and to the sewing cam shaft, and thence downwardly to the pattern mechanism of the machine. As best shown in Figs. 1, 10 and 11, the armature shaft 110 of the motor is connected through reduction gears 112, 114 to drive a vertically arranged main drive shaft 116 which is in turn connected by means of gears 118, 120 to drive an external coned clutch member 122 forming the driving element of the main driving clutch which is loosely supported to turn on a sleeve bushing on a vertically arranged drive shaft 124. These parts are driven continuously. The driving clutch member 122 is rigidly supported against axial movement between upper and lower thrust ball bearings 126, 128. The cooperating driven element of the main driving and stopping clutch comprises an internal coned clutch member 130 keyed to turn with and to slide on the drive shaft 124. A compression spring coiled about the driving shaft 124 and interposed between the sleeve 45 hub of the driven clutch member 130 and a flanged sleeve abutting the thrust ball bearing 126 tends normally to move the driven clutch member 130 upwardly to disengage the clutch.

The driven member 130 of the main starting and stopping clutch is arranged through its spline connection with the vertical drive shaft 124 to drive the pattern mechanism of the machine including the pattern cam shaft. The driven clutch member is also connected to drive the sewing cam shaft 132 through the meshing engagement of a spiral gear 134 formed on the outer periphery of the driven clutch member 130 with a spiral gear 136 secured to the sewing cam shaft 132 (see Figs. 10 and 11).

In stopping the machine, the sewing cam shaft is first brought to a gradual stop and then is driven through a predetermined distance in a reverse direction by means of slow speed reverse driving connections and a friction clutch mechanism on the sewing cam shaft. The sewing cam shaft stopping and reversing clutch mechanism is arranged to be thrown into operation as the main clutch 130 is disengaged in stopping the machine. The reverse driving connections referred to, as best shown in Figs. 9, 10 and 11, comprise a forwardly extending reverse drive shaft 140 which is continuously driven from the gear 118 through the engagement therewith of a worm gear 142 on the shaft 140. Adjacent its forward end the reverse drive shaft 140 carries a worm 144 which meshes with a worm gear 146 loosely sleeved on the sewing cam shaft 132. The gear 146 has formed integrally therewith an internal cone-shaped friction clutch surface 148, and forms the driving element of the sewing cam shaft reversing and stopping clutch. The cooperating driven member of this clutch designated at 150 is provided with a cooperating external coned clutch surface, and is keyed to turn with and to slide axially on the sewing cam shaft 132. A compression spring 152 coiled about the sewing cam shaft 132 and arranged to bear at one end against the sleeve hub of the driven clutch member 150 and at its other end against a disk 154 secured to the cam shaft, tends normally to maintain the clutch in open position.

The mechanism for operating the sewing cam shaft reversing and stopping clutch, as best shown in Figs. 9 and 10, comprises a bell-crank clutch shifting lever 156 which is supported on a vertical pivot 158, and carries on one arm thereof a roller 160 engaging in a cam track 162 in the sleeve hub of the shiftable clutch member 150. During normal operation in which the clutch is disengaged, the bell-crank lever 156 has an idling motion determined by the contours of the cam track 162. At the same time that the main clutch 134 is disengaged in stopping the machine, a vertically arranged lock bolt 164 carried in the rearwardly extending end of a lock bolt carrier or slide 166, is permitted to engage within a socket formed in the free end of the bell-crank 156. The slide 166 is supported in a casing 168, and is acted upon by a compression spring 170 coiled about a reduced portion of the slide which tends to maintain the same in a fully extended rearward position. During continued rotation of the sewing cam shaft and clutch member 150, the position of the bell-crank shifting lever 156 is controlled by its connection with the lock bolt 164 and lock bolt carrier 166 so that the roller 160 riding in the cam track 162 acts to engage the clutch member 150 with the reverse driving clutch member 148 acting to frictionally stop and thereafter to drive the sewing cam shaft 132 in a reverse direction, to a predetermined angular stop position in which the clutch member 150 is again moved to inoperative position. During this operation of stopping and reversing the sewing cam shaft, the clutch control bell-crank lever 156 and slide 166 will be moved forwardly against the pressure of spring 170 and then rearwardly to the final stop position shown, for example, in Fig. 10.

In order to stop the sewing cam shaft 132 in its predetermined stop postion, a stop arm 167 is provided (see Figs. 12 and 13) which is loosely supported at its upper end on a transversely extending pivot shaft 169 located substantially above the sewing cam shaft, and at its lower end is provided with a roller 171 for engagement with a cam disk 173 on the sewing cam shaft 132. During the normal rotational movement of the sewing cam shaft in a clockwise direction as viewed from the right side of the machine, the roller 171 is held out of engagement with the cam disk 173. However, during the reverse movement of the sewing cam shaft in stopping the machine, the roller 171 is arranged to engage with and ride inwardly in a stop cam groove 175, so that as the roller 171 reaches the bottom of the groove 175, the cam shaft is brought to a positive stop.

The mechanism for controlling the operation of the main stopping and starting clutch 130 of the machine, and for shifting the lock bolt 164 into and out of operating position to control the operation of the sewing cam shaft reversing and stopping clutch 150, as best shown in Figs. 5, 9, 10, 11, 12 and 13, comprises a rock shaft 172 extending transversely of the machine and provided at its right hand end with a forked lever arm 174 which straddles a vertically extending treadle rod 176 and engages beneath a compression spring 178 coiled about the treadle rod 176. The spring 178 is seated at its upper end against a collar 180 fixed to the treadle rod 176. A forked clutch control lever 182 rigidly secured to the rock shaft 172 is arranged to bear against a thrust bearing 184 seated against the upper end of the sleeve hub of the main starting and stopping clutch member 130, and is rendered operative by a downward movement of the treadle rod to engage the main clutch. For controlling the operation of the lock bolt 164, there is also secured to the rock shaft 172, a downwardly and rearwardly extending lever arm 186 which carries a roller 188 adapted for engagement against a cam surface formed on a lever arm 190 secured to a rock shaft 192 parallel to and beneath the rock shaft 172. At its left hand end the rock shaft 192 carries a lever arm 194 which is connected by a link 196 with the lower end of the lock bolt 164. The lock bolt 164 is forced yieldingly upwardly by a compression spring 198 coiled about a reduced portion of the lock bolt and seated at its lower end within the slide 166. There is also provided a tension spring 200 connected at one end to a pin 202 on the lever arm 186 and at its other end to a stationary pin 204 which tends to rock the arm 186 rearwardly and to maintain the forked clutch control lever 182 in its relatively raised inoperative position. During normal operation of the machine in which the treadle rod 176 is in its depressed position, and in which the rock shaft 172 has been rocked in a clockwise direction against the pressure of spring 200, the lever arm 186 will occupy a relatively depressed position in which the roller 188 bearing against the cam surface of the lever 190 supports the lock bolt in a depressed inoperative position. When the treadle rod is released and permitted to move upwardly in stopping the machine, the corresponding upward movement of the lever arm 186 and roller 188 permits the lever arm 190 to move rearwardly under the influence of spring 198 to raise the lock bolt into position in which it will engage within the recess formed in the free arm of the clutch controlled bell-crank lever 156 to engage the sewing cam shaft reversing and stopping clutch 150.

The pattern cam shaft of the machine generally designated at 210 is driven from the main starting and stopping clutch through connections which include the clutch member 130 and vertical driving shaft 124, a secondary clutch, a variable speed mechanism and a reduction gear train which may be of ordinary description. As best shown in Figs. 11, 18 and 19, the drive shaft 124 is connected at its lower end through a ratchet toothed clutch to drive a stub shaft 212 in axial alignment therewith. The secondary clutch referred to, comprises a driving clutch element 214 keyed to turn with and to slide axially upon the drive shaft 124 for engagement with a cooperating clutch member 216 fast on the shaft 212 to which is secured a driving ratchet 218 forming part of the variable speed driving mechanism for the pattern cam shaft 210. The ratchet is arranged to be engaged by four pawls 220 on three-cornered levers 222 pivotally supported on a circular plate 224 forming part of a sleeve member 226 which is loosely mounted to turn on the shaft 212, and comprises the driven element of the variable speed mechanism. The sleeve member 226 is externally supported in a bushing 228 carried in a bearing formed in the top surface of the middle section 102 of the machine casing. Each of the three-cornered levers 222 is provided with an upwardly extending roller pin 230 engaging within a circular cam track 232 formed in the under side of an adjustable eccentric ring member 234 carried on a lever 235. The rate of rotation of the driven sleeve member 226 with relation to the drive shaft 124 and stub shaft 212 is determined by the eccentric adjustment of the ring 234. For effecting this adjustment there is provided on the side of the ring 234 opposite the pivot 236, a gear segment 238 which meshes with a gear segment 240 formed in a short lever arm 242 rigidly secured to a vertical rock shaft 244. The angular position of the rock shaft 244 is determined in accordance with the size of shoe being operated upon through the machine sizing device connected with the jack feed lever, as hereinafter more fully set forth.

As best shown in Figs. 18 and 82 of the drawings, the drive is taken from the sleeve member 226 to the pattern cam shaft 210 through a series of reduction gears including a gear 246 formed on the lower end of the sleeve 226, a gear 248 meshing therewith carried on a stub shaft 250, and thence through a gear 252 on the stub shaft 250 which meshes with a gear 254 on a vertical drive shaft 256. Also mounted on the shaft 256 are a number of driving gears 258 which mesh with a gear 260 on the pattern shaft 210 in any of its vertically adjusted positions.

The drive for the one revolution eccentric which is employed in stopping the machine to perform a number of auxiliary operations, and the reverse drive for the pattern cam shaft 210 are taken from the lower end of the vertical drive shaft 117 through a planetary gear train and a clutch device having neutral position and alternative engaging positions for driving the eccentric and the reverse driving connections for the pattern cam shaft. As best shown in Figs. 11, 14, 18 and 19, the drive shaft 117 is provided adjacent its lower end with a spur driving gear 264 which engages with three planetary gears 266 carried on a spider 268 loosely sleeved to turn on the lower end of the drive shaft 117. Each of these gears also engages an internal stationary gear 270, so that the spider is caused to rotate with but at a slower rate than the drive shaft 117. Each of the gears 266 is integrally formed with a second gear 272 of smaller diameter which meshes with an internal gear 274 carried on the upper end of a short clutch supporting shaft 276 which is located directly beneath and in axial alignment with the drive shaft 117. The shaft 276 is continuously driven through the planetary mechanism above described. An eccentric cam 278 fitted with an eccentric strap 279 is loosely sleeved to turn on a bushing support 280 for the shaft 276, and is provided with ratchet-shaped clutch teeth 282 for engagement with an eccentric and reverse driving clutch member 284 which is keyed to turn with and slide axially upon the shaft 276. Upward movement of the eccentric clutch member 284 to the engaging position shown, for example, in Fig. 11, causes the eccentric 278 to be driven from the drive shaft 117. For driving the pattern cam shaft in a reverse direction, the clutch member 284 is arranged to be moved downwardly into engagement with a ratchet-toothed clutch element 286 having formed integrally therewith a pattern shaft reverse driving gear 288 which meshes with the gear 252 forming part of the driving gear train for the pattern cam shaft 210 (see Figs. 1, 18 and 82).

In accordance with the present invention, applicant provides an improved mechanism for positioning the eccentric and reversing clutch member 284 and the pattern cam shaft secondary clutch 214 with relation thereto for a number of operating conditions of the machine which include a running and stop position, an eccentric drive position, a pattern cam shaft reverse drive position, and a manual adjustment position in which the sewing cam shaft of the machine and sewing instrumentalities actuated thereby may be turned over by hand without affecting the position of the pattern cam shaft. The clutch shifting mechanism, as shown in Figs. 11, 14, 15, 16 and 17, comprises a forked clutch shifting lever 290 formed on a sleeve member 292 loosely mounted to turn on a control rock shaft 294, and having supported thereon tapered rollers 296 which engage in an annular groove 298 in the eccentric clutch member 284. For shifting the pattern cam shaft secondary clutch member 214, there is provided a forked clutch shifting lever 300 which is secured to a pivot pin 302, and has mounted thereon rollers 304 which engage in an annular groove 306 in the clutch member 214. The position of the clutch shifting lever 300 and pattern cam shaft secondary clutch 214 is determined in accordance with the position of the eccentric clutch shifting lever 290 by means of an actuating connection from the sleeve member 292, which comprises a forwardly extending lever arm 308 formed on the clutch sleeve 292, and provided at its forward end with a laterally extending roller 310 which engages in a V-shaped notch 312 formed in a downward extension of the auxiliary clutch shifting lever 300. The relationship of the V-shaped notch 312 and roller 310 is such that the secondary pattern cam shaft clutch 214 will be automatically located in the desired open or closed position corresponding to each of a number of predetermined angular positions of the sleeve member 292 and eccentric clutch member 284 controlled thereby, as hereinafter more fully set forth.

The control rock shaft 294 is operatively connected to the clutch sleeve 292 and clutch shifting levers actuated thereby, by means of a pin and slot connection which comprises a stop pin 314 secured to the rock shaft 294 and projecting through a transverse slot 316 in the sleeve member 292. Rocking movement of the sleeve 292 in a clockwise direction with respect to the shaft 294 as shown, for example, in Fig. 16, is limited by engagement of the stop pin 314 with one end of the slot. The limit of rotation of the sleeve 292 in a counterclockwise direction with relation to the control rock shaft 294 is determined by the engagement of an adjustable stop pin 318 supported in an upwardly extending ear 320 on the sleeve member 292 with the stop pin 314 as shown, for example, in Fig. 17. Under conditions of normal operation of the machine, the angular position of the control rock shaft 294 will be that illustrated in Fig. 11, in which the stop pin 314 is vertically located.

The sleeve member 292 weighted by the connected parts including clutch shifting lever 290, clutch member 284 and lever arm 308 is held yieldingly in the limiting position determined by the engagement of the stop screw 318 with stop pin 314 on the control rock shaft 294. A tension spring 322 (see Figs. 5 and 14) connected at its forward end to a pin 324 on the auxiliary clutch shifting lever 300, and at its rear end to a point on the machine frame, tends to rock the shifting lever 300 downwardly, and thereby to maintain the V-shaped notch 312 in operative engagement with the roller 310. For the rest position of the machine, as shown in Fig. 11, and also while the machine is in operation, the clutch sleeve 292, the eccentric clutch lever 290 and the auxiliary pattern shifting clutch control 308 will occupy an intermediate position determined by the engagement of the stop screw 318 with the stop pin 314, in which the eccentric clutch 284 is fully disengaged. For this position of the parts, the roller 310 is located in the bottom of the V-shaped slot 312, permitting the secondary clutch shifting lever 300 to be in its fully depressed position, and with the secondary clutch engaged.

In stopping the machine, the clutch sleeve 292 is arranged to be rotated in a clockwise direction to the position particularly shown in Fig. 15, causing the eccentric clutch member 284 to engage with and positively drive the eccentric 278 through one revolution. As shown in Fig. 15, this rotational movement of the sleeve 292 raises the lever arm 308 and roller 310 which rides outwardly on the upper side of the V-shaped notch 312, forcing the clutch shifting lever 300 upwardly to disengage the secondary pattern cam shaft clutch 214. The mechanism through which the engagement of the eccentric clutch 284 and the disengagement of the secondary pattern cam shaft clutch 214 is effected, comprises a rearwardly extending arm 326 which is formed on the left hand end of the sleeve member 292, and supports a notched detent member 328 for engagement with a corresponding notch 330 in a vertically movable eccentric clutch control rod 332. At its upper end the control rod 332 is pivotally connected to one arm of a bell-crank 334, the other arm of which is connected by a link 336 with the lock bolt carrier 166. In stopping the machine the lock bolt carrier, as above pointed out, is moved forwardly and then rearwardly, imparting to the control rod 332, a corresponding upward and downward movement which is operative to engage the notch 330 with the detent 328, and thereafter to depress the detent 328 and lever arm 326 to engage the eccentric clutch, as shown in Fig. 15. At the end of one revolution of the eccentric 278, the lower end of the control rod 332 is moved rearwardly to release the detent 328, as hereinafter more fully described, permitting the clutch mechanism to again return to the position shown in Fig. 11, determined by the engagement of stop screw 318 with stop pin 314, in which the eccentric clutch is in an intermediate neutral position, and the secondary pattern cam shaft clutch 214 is engaged.

In accordance with the invention, a manually operable control is provided for the clutch control mechanism above described, shiftable for effecting a reverse drive of the pattern cam shaft, or alternatively for entirely disconnecting the pattern cam shaft and eccentric drives to permit the manual turning over of the sewing head. To this end there is provided on the right hand end of the control rock shaft 294, an upwardly and forwardly extending manual control lever 338 by means of which the control shaft 294 and stop pin 314 associated therewith, may be rocked forwardly permitting the sleeve member 292 and associated clutch shifting levers to move to the positions shown in Fig. 16, to drive the pattern cam shaft in a reverse direction, or rearwardly causing the sleeve member 292 and associated clutch shifting levers to assume the positions shown in Fig. 17, to operatively disconnect both the eccentric clutch 284 and the auxiliary clutch 214. A torsion spring 340 coiled about a fixed pin 342 and anchored at one end against the machine frame, and with its other end engaging with a pin 344 on the manual control lever 338, tends to rock the lever 338 and control rock shaft 294 upwardly and rearwardly in a clockwise direction to one of two positions determined by a detent lever 346. The detent lever 346 is mounted to turn on a pivot pin 348 carried on the right side of the machine casing, and is provided with a control handle 350. The detent lever has two alternative positions shown in full lines and in dot-and-dash lines in Fig. 5. In the full line position shown, the detent lever engages against and supports the manual control lever 338 in normal running position in which the stop pin 314 on the rock shaft 294 extends vertically as shown, for example, in Figs. 11 and 15. In the dot-and-dash position shown, the detent lever 346 has been rotated counterclockwise through 90°, thus allowing the manual control lever to be moved upwardly and rearwardly under the influence of its spring 340 to the dot-and-dash position shown in Fig. 5, against the hub portion of the detent lever 346. For this position of the manual control lever 338, the sleeve member 292 and associated clutch shifting levers will have been rocked to the position shown in Fig. 17, in which all of the clutches are disengaged. Alternatively, the operator may pull the manual control 338 forwardly against the pressure of the spring 340, causing the rock shaft 294 and stop pin 314 to be correspondingly rocked in a forward direction to shift the eccentric clutch 284 to reverse position. In the reverse position shown in Fig. 16, the roller 310 riding outwardly on the lower side of the V-shaped notch 312, forces the secondary clutch lever 300 upwardly to disengage the secondary clutch 214. In the manual control position shown in Fig. 17, the clutch sleeve 292 will have been rocked rearwardly to a slight extent through the engagement of the stop screw 318 with the stop pin 314 to a position in which the eccentric clutch member 284 will be still disengaged from the eccentric 278, and in which the roller 310 will have moved upwardly on the upper side of the V-shaped notch 312 sufficiently to disengage the secondary clutch 214.

The starting of the machine, as previously pointed out, is effected by a downward movement of the treadle rod 176 which rocks the shaft 172 to engage the main clutch 130 and to withdraw the lock bolt 164. This movement is effected through actuating connections including a foot treadle 352 carried on the forward end of a treadle lever 354 in the machine base (see Figs. 1, 5, 10, 23, 24, 25, 29, 31 and 32). The treadle lever 354 is secured at its rear end to a transversely extending rock shaft 356 which also carries a forwardly extending lever arm 358 to which is pivoted the lower end of a vertically extending connecting rod 360. At its upper end the connecting rod 360 is pivotally secured to a laterally extending lever arm 362 (Figs. 23 and 25) having the outer end thereof journalled to receive the lower end of the treadle rod 176. A collared nut 364 at the lower end of the treadle rod 176 is arranged to bear against the under side of the lever arm 362, so that downward movement of the lever 362 with the foot treadle 352 will act to depress the treadle rod 176. The treadle rod is then held in its depressed operating position by the engagement of the forward end of a latch bar 366 with a notch 368 in the treadle rod 176 (see Figs. 5 and 19).

The machine is stopped automatically upon the completion of the sewing operation about the margin of the shoe sole, by means of mechanism forming part of the stop motion of the machine which acts to withdraw the latch bar 366 from engagement with the notch 368 in the treadle rod 176, and thereby permits the opening of the main clutch 130 and the release of the lock bolt 164 for operatively connecting the sewing cam shaft clutch shifting lever 156 with the lock bolt carrier 166. As best shown in Figs. 19, 20, 21 and 22, the latch bar 366 is pivotally connected at its rear end with a treadle rod release lever 370 which extends laterally of the machine, and is loosely mounted to turn on a vertically extending pivot shaft 372. A tension spring 374 connected at one end to a pin 376 on the treadle rod release lever 370 and at its other end to a point on the machine frame, tends to move the lever 370 in a direction to engage the latch bar 366 with the notch 368 in the treadle rod 176.

The mechanism for automatically throwing the stop motion into operation is actuated directly from the pattern cam shaft 210 after it has made nearly a complete revolution. To secure this result, a block 378 (see Figs. 19, 20, 21 and 22) is secured to the upper surface of the gear 260 at the upper end of the pattern cam shaft, which block after the pattern cam shaft has made nearly a complete revolution, engages with a wide-faced pawl 382 pivoted to a laterally extending arm 384 of a vertically disposed eccentric rock shaft 386, and moves said pawl outwardly from the gear 260 against the pressure of a tension spring 388 connected between the pawl 382 and a horizontally disposed plate 390 forming part of the machine frame. A roller 380 mounted on the upper edge of the pawl 382 is arranged for engagement with the edge of the fixed plate 390 to limit the movement of the pawl toward the gear 260 under the influence of spring 388. The outward movement of the pawl causes a cam surface 392 formed on a fixed projection 394 of the pawl 382 to engage with a cam roll 396 on the treadle release lever 370, moving the treadle release lever positively in a counterclockwise direction to withdraw the latch bar 366 from engagement with the treadle rod 176. The main clutch 130 is now permitted to open, and the lock bolt 164 is released, operatively connecting the sewing cam shaft shifting lever 156 with the lock bolt carrier 166. As previously pointed out, the subsequent forward and back motion imparted to the lock bolt carrier 166 is employed to impart an upward and downward movement to the eccentric clutch control rod 332 (see Figs. 11 and 19) to engage the eccentric clutch 284 with the eccentric 278 which is now driven through one revolution to impart a clockwise followed by a counterclockwise rocking movement to the eccentric rock shaft 386. In order to effect this movement, the eccentric strap 279 (see Fig. 19) is provided with a lateral extension which is pivotally connected to a lever arm 398 secured to the upper end of the eccentric rock shaft 386.

In order that the vertical reciprocating movement of the eccentric clutch control rod 332 may be rendered operative to engage the clutch, and also to provide means for subsequently disconnecting the eccentric drive after one revolution of the eccentric 278, the eccentric clutch control rod 332 is connected at its lower end to be swung forwardly and rearwardly about its pivotal connection with the bell-crank lever 334. As best shown in Figs. 11 and 19, the lower end of the eccentric control rod 332 is slidably engaged between two vertically extending pins 400 on a laterally extending eccentric control lever 402. The lever 402 is supported to turn on the fixed pivot 372 directly above the treadle release lever 370, and is connected to have only a limited movement with relation thereto. To this end the eccentric control lever 402 has formed on opposite sides of the hub portion thereof, shouldered portions 406 and 408, the shouldered portion 408 being engaged by a spring-pressed plunger 410 carried in a block 412 secured to the upper side of the treadle release lever 370 which serves to maintain the shouldered portion 406 in yielding engagement with an abutting shoulder 414 on the block 412. During the rocking movement of the treadle release lever 370 to its release position, the associated eccentric control lever 402 is biased also in a forward direction by the action of the spring-pressed plunger 410, so that during the subsequent upward movement of the eccentric control rod 332, this rod will be swung forwardly to engage the notch 330 with the notched portion 328 of the rearwardly extending arm 326 forming part of the eccentric clutch shifting lever.

With the present construction, connections are provided which are rendered operative by the rocking movements imparted to the eccentric rock shaft 386 to shift the eccentric control lever 402 rearwardly against the pressure of the plunger 410, and thereby to disengage the eccentric clutch 284 at the completion of one full revolution of the eccentric. The connections for effecting the disengagement of the eccentric drive comprise a short lever arm 416 on the eccentric rock shaft 386 which during the clockwise rotational movement of the eccentric rock shaft engages with but passes a yieldingly supported detent 418 on the eccentric control lever 402, and thereafter on its return movement in a counterclockwise direction as the eccentric completes one full revolution, positively engages the detent, thereby shifting the eccentric control lever 402 rearwardly, thus disengaging the eccentric control rod from the clutch shifting lever, and permitting the eccentric clutch 284 to return to its intermediate neutral position.

The rocking movement of the eccentric rock shaft 386 has for one of its functions to complete the rotation of the pattern cam shaft. During the clockwise movement of the eccentric rock shaft 386, the pawl 382 is withdrawn to a position in which the pawl rides off of the rear end of the block 378, and the fixed projection 394 is positioned behind the same, as shown in dot-and-dash lines in Fig. 22. During the subsequent counterclockwise rotation of the eccentric rock shaft, the pawl 382 is rendered operative to continue the rotation of the pattern cam shaft to its initial starting position.

The present machine is provided with a shoe supporting jack which may be of well known construction as that, for example, illustrated in the patent to Cross No. 2,056,714, dated October 6, 1936. The jack comprises a toe supporting arm 420 rigid with a spindle 422 and a heel supporting arm 424 pivoted at its lower end on the upper end of the spindle 422. With the present construction, the jack is mounted on a supporting structure which, as best shown in Figs. 3, 23 to 25, and 33 to 36, comprises a horizontal supporting arm 426 in the forward end of which the lower end of the jack spindle is mounted to rotate and to swing freely on gimbal joints, a pitch support lever 428 on which the arm 426 is mounted to swing vertically, and a roll support lever or frame 430 pivotally mounted at its lower end in the machine base so as to be capable of swinging about a horizontal axis, and upon which the support 428 is mounted so as to swing about a substantially vertical axis. These parts are so arranged as to permit free rotational movement of the jack and its supporting spindle 422 on its gimbal joint, and for imparting forward and back or roll tipping movements, and longitudinal or pitch tipping movements to the jack over a wide range of angles adaptable to the most extreme lasts, to properly position the shoe with relation to the sewing instrumentalities as the point of operation is transferred about the shoe.

Feeding movements are imparted to the shoe by means of a feed lever 432 located on the left side of the machine outside of the machine casing, and pivotally supported at its rear end for lateral swinging movements on a cross pin 434 on a laterally extending rock shaft 436 journalled in a bearing 438 at the rear of the machine. At its forward end the feed lever 432 is connected by means of a curved link 440 with the toe support 420 of the jack.

In the illustrated machine, an improved construction and arrangement of the jack supporting and actuating mechanism is employed, and of the operating connections therefor from the pattern cam shaft of the machine, which provides for an extremely compact and at the same time sturdy and efficient arrangement of these parts within the relatively slender column-shaped base of the machine. The pattern mechanism by means of which the various positioning movements are imparted to the jack, comprises the pattern cam shaft 210 which in the present machine is mounted rearwardly of the jack supporting structure in the central rear portion of the machine casing, and has supported thereon in accordance with the usual practice, a bank of pattern cams comprising six alternatively available sets of operating cams. The cam actuated levers cooperating with the cams are in the present construction supported on a vertical pivot shaft 442 located at the left side of the pattern cam shaft 210, each of the cam levers being arranged to extend laterally and with their cam engaging rollers in contact with the front side of the associated cams.

Longitudinal pitch tipping movements are imparted to the jack by means of a pitch cam lever 444 supported adjacent the lower end of the pivot shaft 442 and having intermediate its length an offset portion forked to receive a cam roller 446 for engagement with a cooperating pitch cam 448 on the pattern cam shaft. The pitch cam lever is connected by a forwardly extending link 450 to a lateral extension of the support 428, the connection between the link 450 and the support 428 being located substantially on the line of centers of the pivot bearings 452, 454 of the frame 430.

The disclosed arrangement of the pitch cam lever and the linkage connections with the pitch supporting lever for the jack, has an important advantage over the prior art constructions in that a positive connection is provided between the pitch cam and the pitch supporting lever for positively moving the lower end of the jack spindle in the direction of feed against a resilient take-up device which acts to urge the several jack operating connections including the pitch cam lever against the surfaces of their actuating cams. In prior art constructions in which the follower connections from the pitch cam operated positively for moving the lower portion of the jack in a direction opposed to the feed, and movement in the direction of feed was achieved by the action of a resilient take-up means, it was found that any substantial increase in resistance or obstruction to the feed of the shoe would tend to rock the jacked shoe longitudinally in a counterclockwise direction from its proper operating position. With applicant's improved construction, such rocking movement is prevented through the intervention of the positively acting connections from the pitch pattern cam. Applicant's improved construction, in which the supporting pivot shaft 442 is located at the left side of the machine, that is, to that side of the machine from the pattern shaft with the feed lever, has the further advantage that applicant is enabled to employ a pitch cam having a contour such that the pitch cam lever 444 drops inwardly toward the center of the pattern cam shaft as the jack is returned to its initial starting position, thus greatly facilitating the operation of the auxiliary mechanism to complete the rotation of the pattern cam shaft to its initial starting position. Applicant also provides a snubber device 455 for slowing the movement of the pitch cam lever 444 to its initial starting position. The snubber device comprises relatively movable parts, one being secured to the machine frame, and the other to the pitch cam lever 444. The snubber device 455 may be of ordinary construction, and is similar to snubber devices 457 and 459 provided for the turn and feed cam levers respectively.

Forward and back or roll tipping movements are imparted to the jack by means of a roll cam lever 456 supported on the pivot shaft 442 above the pitch cam lever 444, and having a roller 458 which engages with a cooperating roll cam 460 on the pattern cam shaft 210. The roll cam lever 456 is connected by a link 462 to an intermediate portion of the frame 430, this connection being located substantially on a vertical line of centers of the bearings 464, 466 for the support 428 in the frame 430. As best shown in Figs. 36 and 41, the roll support lever 430 takes the form roughly of a L within which the pitch support lever 428 is mounted to turn. The axis of rotation of the pitch support lever 428 intersects the axis of rotation of the roll support lever 430, and has its lower bearing 466 located substantially beneath the rotational axis of the roll support lever 430, thus providing a sturdy, compact and yet most efficient construction and arrangement of these parts.

The mechanism for imparting turning movements to the jack comprises a turn cam lever 468 supported on the pivot shaft 442 above the roll cam lever 456, and provided with a roller 470 arranged to engage with a cooperating turn cam 472. A forward extension of the turn cam lever 468 has formed thereon a gear segment 474 which meshes with a pinion 476 (see Figs. 23 and 25) carried on the upper end of a cone-shaped pulley member 478. The member 478 is supported to turn on bearing pins 480, 482. Rotational movement is imparted to the jack from the pulley member 478 by means of a cord 484 which is secured at one end to a pulley 486 formed on the lower end of the member 478, and thence passes around an idler pulley 488 on the frame 430, an idler pulley 490 on the support 428, an idler pulley 492 on the jack supporting arm 426, and around a wheel 494 supported to turn with the jack spindle 422. Thence the cord extends rearwardly over an idler pulley 496 and downwardly to a weight 498, which serves to maintain an adequate tension on the cord. It will be noted that the several idler pulleys are so arranged that the cord is carried through the line of centers of each of the bearing supports for each of the frame 430, support 428 and jack supporting arm 426, so that the tension on the cord will have no tendency to disturb or affect the operation of these parts as controlled by their cooperating pattern cams. From an inspection of Fig. 23, it will be noted that the two legs of the cord 484 extending rearwardly from the wheel 494 by which the jack is rotated, extend rearwardly toward the right side of the machine, so that the tension on the cord has a tendency to swing the supporting arm 426 and the base of the jack to the right, and thereby to maintain the pitch cam lever 444 in engagement with its cooperating cam 448.

Applicant provides a novel arrangement of the wheel 494 and the supporting gimbal joints for the jack spindle which is simple and sturdy in construction, and is adapted to permit an extreme range of angular movement of the jack spindle with respect to its supporting arm 426. As best shown in Figs. 33 to 35 inclusive, the wheel 494 is supported on a hollow ring type ball bearing 493 including a ring-shaped raceway which is rigidly secured at its outer periphery to a ring-shaped support 495 formed in the outer end of the supporting arm 426. The jack spindle 422 extends downwardly through the axis of rotation of the wheel 494, and is provided at this point with a bifurcated portion to receive the parts of the gimbal joint. The gimbal joint comprises a gimbal pin 497 passing through the bifurcated portion of the jack spindle 422 and having its ends supported in bearings formed in a ring plate secured to the upper face of the wheel 494. Angular movement of the jack spindle about a transverse axis takes place on a gimbal pin 499 pivoted on the gimbal pin 497 and having its ends journalled in the bifurcated portion of the jack spindle 422.

With the present construction there is provided a novel and more compact construction and arrangement of the operating connections for imparting feeding movements to the jack, for adjusting this mechanism in accordance with the size of shoe being operated upon, for positioning the variable speed mechanism through which the pattern cam shaft is driven, and for locking these parts in their adjusted position. As best shown in Figs. 4, 18 and 19, the feed lever 432 is connected intermediate its length by means of a link 500 connected with a second link 502 which is in turn connected to the forward extension of a feed cam lever 504 supported on the pivot shaft 442 disposed from the pattern cam shaft toward the left side of the machine with the feed lever. The feed cam lever 504 is provided with a roller 506 engaging with a cooperating feed cam 508 (see Figs. 19 and 39) on the pattern cam shaft 210. The links 500 and 502 are arranged at an acute angle with relation to one another, being pivotally connected together by a pivot pin 509 and to the free end of a double link 510 which serves as a guiding link for the pivotal connection 509 of the links 500, 502. The link 510 is fulcrumed at 511 on a fulcrum carrying frame lever 512 which is mounted to turn on ball bearings 521 and 514 (see Fig. 18). Motion is transmitted from the feed cam lever 504 through links 502 and 500 to the feed lever 432, the extent of this motion being determined in accordance with the direction of movement imparted to the pivotal connection 509 by the guiding link 510. To adapt the machine for operation upon shoes of different sizes, the frame lever 512 is adjustable about its pivot to change the position of the fulcrum 511 of the guiding link 510. The fulcrum carrying frame lever 512 is held in locked and adjusted position during the operation on the shoe by mechanism comprising a laterally extending rod 516 connected at one end by means of a connecting pin 517 to the fulcrum carrying frame lever 512, and at its other end arranged to be engaged by a locking device indicated in dotted lines at 518 in Fig. 19, and hereinafter more fully described in connection with Fig. 27. During the operation on the shoe, the locking device is operative to support the fulcrum carrying frame lever 512 in locked position. The placing of a new shoe on the jack acts to release the locking device 518, as will hereinafter appear, so that the fulcrum carrying frame lever 512 is unlocked and adjustment of the mechanism for actuating the feed lever can be made by movement of the jack to starting position. The fulcrum carrying frame lever is locked in position on starting the machine through connections controlled from the starting treadle.

With the present construction, the position of the fulcrum carrying frame lever 512 is employed also to effect an adjustment of the variable speed pattern shaft driving mechanism in accordance with the size of the shoe being operated upon. Referring specifically to Figs. 18 and 19, it will be seen that there is secured to the lower end of the variable speed control rock shaft 244, a lever arm 520 having at its outer end a slotted portion which engages the upper end of the connecting pin 517 on the fulcrum carrying frame lever 512, so that any pivotal adjustments of the fulcrum carrying frame lever 512 will effect a corresponding adjustment in the angular position of the variable speed rock shaft 244 and eccentric cam ring 234 controlled thereby.

In the illustrated machine, an improved device is provided for exerting a force on the fulcrum carrying frame lever 512 and on the feed connections generally, tending to move the fulcrum carrying frame lever 512 toward one limit of its adjustment, and to keep the feed cam lever 504 in engagement with its cam. In the construction illustrated, this force is applied by means of a long coil torsion spring 522 (Figs. 23 to 26, 28, 31 and 32) carried in the base portion of the machine on a transversely extending shaft 525 rotatably supported at one end in the bracket 526, and at its other end in a bearing 528 secured to the right side of the machine casing. The spring is connected at one end to a flanged drum element 524 pinned to the shaft 525. Adjustment of the spring is effected by rotating the shaft 525, a square socket 531 being provided in the end of the shaft to receive a crank or similar tool for this purpose. The shaft 525, flanged drum 524, and attached spring 522 are secured in adjusted angular position by the engagement of a pin 529 journalled in the machine frame with one of a series of holes 533 formed in the flanged portion of the drum 524. At its other end the spring 522 is connected to a cross pin 530 on a pulley 532 loosely mounted to turn on the shaft 525. The pin 530 serves also as an anchor for one end of a metal strap 534 which passes upwardly around a pulley 536 on the bell-crank lever 962, and then rearwardly around an idler pulley 538 carried on a lug 539 forming part of the casing for a snubber of ordinary description associated with the feed cam lever 504. Thence the strap 534 extends laterally around a pulley 540 carried on a rearward extension 542 of the fulcrum carrying frame lever 512, and around a wheel 544 secured to the pivot shaft 514 for the lever 512, and then laterally to the feed lever 432 to which it is anchored. The torsion spring 522 and steel strap 534 arranged as above set forth, provide an evenly adjusted pressure on the feed connections including the feed arm 432, feed cam lever 504 and fulcrum carrying lever 512, and is adapted, in cooperation with the snubber above referred to, to insure a smooth and effortless operation of the feed lever in returning the jack to its initial position without shock or jar of the machine parts. This arrangement also provides an evenly applied pressure against which the operator is able to adjust the position of a jacked shoe longitudinally with certainty and accuracy when presenting the shoe in the first instance to the sewing mechanism.

The jacked shoe is forced yieldingly upwardly into operating position with relation to the shoe sewing mechanism during the operation about the shoe, and is then moved positively downwardly out of engagement therewith in stopping the machine, by mechanism which in the present construction comprises a vertically extending jack supporting rod 546 (see Figs. 1, 2, 3, 23, 24, 25, and 31 and 32) connected at its upper end by means of a universal joint with the under side of the jack supporting arm 426, and at its lower end by means of another universal joint to the forwardly extending arm of a bell-crank lever 548 which is loosely supported to turn on the pivot shaft 356. A pair of heavy tension springs 550 connected at one end to the downwardly extending fork arms of the bell-crank 548 and at their other ends to the machine frame, tend to move the lever 548 and supporting rod 546 upwardly to maintain the jacked shoe yieldingly in engagement with the sewing mechanism.

The mechanism for controlling the operation of the jack includes a toggle mechanism which is arranged to be moved to a straightened position in stopping the machine to move the bell-crank lever 548 and jack supporting rod 546 downwardly to move the jacked shoe out of engagement with the sewing devices. The eccentric drive above described, has for one of its functions in connection with the stopping of the machine to straighten this toggle and thereby to move the jacked shoe away from the sewing devices. As best shown in Figs. 24, 25, 26, and 29 to 32 inclusive, of the drawings, the toggle mechanism comprises pivotally connected toggle arms 552 and 554, the toggle arm 552 being pivotally connected to the bell-crank lever 548, and the toggle arm 554 being secured to a laterally extending rock shaft 556 carried in a supporting plate 558 (see Fig. 29). Abutting stop surfaces formed on the rear side of the toggle arms 552 and 554 are arranged to support the toggle arms in their straightened locking position. A tension spring 560 connected at its forward end to the toggle arm 554 and at its rear end to a point on the bell-crank lever 548, tends to rock the toggle arms rearwardly to break the toggle. The tension of this spring is, however, insufficient to break the toggle until it has been moved from its locked position to a substantially straightened and overbalanced position. This mechanism including the toggle arms 552 and 554 and spring 560 are so arranged that a downward pressure or jiggling action on the jack applied by the operator when jacking a new shoe through its action to straighten the toggle, will serve to break the toggle and allow the shoe to be forced upwardly into position against the sewing mechanism by the springs 550 acting on the bell-crank lever 548.

The connections through which the eccentric drive is rendered operative in stopping the machine to straighten the toggle and thereby to move the jacked shoe downwardly away from the sewing mechanism, comprise a vertically extending toggle control rod 562 which at its lower end passes through an aperture in a forwardly extending arm 564 formed integrally with the sleeve hub of the toggle link 554. A collar 566 supported on the lower end of the toggle control rod 562 by means of a pair of check nuts, is rendered operative by upward movement of the toggle control rod to engage with the under side of the arm 564, and to move the toggle to its straightened position. The toggle control rod, as best shown in Figs. 1, 3, 14, and 18 to 22, is connected to one arm of a bell-crank lever 568, the other arm of which is connected by a link 570 with a lever arm 572 on the eccentric rock shaft 386. The clockwise rotational movement of the eccentric rock shaft to the dot-and-dash position shown in Fig. 22, acts through this connection to move the toggle to its straightened and locked position. As the jack supporting arm 426 is moved downwardly by the straightening of the toggle 552, 554, the jack is permitted to fall outwardly away from the machine under the influence of a tension spring 574 connected between a downward extension 576 of the jack spindle 522 and the jack supporting rod 546. The extent of this outward movement of the jack is limited by a chain 578 connected between the jack spindle 422 and a stationary point on the arm 426.

The device for locking the feed connections and the variable speed drive for the pattern cam shaft in their adjusted positions in accordance with the size of shoe being operated upon, is arranged to be locked by the downward movement of the foot treadle 352 in starting the machine, and to be again unlocked to permit the adjustment of this mechanism during the jacking of a new shoe by the breaking of the toggle 552, 554 in moving the newly jacked shoe to its operating position. The connections for locking and unlocking the locking device comprise a vertically extending rod 580 (see Figs. 26 and 27) which is connected at its upper end to a cross yoke 582 having pin and slot connections with two small locking levers 584 carried in the block 518 of the locking device. Downward movement of the rod 580 serves to bring the cammed hub portions of the locking levers 584 into locking engagement with the locking rod 516. At its lower end the rod 580 is connected to a laterally extending arm 586. A compression spring 588 inserted between a collar 590 on the lower end of the rod 580 and the under side of the lever arm 586 through which the rod 580 passes, provides a yielding connection through which a locking pressure is maintained on the locking levers 584. The lever arm 586 is arranged to be moved downwardly by the action of the starting foot treadle 352 to apply the locking device, and then to be latched in this position through connections which include a vertically extending lock control rod 592 connected at its upper end to the lever arm 586 and at its lower end connected with the treadle actuated lever arm 358. The rod 592 passes through an aperture in the lever 358, and is provided at its lower end with a collar 594 arranged to engage with the under side of the treadle actuated lever arm 358 (see Figs. 24, 25, 31 and 32). The control rod 592 when moved downwardly by the foot treadle is retained in locking position by the engagement of a latch lever 596 above the offset lower end of a latch arm 598 adjustably secured to the control rod 592 (see Fig. 31). The latch 596 is urged yieldingly toward latching position by a tension spring 600 connected at its rear end to an upwardly extending arm of the latch lever 596, and at its forward end to a fixed point on the machine frame. A tension spring 602 connected at its lower end to the locking control rod 592 and at its upper end to a point on the machine frame, tends to move the locking control rod 592 upwardly when released from the latch 596 to disengage the feed connection locking device.

The breaking of the toggle 552, 554 operates to release the latch 596 to release the locking device 518, and thereby to permit re-adjustment of the feed connections and variable speed pattern shaft drive mechanism in accordance with the size of shoe being operated upon, through connections which comprise a spring-pressed trip plunger 604 carried in a rearwardly extending arm 608 secured to the rock shaft 556 for supporting the toggle member 554. The trip plunger 604 is keyed against rotational movement, but is permitted a lengthwise sliding movement within the lever arm 608 by means of a pin 610 in the plunger which extends through a slot 612 in the lever arm 608. The trip plunger 604 is arranged to cooperate with a forwardly extending trip arm 614 forming part of the latch lever 596. During the straightening movement of the toggle 552, 554 to the position shown in Fig. 31, the trip plunger 604 snaps by the trip arm 614 passing over the cammed surface thereof. The subsequent breaking movement of the toggle to the position shown in Fig. 32, and corresponding upward movement of the trip plunger 604, causes the plunger to positively engage the trip arm 614 to disengage the latch 596, so that the lock control rod 592 is permitted to move upwardly under the influence of its spring 602 to disengage the lock.

Applicant provides a novel construction and arrangement of the supporting and control means for the pattern cam shaft which will facilitate the removal and replacement of one bank of pattern cams for another in the machine. Referring specifically to Figs. 42 to 52 inclusive, the pattern cam shaft 210 takes the form of a hollow cylinder which is sleeved to turn on a supporting shaft 616 slidably supported adjacent its upper end in a bearing 618, and at its lower end fitted within a sleeve member 620 which is in turn carried in a bearing 622 in the machine base. The sleeve member 620 is provided at its upper end with an enlarged annular portion 624 which provides support for an end thrust ball bearing 626 which carries the weight of the pattern cam shaft 210 and associated cam. The sleeve member 620 is arranged to slide vertically in the bearing 622 and is keyed against rotational movement with relation thereto by means of a key member 628 which engages in a keyway formed in the sleeve 620. The sleeve member 620 and supporting bearing 626 are normally connected to be supported by and to be moved vertically with the shaft 616 whereby vertical adjustment of the pattern cam shaft 210 is effected to position alternative sets of operating cams in operating position with relation to the respective cam rollers. The connection between the sleeve member 620 and shaft 616 comprises a transverse key member 630 located on the sleeve member 620 which engages within a transverse slot 632 adjacent the lower end of the shaft 616 for one angular position of the shaft 616 as illustrated in Figs. 44, 47, 49 and 50. As best shown in Fig. 52, the lower end of the shaft 616 is slabbed off on one side designated at 634, so that rotation of the shaft 616 in a counterclockwise direction through 90° will align the key 630 with the slabbed off portion 634 to operatively disconnect the shaft from the sleeve, and thereby permit the movement of the shaft vertically from the pattern cam shaft 210 for effecting the removal of the bank of cams from the machine (see Figs. 45, 48 and 51).

Vertical adjustment of the shaft 616 and the pattern cam shaft 210 associated therewith, is effected by means of a manually operable lever arm 636 supported to turn on a stationary pivot 638, and having formed on the hub portion thereof an internal gear 640 meshing with a pinion 642 on a transversely extending shaft 644. A pinion 646 on the shaft 644 meshes with a rack 648 on the upper portion of the shaft 616. The manually operable lever arm 636 is provided at its outer end with a control handle 650 formed integrally with a spring-pressed detent for engagement with recesses 652 corresponding with each of the vertically adjusted positions of the shaft 616 and pattern cam shaft 210.

In order to render the pattern mechanism of the machine accessible to the operator, and also to facilitate the removal and replacement of the bank of pattern cams, a door 654 is provided at the rear side of the machine casing, hinged at its upper and lower ends by means of pivot pins 656, 658, to engage with the bearing lugs on the door. A platform 660 formed on the lower portion of the door is arranged with the door in closed position to extend inwardly around both sides of the sleeve member 620 and the shaft 616, and serves to support the pattern cam shaft 210 and associated cams when the shaft 616 is withdrawn for the removal of the bank of cams. The door can now be swung open carrying with it the cam shaft and associated cams which are thus conveniently removed from the interior of the machine to a position in which they are more easily handled by the operator.

In the illustrated construction, mechanical means are provided for lowering the cam shaft and associated cams onto the platform 660 to facilitate the removal of the same from the machine, and there is additionally provided an interlocking device which prevents the disconnection and removal of the shaft 616 until the cams have been so positioned on the platform 660. This interlocking device is of considerable importance to prevent the inadvertent disconnection of the shaft 616 from the sleeve member 620 for a high position of adjustment of the cam shaft assembly and the consequent dropping of these extremely heavy parts onto the platform 660. The shaft 616 is rotated through 90° in a counterclockwise direction to disconnect this shaft by means of a manual control lever 662 which is sleeved on the shaft 616 and is keyed to turn the shaft by means of a key 664 which engages in a keyway 666 in the shaft 616. A manually operable spring-pressed detent 668 which serves also as a control handle is arranged for engagement alternatively in either of two recesses 652 corresponding to the operating and disconnected angular positions of the shaft 616 with relation to the pattern cam assembly. The control lever 662 is supported on the machine frame between a bearing surface on the machine casing and a cover plate 672 which is held in place by means of two screws 674 which extend downwardly through slots 676 in the hub portion of the lever 662 into the machine casing. For the several adjusted operating positions of the shaft 616 and the pattern cam shaft assembly, the shaft 616 is positively locked against rotational movement to its release position by means of a key 678 formed in the cover plate 672 for engagement with a keyway 680 in the shaft 616. When removal of the cam assembly is to be effected, the manually operable lever 636 is moved to an extreme position designated by a recess 682 causing the shaft 616 to be moved to an extreme downward position in which the cam assembly rests on the platform 660. For this position of the parts, as shown in Fig. 48, the upper end of the shaft 616 is below the level of the cover plate 672, thus disengaging the key 678 from its keyway. For this position of the parts, the shaft 616 is free to be moved in a counterclockwise direction by means of its control lever 662 to disconnect the shaft from the assembly. The shaft 616 can now be fully withdrawn to an extreme high position out of engagement with the pattern cam shaft 210 to permit the opening of the door 654 and the removal of the pattern cam assembly thereon. During the upward movement of the shaft 616, the key 678 in the cover plate 672 will ride in the keyway 666.

To hold the cam levers away from the cams while the cam shaft is being adjusted, the shaft 442 on which the cam levers are mounted is provided with shouldered collars 671 (see Figs. 39, 40 and 41) which are rendered operative by a clockwise movement of the shaft 442 to engage with adjustable stop screws 673 on the hubs of the levers, and to move the cam ends of the levers away from the cams, as shown particularly in Fig. 40. With the present construction, mechanism is provided for rocking the shaft 442 which is controlled by means of a foot treadle 675 located at the right side of the machine (see Figs. 25, 26 and 29). The foot treadle 675 is supported intermediate its length on a pivot pin 677. At its lower end the treadle lever 675 is connected by means of a pair of links 679 to a slide member 681 extending transversely of the base of the machine, and having a pin and slot connection with a lever arm 683 secured to the lower end of the shaft 442, see Figs. 26, 29 and 39. For the normal running position of the parts, the foot treadle 675 remains in the raised inoperative position shown in full lines, for example, in Fig. 25, in which the toggle connection provided by the links 679 and the lower arm of the treadle lever 675 is broken, and the slide 681 is in its position to the extreme right. When it is desired to adjust or to remove the cams, the treadle lever 675 is moved downwardly by the operator to the dot-and-dash position of Fig. 25, thus straightening the toggle, so that the slide 681 is shifted to the left, and the pivot shaft 442 is rocked in a clockwise direction to the position of Fig. 40, to move the levers away from their cams. The downward movement of the treadle lever 675 is limited by engagement of an adjustable stop screw mounted thereon with an abutment of the machine frame. In its straightened condition the toggle connection is self-locking to support the several pattern levers in inoperative position.

The illustrated automatic machine is provided with chainstitch sewing mechanism adapted for sewing the upper and welt to the insole of a welt shoe including a curved hook needle 684, a looper 686, a thread finger 688, a take-up 690, a welt guide 692 and a channel guide 694; these parts having except as hereinafter specifically pointed out, the general construction and arrangement of parts shown in applicant's prior Patent No. 2,155,438, dated April 25, 1939.

As best shown in Figs. 53, 54 and 55, the needle is supported on a needle segment 696 mounted to rotate on a sleeve member 698 slidably supported on a cross pin 700. Work piercing and retracting movements are imparted to the needle through connections which include a needle actuating cam lever 702 supported on a rock shaft 706, and connected by a link 708 to a needle actuating lever 710 loosely sleeved to turn on the rock shaft 950. The actuating lever 710 is connected by a link 714 with the needle segment 696. The needle 684, segment 696, and sleeve member 698 are reciprocated in the line of feed by means of a needle feed cam lever 716 supported intermediate its length on a vertically arranged pivot 718, and having its forward end formed to engage in a slot in the sleeve 698.

The looper 686 comprises a tubular member rigidly mounted at the apex of a triangular lever 719, the rearwardly extending arms of which are supported on cam levers 720 carried on the pivot shaft 706. The forward end of the looper supporting lever is held yieldingly upwardly against a supporting surface 722 on the sewing head by means of a tension spring 724.

The thread finger 688 comprises a hook element formed on the forward end of a curved slide 725 supported for reciprocating movement in a forward and back direction in a guide support 726 (see Figs. 53 to 62 inclusive). The thread finger slide 725 is provided near its rear end with a rack which meshes with a gear segment formed on an actuating lever 728 carried on a stationary pivot 730. The lever 728 is connected by a link 732 with a cam lever 734 supported on the pivot shaft 706. The thread finger is rendered operative in stopping the machine to grip the thread which is then severed between the gripped position and the work by the advance of a thread cutter. In the illustrated construction, the gripping operation is effected by a mechanism operative in stopping the machine to move the thread finger rearwardly to an obnormal rearward position in which the thread finger cooperates with a yieldably supported gripper member 736. The gripper member is slidably mounted in the guideway 726 and held yieldingly in an advanced position by a compression spring 738 seated at one end against the rearward end of the gripper member 736 and at its other end against an abutting portion of the guideway 726.

In accordance with a feature of the present invention, the thread finger 688 is moved to its gripping position in stopping the machine by the reverse movement of the sewing cam shaft. As best shown in Figs. 61 and 62, the thread finger cam lever 734 carries a cam roller 740 which engages with a cam groove 742 in a cam disk 744 on the sewing cam shaft 132. During the reverse movement of the cam shaft in stopping, the cam lever 734 and roller 740 are rocked rearwardly into engagement with an extension 745 of the cam groove 742 to move the thread finger 688 to its abnormal rearward or gripping position. The cam lever 734 is forced positively into this position by means of a connection from the stop arm 167 of the machine, which comprises a link 746 connected at one end to the stop arm and arranged to pass through a journal in a lug 748 formed integrally with the cam lever 734. During the inward movement of the stop arm in engagement with its stop cam groove 175 in stopping the machine, a shoulder 750 on the link 746 positively engages with the lug 748 to force the thread finger actuating cam lever 734 and roller 740 positively into the cam groove extension 745, the final stop position being that shown in Fig. 62.

The channel guide 694 of the present machine takes the form of a downwardly extending arm which is rigidly supported on the sewing head casing 104 (see Figs. 53, 54 and 55).

The thread handling instrumentalities of the present machine include the take-up lever 690 which is supported to turn on a pivot 754 and is given a continuous oscillatory movement by means of a cam on the sewing cam shaft 132 (see Figs. 5, 9, 63, 64 and 65). The take-up lever is arranged to act against a thread tension provided by a tension wheel 756 to draw in the previous stitch and thereafter to draw off additional thread from the supply through the tension. With the present construction, tension is supplied by means of a brake lever 758 and brake shoe 760 which engages with a friction drum 762 secured to turn with the tension wheel 756 under a variable pressure determined by a tension spring 764 connected at one end to an adjusting screw 766 on the brake lever 758 and at its other end to the take-up lever 690. The arrangement is such that the frictional engaging pressure and consequent tension is gradually increased to a maximum as the take-up lever reaches the limit of its up-draw movement, and is decreased to a minimum as the take-up lever reaches its down limiting position during the loop drawing stroke of the needle. This construction and arrangement of the thread tension to provide a variable tension on the thread forms the subject-matter of applicant's Patent No. 2,219,933, issued October 29, 1940. As best shown in Figs. 5 and 9 of the drawings, the thread drawn from the supply passes around the tension wheel 756, thence around an idler pulley 768 on a lever arm 770 forming part of the thread brake stop mechanism hereinafter described, around a take-up pulley 722 on the take-up lever 690 and around an idler 774 to the looper 686.

In accordance with the present invention, mechanism is provided which is rendered operative immediately as the stop motion is thrown into operation to release the thread tension and to maintain the thread tension released while the machine is stopped, and is then rendered operative to engage the tension in starting the machine but only after the first stitch is formed. For disengaging the thread tension, a downwardly extending arm 776 is provided formed integrally with the brake lever 758 and arranged at its lower end to be engaged by an abutment 780 on the lock bolt carrier 166 (see Figs. 9, 63, 64 and 65). The initial forward movement of the lock bolt carrier 166 when operatively connected to the cam shaft clutch shift lever 156, causes the lever arm 776 to be rocked forwardly through its engagement with the abutment 780 on the lock bolt carrier to move the brake lever 758 and brake shoe 760 out of engagement with the brake drum 762. These parts are held in their open position as the lock bolt carrier again moves rearwardly by the engagement of a latch 782 with a forwardly extending arm 784 formed integrally with the brake lever 758. The latch 782 is supported on a pivot pin 786 on the machine frame, and is held yieldingly in operative position with relation to the arm 784 by a small spring 788. It will be noted that the rocking movement of the brake lever 758 to its release position acts also to move a pin 790 carried on a U-shaped hub extension 793 of the brake lever away from an abutment formed on the hub portion of the stop arm 167. A small tension spring 791 connected between the pin 790 and the stop arm 167 (see Figs. 61 and 62) tends to swing the stop arm inwardly toward the center of the sewing cam shaft 132, such inward movement, however, being normally prevented by the engagement of the hub portion of the stop arm with the pin 790. The shifting of the brake lever 758 to its tension release position as the stop motion is thrown into operation, however, causes the spring 791 to bias the stop arm 167 inwardly so that the roller 171 will with certainty enter its stop cam groove 175 upon the reversal of the sewing cam shaft 132. Subsequent movement of the stop arm 167 to its full stop position as shown in Fig. 9, causes the brake arm 758 and latch engaging arm 784 to be moved still further in a counterclockwise direction, and to be held while the machine is stopped in an extreme or overthrow position.

In starting the machine, the latch mechanism above described, is arranged to prevent the application of the thread tension during the updraw movement of the take-up lever in the formation of the first stitch. As the machine starts, the outward movement of the stop arm releases the brake lever which is then held in an intermediate but still open position by the engagement of the latch 782 with the arm 784. The latch is then released to permit the applying of the tension on the thread after the take-up lever 690 has moved from its low to its high position and again starts downward, through connections controlled from the take-up lever 690 which comprise a second latch 792 pivotally supported on the latch 782 and arranged for engagement with a notch 794 formed in the hub of the take-up lever 690. As shown in Figs. 63 and 64, the first upward and downward movement of the take-up lever 690 causes the latch 792 to engage in the notch 794 and to draw the latch 782 forwardly out of engagement with the arm 784 and thereby to release the brake lever 758 which now acts to tension the thread. Continued movement of the take-up lever 690 to its extreme down position causes a small stop screw 796 on the latch lever 792 to engage with a cam surface on the hub of the take-up lever 690 to disengage the latch and thereby permit the return of the latch 782 to an extreme rear position determined by the engagement of the lower end of the latch 782 with the cammed upper surface of the lever arm 784, this being the position of the parts shown in Fig. 65. In this position also the latch 792 is held in a raised inoperative position by engagement of a tail thereon with an adjustable stop screw 798 carried on the machine frame.

In accordance with one feature of the invention, applicant provides a novel and improved thread brake stop mechanism which is rendered operative by the braking or mislooping of the needle thread to throw the stop motion into operation to stop the entire machine. This mechanism, as best shown in Figs. 3 to 9 inclusive, 66 and 67, comprises mechanism which is rendered operative by failure of the tension on the thread to positively rotate the treadle rod 176 through an angle of 90°, and thereby to disengage the treadle rod from its latch rod 366. The treadle rod is thus permitted to rise, opening the main clutch 130 and releasing the lock bolt 164. To this end the treadle rod 176 is provided adjacent its upper end with a gear segment 800 which meshes with a segmental gear lever 802 pivoted at 804 on the machine frame. The lever 202 is connected by a link 806 with an upwardly extending lever arm 808 pivoted at 809. A compression spring 810 seated at one end on the machine frame and at its other end in a rearward extension of the hub of the lever 808, tends to maintain the lever 808 in a forward position which corresponds to the normal operating angular position of the treadle rod 176. The forwardly extending arm of the lever 808 has pivotally connected thereto, a trip lever 812. The trip lever 812 is connected by a link 814 to a cam lever 816 for operating the lasting grippers, and serves to impart continuous reciprocating movement to the link lever 812. As previously pointed out, the thread passes from the tension wheel 756 over an idler pulley 768 carried on a short lever arm 770 which is supported on a transversely extending rock shaft or pin 818 which also carries a downwardly extending detent member 820. Upon failure of the thread tension, the idler pulley 768 and lever arm 770 will be permitted to swing downwardly and rearwardly, bringing the detent 820 into engagement with the reciprocating trip lever 812 which then turns about the point of contact with the detent 829 as a pivot, causing the lever 808 to be moved rearwardly and the treadle rod 176 to be rotated through 90° to trip the stop motion into operation. In order that the thread brake stop mechanism may be rendered inoperative when the machine is stopped, and more specifically to prevent inadvertent operation of the same in starting the machine, the detent 820 is provided with an upward extension which engages behind a collar 822 on a forwardly extending rod 824 connected at its rear end through a pin and slot connection with the brake lever 758. A small compression spring 826 tends to maintain the rod 824 yieldingly in an advanced position with relation to the brake lever 758.

In the illustrated machine, welt is drawn from a convenient source of supply through a welt slashing device and thence through the guide 692. As best shown in Figs. 14 and 53, the welt slashing device comprises a welt slashing knife 828 slidably supported in a guideway 830, and arranged to have a continuous reciprocatory movement imparted thereto by means of a cam lever 832 having at its lower end a pin and slot connection with the knife member 828. The welt is arranged to be moved into and out of position to be slashed by the knife on a curved guideway formed in a lever arm 834 carried on a stationary pivot 836. In accordance with a feature of the invention, the position of the lever arm 834 is controlled to start and stop the slashing operation in timed relation to the transfer of the point of operation about the shoe through connections controlled by the positioning movements of the link connection 502 with the jack feed lever 432. As best shown in Figs. 14, 18 and 19, these connections comprise a vertically arranged plunger 838 which extends downwardly through an axial bore formed in the supporting shaft for the driving gear 252, and is arranged at its lower end to be engaged by a cam 840 on the feed lever link 510. At its upper end the plunger engages beneath a laterally extending arm of a bell-crank 842, the other arm of which is connected by a link 844 with an extension of the welt guiding lever arm 834. The arrangement of these parts is such that for the starting position of the machine the cam 840 will be positioned to one side of the plunger 838, allowing the plunger to occupy its low position in which the slashing device is disengaged. As the point of operation approaches the toe portion of the shoe, however, the cam 840 will ride beneath the pin 838, causing the slashing device to be thrown into operation. As the point of operation again returns along the opposite side of the shoe, the cam 840 will again ride out from beneath the plunger 838, permitting the guide lever arm 834 and welt again to be moved out of the range of operation of the reciprocating welt slashing knife 828 to discontinue the slashing operation.

As best shown in Figs. 5, 11, and 53 of the drawings, the welt guide 692 is secured to the forward end of a supporting bar 846 which is carried adjacent its forward end on a link 848 pivoted at 850 on the machine frame. At its rear end the bar 846 is carried on a downwardly extending arm 852 of a cam actuated lever 856 loosely sleeved on a rock shaft 854. During each sewing cycle, the welt guide bar 846 is slightly retracted to permit the feeding of the work, and is then permitted to move yieldingly forwardly against the work under the influence of a tension spring 858 connected at one end to the cam lever 856 and at its other end to a cam actuated ratchet pawl lever 860 which is arranged for engagement with a ratchet 862 on the lever 856, and serves to lock the welt guide 692 in work engaging position.

With the present construction, mechanism is also provided which is rendered operative in stopping the machine to sever the welt and the thread to release the shoe, and thereafter to advance the severed end of the welt through the welt guide into position for the starting of a new sewing operation. With the present construction, a welt knife 864 for severing the welt and a thread cutting knife 866 for severing the needle thread are secured to the forward end of a bar 868 slidably supported in a groove formed in the welt guide bar 846. The slide 868 carrying thereon the welt severing knife 864 and thread cutting knife 868 is advanced to sever the welt and thread in stopping the machine by connections controlled from the eccentric rock shaft 386. As best shown in Figs. 5, 11 and 53, the slide 868 is provided adjacent its rear end with a rack which is engaged by a gear segment formed in a lever arm 870 pivotally supported on a bracket 872 on the welt guide bar 846. The lever 870 has also mounted thereon a pin 874 which engages within a cam groove 876 formed in an actuating lever 878 secured to the rock shaft 854. A lever arm 879 secured to the rock shaft 854 is connected by means of a link 880 with a laterally extending lever arm 882 secured to the eccentric shaft 386. A clockwise rocking movement imparted to the eccentric shaft 386 during the operation of the single revolution eccentric in stopping the machine, acts to rock the shaft 854 and lever 878 in a clockwise direction from the position shown in Fig. 11, and through the engagement of the roller 874 with the cam groove 876 causes the lever 870 to be correspondingly rocked in a clockwise direction to actuate the welt knife 864 and thread knife 866 to sever the welt and thread. The subsequent counterclockwise movement of the eccentric shaft 386 to its initial starting position, serves to again retract these parts to their inoperative position.

In accordance with another feature of the invention, the mechanism above described for severing the welt and the thread, is rendered operative also to advance the severed end of the welt through the welt guide 692 into position for the starting of a new seam. The mechanism for advancing the severed end of the welt, as best shown in Figs. 53, and 68 to 72 inclusive, comprises a welt advancing finger 884 which is carried on the forward end of a rod 886 slidably supported in bearings 888 in the machine frame. A pin 890 secured to the rod 886 for engagement with a slot 892 in one of the bearings 888 serves to key the rod against rotational movement. In order that the finger 884 may effectively engage with and follow the welt which is advanced through the welt guide in a direction slightly angled from the path of movement of the rod 886, the finger 884 is pivotally connected to swing laterally with relation to the bar 886 being normally held in a straight-end position by the engagement of a spring-pressed plunger 894 in the forward end of the bar with a lateral extension 896 formed on the hub portion of the finger 884. The rod 886 and finger 884 are normally held in a retracted inoperative position by means of a compression spring 898 coiled about the rod 886 between one of the bearings 888 and a collar 900 secured to the rod.

The rod 886 and welt finger 884 are advanced subsequent to the severing of the welt to advance the severed end through the welt guide by connections which comprise a rotatable shaft 902 at its lower end provided with a spiral gear 904 which meshes with a spiral gear segment 906 rigidly secured to the rock shaft 854 rotatable with the eccentric actuated lever 878. At its upper end the rock shaft 902 has secured thereto a supporting block 906 to which is pivotally connected a pawl 908. The pawl 908 has formed thereon a stop surface 910 which engages with a corresponding abutment 912 on the block 906 to limit movement of the pawl in one direction. A leaf spring 914 held by the securing screw for the block tends to maintain the pawl in this limiting open position. The pawl is arranged to cooperate with a recessed shoulder 916 in the bar 886. As best shown in Figs. 68 to 72, inclusive, rocking movement of the shaft 902 in a clockwise direction which is effected by the clockwise movement of the stop motion eccentric shaft through the connection above described, serves to rock the pawl. The subsequent movement of the shaft 902 and pawl in a counterclockwise direction during the return counterclockwise movement of the eccentric shaft 386, causes the pawl to engage the recessed shoulder 916 to advance the rod 886 and finger 884 to advance the severed end of the welt. As the pawl returns to its starting position, the engaging shoulder 912 of the supporting block 906 will act to force the pawl again out of engagement with the recess 916, as shown in Fig. 72, permitting the rod 886 and finger 884 to return to their original inoperative position under the influence of the spring 898.

The present machine is provided with a novel and improved side lasting mechanism which is arranged to engage with and position successive portions of the upper for the operation of the sewing mechanism, thus combining the side lasting operation with the sewing operation, and rendering the separate lasting operation on the shoe unnecessary. The lasting gripper mechanism, as best shown in Figs. 53, 54, and 73 to 81 inclusive, comprises a smooth-faced gripper member 918 which is arranged to extend downwardly between the upper and the insole supported on the last, and a cooperating rough surfaced gripper member 920 which is arranged to bite against the outer surface of the upper. The gripper member 918 is formed on the lower end of a slide member 922 carried in guideways 924 in a T-shaped supporting bracket 926. The slide member 922 is provided at its upper end with a rod extension 928 which passes through a journal formed in the upper end of the bracket 926, and has check nuts 930 threaded thereon for limiting the downward movement of the slide member 922 and gripper member 918 in the bracket 926. A friction shoe 932 is held in frictional engagement with the rod 928 by means of an adjustably supported compression spring 934, and provides a frictional resistance to the upward or downward movement of the gripper member 918. The gripper member 920 is pivotally connected to the gripper 918 by a pivot pin 936 carried on the lower end of the slide member 922, and is provided with an upward extension 938 having formed therein a slot 940 which extends diagonally in a diverse angle with relation to a similar but vertically arranged slot 942 in the slide member 922. With this construction and arrangement of the gripper mechanism, a single actuating mechanism only is required for raising and lowering, and for opening and closing the grippers. This operating connection comprises a pin 944 which extends through the slots 940, 942, and is supported on the lower end of a link 946 pivotally connected with the forward end of a gripper actuating lever 948. The gripper lever 948 is pivotally supported to turn on a transversely extending rock shaft 950 which also provides support for the T-shaped bracket 926. A rearward extension of the gripper actuating lever 948 is provided with a bearing surface 952 for engagement with a roller 954 carried on the forwardly extending arm of the continuously oscillated lasting gripper cam lever 816. A tension spring 956 connected between a downward extension of the gripper actuating lever 948 and an adjustable support on the frame tends to maintain the surface 952 in engagement with its actuating roller 954, the parts being so arranged as to provide a yielding downward and positive up-draw movement of the gripper mechanism. With this construction and arrangement of the parts, it will readily be seen that downward movement of the actuating lever 948 will act first to open the grippers (see Fig. 75), and thereafter to move the gripper assembly including the slide member 922 downwardly against the friction provided by the friction shoe 932 to the position shown in Fig. 76. Subsequent up-draw movement of the lever 948 will first act to close the grippers as the pin 944 rides upwardly in the slots 940, 942, as shown in Fig. 78, and will thereafter raise the grippers which are held in gripping position under a pressure determined by the friction exerted by the friction shoe 932, the limit of the up-draw position being shown in Fig. 79.

Applicant's improved construction embodies therein means for moving the gripper assembly into and out of active operation. To this end there is mounted on the left hand end of the rock shaft 950, a lever arm 958 (see Fig. 54) which is connected by a link 960 with one arm of a bell-crank lever 962 supported to turn on a fixed pivot 964 (see Figs. 1, 18, 23, 24, 39 and 41). A downwardly extending arm of the bellcrank 962 is connected by a link 966 with a pattern cam lever 968 supported on the pivot shaft 442 and having a cam roller 970 arranged for engagement with a cooperating pattern cam 972 on the pattern cam shaft 210. This cam corresponds with the usual Baltimore cam of these machines. For the operating position of the gripper, the rock shaft 950 and lever 958 will have been rocked upwardly in a counterclockwise direction to the position shown, for example, in Figs. 75, 76 and 77. In this position of the parts, a lug 976 (see Figs. 54 and 77) carried on a collar 978 secured to the rock shaft 950 engages with a recessed shoulder 980 on the hub portion of the bracket 926, locking the bracket in its downward position in which the downward extension thereof is in engagement with a portion of the machine frame. A clockwise rocking movement of the rock shaft 950 and lever arm 958 causes a pair of recessed shoulders 982 formed in the rock shaft 950 to engage with a pair of lugs 984 on the hub portion of the gripper actuating lever 948, rocking the actuating lever 948 in a clockwise direction, upwardly against the pressure of its spring 956 to raise the grippers away from the work. Continued upward movement of the lever arm 948 causes a pin 986 supported on the actuating lever 948 and arranged to ride in an arcuate slot 988 in the bracket 926 to engage against the upper end of the slot and to positively move the bracket upwardly and rearwardly about its pivotal connection with the rock shaft 950. In this inoperative position shown in Fig. 80, the engaging surface 952 of the actuating lever 948 will be entirely out of engagement with the oscillating roller 954 carried on the gripper cam lever 816. The rocking movement thus imparted to the bracket 926 serves also to move the gripper members 918, 920 upwardly and forwardly to an inoperative position in which the grippers will not interfere with the operations on the shoe including the removal of the finished shoe and jacking of a new shoe in operating position. Fig. 81 shows the machine starting position of the driven mechanism in which the lever arm 958 and with it the rock shaft 950 has been moved a slight distance in a counterclockwise direction permitting the gripper actuating lever 948 to move downwardly under the influence of its spring 956 sufficiently to open the grippers preparatory to the starting of their downward movement.

The illustrated machine is provided with a novel and improved lubricating system which is adapted for maintaining a continuous supply of lubricant to the several bearings of the machine. Applicant's lubricating system comprises a distributing reservoir 989 located in the top section 106 of the machine directly beneath the motor, to which lubricant is supplied from a sump in the base or floor section 100, and from which lubricant passes through a number of outlets by gravity feed to the several bearings and operating parts.

Lubricant is supplied to the distributing reservoir 989 by means of a plunger type pump comprising a casing 991 and a plunger 992 which is connected at its forward end by a pair of links 993 with the downwardly extending bifurcated portion of the jack supporting bell-crank lever 548. Lubricant is drawn into the pump from the sump through an inlet 994, and is forced upwardly through a conduit 995 to the distributing reservoir 989 (see Figs. 2, 9 and 10). With this construction and arrangement of the lubricant pump, it will readily be seen that additional lubricant is supplied to the reservoir only occasionally, that is, during each successive operation of jacking a new shoe as the jack supporting lever 548 is moved up and down by the operator to produce the jiggling action required for the breaking of the toggle and for moving the jacked shoe upwardly into operating position.

As best shown in Figs. 9 and 10 of the drawings, lubricant is drawn from the distributing reservoir 989 through a conduit 996 to the bearings for the sleeve gear element 116 and associated mechanisms including the planet gear mechanism for driving the eccentric, and the pattern shaft eccentric and reverse driving clutches. Lubricant is drawn from the reservoir 989 through a conduit 997 to lubricate the bearings for the vertical drive shaft 124 and mechanisms associated therewith including the main driving clutch and the auxiliary driving clutch for the pattern cam shaft. Lubricant is drawn from the distributing reservoir also through a conduit 998 to lubricate the principal bearings for the sewing cam shaft 132. Excess oil supplied to these bearings drains back to the sump in the base, from which it is again transferred to the lubricant reservoir as needed. An overflow 999 from the reservoir 989 serves to maintain the lubricant in the distributing reservoir at a constant level.

Features of applicant's machine relating specifically to the supporting and actuating mechanism for the jack and including the lubricating system for the machine, form the subject-matter of a divisional application Serial No. 467,700, filed December 3, 1942, for Shoe machines, and other features of the machine relating specifically to the lasting gripper, form the subject-matter of a divisional application Serial No. 467,701, filed December 3, 1942, for Shoe machines.

It will be understood that the invention is not limited to the specific embodiment shown, and that various deviations may be made therefrom without departing from the spirit and scope of the appended claims.

What is claimed is:

1. In an automatic shoe machine, the combination of a machine frame comprising a column support and an operating head surmounting the column, means for operating upon a shoe including an operating cam shaft in the head, a shoe supporting jack, and supporting and actuating mechanism for the jack including a vertically arranged pattern cam shaft in the column, and driving and stopping mechanism for the machine including a motor surmounting the operating head, a main driving element in the head continuously driven from the motor, a main clutch supported within the operating head and connections therefrom for driving each of said cam shafts from said driving element, an auxiliary mechanism including an auxiliary clutch in the operating head for connecting said auxiliary mechanism to be driven by said driving element to perform an auxiliary operation after the completion of the operation on the shoe, and means operative in stopping the machine for disengaging said main clutch and for throwing said auxiliary mechanism into operation.

2. In an automatic shoe machine, the combination of a machine frame comprising a column support and an operating head surmounting the column, means for operating upon a shoe including an operating cam shaft in the head, a shoe supporting jack, and supporting and actuating mechanism for the pack including a vertically arranged pattern cam shaft in the column, a driving and stopping mechanism for the machine comprising a prime mover surmounting the operating head, and driving connections for said cam shafts extending downwardly from said prime mover through said operating head including a main drive shaft continuously driven from the prime mover, a second drive shaft, a main clutch having the elements thereof supported on said second drive shaft to be driven from said main drive shaft and connections therefrom for driving both cam shafts, a stop motion clutch supported on the operating cam shaft and operable to stop the operating cam shaft in a predetermined angular position, an auxiliary mechanism including an auxiliary clutch operable to perform an auxiliary operation after the completion of an operation on the shoe, means operable in stopping the machine to disengage said main clutch and to engage said stop motion clutch, and means controlled from the stop motion clutch to engage said auxiliary clutch.

3. In an automatic machine, the combination of a machine frame comprising a column support and an operating head surmounting said support, means for operating upon a shoe including an operating cam shaft in the head, a shoe supporting jack, supporting and actuating mechanism for the jack supported from the column and including a vertically arranged pattern cam shaft and connections therefrom arranged for imparting feeding, tipping and turning movements to the jack for positioning the shoe with respect to the operating mechanism and to transfer the point of operation along the shoe, and driving and stopping mechanism for the machine including an electric motor surmounting the operating head, a vertically arranged drive shaft in the operating head continuously driven from said motor, a main clutch located in the operating head and connections therefrom for driving both of said cam shaft, an auxiliary mechanism including an auxiliary clutch for connecting said auxiliary mechanism to be driven from said drive shaft to perform an auxiliary operation after the completion of the operation on the shoe, and means operative in stopping the machine to disengage said main clutch and for engaging the auxiliary clutch to perform said auxiliary operation.

4. In an automatic machine, the combination of a machine frame comprising a column support and an operating head surmounting said support, means for operating upon a shoe including an operating cam shaft in the head, a shoe supporting jack, supporting and actuating mechanism for the jack including a vertically arranged pattern cam shaft and connections therefrom arranged for imparting feeding, tipping and turning movements to the jack for positioning the shoe with respect to the operating mechanism and to transfer the point of operation along the shoe, and driving and stopping mechanism for the machine including an electric motor surmounting the operating head, a vertically arranged main drive shaft in the operating head continuously driven from said motor, a second vertically arranged drive shaft in the operating head, and connections therefrom for driving the pattern cam shaft, a main clutch operatively connected with said main drive shaft and supported on said second drive shaft for connecting said second drive shaft and said operating cam shaft to be driven from said main drive shaft, an auxiliary mechanism including an auxiliary clutch for connecting said auxiliary mechanism to be driven from said main drive shaft to perform an auxiliary operation after the completion of the operation on the shoe.

5. In an automatic machine, the combination of a machine frame comprising a column support and an operating head surmounting said support, means for operating upon a shoe including an operating cam shaft in the head, a shoe supporting jack, supporting and actuating mechanism for the jack including a vertically arranged pattern cam shaft and connections therefrom arranged for imparting feeding, tipping and turning movements to the jack for positioning the shoe with respect to the operating mechanism and to transfer the point of operation along the shoe, and driving and stopping mechanism for the machine including an electric motor surmounting the operating head, a vertically arranged drive shaft in the operating head continuously driven from said motor, a second drive shaft vertically arranged in the operating head, a main operating clutch including a driving clutch element gear driven from the main drive shaft, a driven clutch element keyed to said second drive shaft, and connections therefrom comprising a gear on said driven clutch element and a gear meshing therewith on the operating cam shaft for driving the operating cam shaft, connections from said second drive shaft including a secondary clutch for driving the pattern cam shaft, and auxiliary mechanism including an eccentric and an auxiliary clutch for connecting said eccentric to be driven by said main drive shaft.

6. In an automatic machine, means for operating upon a shoe including an operating cam shaft, a shoe supporting jack relatively movable to transfer the point of operation along the sole margin of a shoe, supporting and actuating mechanism for the jack including a pattern cam shaft, and a driving and stopping mechanism for the machine comprising a main clutch and connections therefrom for driving both cam shafts, a stop motion clutch for the operating cam shaft including a braking clutch element shiftable on the operating cam shaft and clutch shifting means including a cam on the operating cam shaft for rendering said stop motion clutch operative to stop the operating cam shaft in a predetermined angular position, auxiliary mechanism including an auxiliary clutch operable to perform an auxiliary operation after the completion of the operation on the shoe, and clutch control means operable simultaneously to disconnect said main clutch and to render said stop motion clutch operative, and connections controlled from said stop motion clutch shifting means for engaging said auxiliary clutch.

7. In an automatic machine, means for operating upon a shoe including an operating cam shaft, a shoe supporting jack relatively movable to transfer the point of operation along the sole margin of the shoe, supporting and actuating mechanism for the jack including a pattern cam shaft, and a driving and stopping mechanism for the machine comprising a main clutch and connections therefrom for driving both cam shafts, slow speed driving connections for the operating cam shaft independent of the main clutch and including a slow speed and stop motion clutch, auxiliary mechanism including an auxiliary clutch operable to perform an auxiliary operation after the completion of the operation on the shoe, and clutch control means operable simultaneously to disconnect said main clutch and to render said stop motion clutch operative, and connections controlled from said stop motion clutch for engaging said auxiliary clutch.

8. In an automatic machine, shoe sewing mechanism including an operating cam shaft, a shoe supporting jack relatively movable to transfer the point of operation along the sole margin of the shoe, supporting and actuating mechanism for the jack including a pattern cam shaft, and driving and stopping connections for the machine comprising a main clutch and connections therefrom for driving both cam shafts, slow speed driving connections to the operating cam shaft independent of the main clutch and including a slow speed and stop motion clutch, clutch shifting means including a cam on the operating cam shaft for rendering said stop motion clutch operative to drive the cam shaft at slow speed and thereafter to stop the same in a predetermined angular position, auxiliary mechanism including an auxiliary clutch operable to perform an auxiliary operation after the completion of the operation on the shoe, means controlled from the pattern cam shaft to disengage the main clutch and to render the stop motion clutch operative, and means actuated from said stop motion clutch shifting means to engage said clutch for the auxiliary mechanism.

9. In an automatic machine, shoe sewing mechanism including an operating cam shaft, a shoe supporting jack relatively movable to transfer the point of operation along the sole margin of the shoe, supporting and actuating mechanism for the jack including a pattern cam shaft, and a driving and stopping mechanism for the machine including a main clutch and connections therefrom for driving both cam shafts, slow speed driving connections for the operating cam shaft independent of the main clutch and including a slow speed and stop motion clutch, and control means for said stop motion clutch including a cam on the operating cam shaft acting when rendered operative for shifting said stop motion clutch to drive the operating cam shaft at slow speed and thereafter to stop the same in a predetermined angular position, auxiliary mechanism including an auxiliary clutch operable to perform an auxiliary operation after the completion of the operation on the shoe, control means for shifting said main clutch between operative and disconnected positions and including connections operative simultaneously to render said stop motion clutch shifting means inoperative and operative respectively.

10. In an automatic shoe machine, the combination with a machine frame comprising a column and an operating head mounted thereon, of means operating upon a shoe including an operating cam shaft mounted in the head, a shoe supporting jack and supporting and actuating mechanism for the jack including a pattern cam shaft carried in the column, and driving and stopping mechanism for the machine comprising a vertically arranged drive shaft in the head, a main driving clutch element sleeved on said drive shaft, a driven clutch element keyed to said shaft, connections from said drive shaft including a secondary clutch for driving the pattern cam shaft, connections from said driven clutch element for driving the operating cam shaft, a slow speed and stop motion clutch on the operating cam shaft, and slow speed driving means associated therewith independent of the main clutch for turning the operating cam shaft to a predetermined stop position, and means for controlling simultaneously the operation of the main driving clutch and the stop motiton clutch.

11. In an automatic machine for operating upon shoes, sewing mechanism including a needle and a sewing cam shaft, a shoe supporting jack relatively movable to transfer the point of operation along the sole margin of the shoe, supporting and actuating mechanism for the jack including a pattern cam shaft, and driving and stopping mechanism for the machine including means acting when rendered operative to stop the pattern cam shaft and to reverse the sewing cam shaft to a predetermined position in which the needle is withdrawn from the work.

12. In an automatic machine for operating upon shoes, sewing mechanism including a needle and a sewing cam shaft, a shoe supporting jack relatively movable to transfer the point of operation along the sole margin of the shoe, supporting and actuating mechanism for the jack including a pattern cam shaft, and driving and stopping mechanism for the machine including means acting when rendered operative to stop the pattern cam shaft and to reverse the sewing cam shaft to a predetermined position in which the needle is withdrawn from the work, and means acting automatically on completion of an operation on the shoe to throw said machine stopping mechanism into operation.

13. In an automatic machine for operating upon shoes, sewing mechanism including a needle and a sewing cam shaft, a shoe supporting jack relatively movable to transfer the point of operation along the sole margin of the shoe, supporting and actuating mechanism for the jack including a pattern cam shaft, and driving and stopping mechanism for the machine comprising means controlled from the pattern cam shaft at the completion of an operation on the shoe to throw the stopping mechanism for the machine into operation, said stopping mechanism including means to reverse and to stop the sewing cam shaft in a predetermined position in which the needle is withdrawn from the work, means to disconnect the pattern cam shaft from the driving mechanism, and auxiliary mechanism operative to impart an additional increment of movement to the pattern cam shaft.

14. In an automatic machine for operating upon shoes, sewing mechanism including a hook needle, a looper and a sewing cam shaft, a shoe supporting jack relatively movable to transfer the point of operation along the sole margin of the shoe, supporting and actuating mechanism for the jack including a pattern cam shaft, and a driving and stopping mechanism for the machine comprising a main clutch and connections therefrom for driving both cam shafts, means for reversing and for stopping the operating cam shaft with the needle withdrawn from the work and with the needle freed from the needle thread including a stop motion clutch and clutch shifting means including a cam on the sewing cam shaft for rendering said stop motion clutch operative, auxiliary driving means including an auxiliary clutch operable to impart an additional increment of movement to the pattern cam shaft, and clutch control means operable simultaneously to disconnect said main clutch and to render said stop motion clutch operative, and connections controlled from said stop motion clutch shifting means for engaging said auxiliary clutch.

15. In an automatic machine, means for operating upon a shoe including an operating cam shaft, a shoe supporting jack relatively movable to transfer the point of operation along the sole margin of a shoe, supporting and actuating mechanism for the jack including a pattern cam shaft, and a driving and stopping mechanism for the machine comprising a main clutch and connections therefrom for driving both shafts, a secondary clutch in the connections to the pattern cam shaft, auxiliary mechanism including an auxiliary clutch operable to perform an auxiliary operation after the completion of the operation on the shoe, and control means for said auxiliary clutch and secondary clutch normally operative to maintain the auxiliary clutch in open position and the secondary clutch in engaged position, and means operative in stopping the machine for closing the auxiliary clutch and simultaneously for disengaging the secondary clutch.

16. In an automatic machine, means for operating upon a shoe including an operating cam shaft, a shoe supporting jack relatively movable to transfer the point of operation along the sole margin of a shoe, supporting and actuating mechanism for the jack including a pattern cam shaft, and a driving and stopping mechanism for the machine comprising a main clutch and connections therefrom for driving both shafts, a secondary clutch in the connections to the pattern cam shaft, auxiliary mechanism operable to perform an auxiliary operation after the completion of the operation on the shoe, reverse driving connections to the pattern cam shaft, auxiliary driving connections including an auxiliary driving clutch element having a neutral position, and alternative auxiliary and pattern cam shaft reverse driving positions, shifting means for said secondary clutch and auxiliary clutch element including an interlocking connection operative for a neutral position of the auxiliary clutch element to engage the secondary clutch and for each of the alternative engaging positions of the clutch element to disengage the secondary clutch.

17. In an automatic machine, means for operating upon a shoe including an operating cam shaft, a shoe supporting jack relatively movable to transfer the point of operation along the sole margin of a shoe, supporting and actuating mechanism for the jack including a pattern cam shaft, and a driving and stopping mechanism for the machine comprising a main clutch and connections therefrom for driving both shafts, a secondary clutch in the connections to the pattern cam shaft, auxiliary driving connections for the pattern cam shaft operative in stopping the machine, reverse driving connections to the pattern cam shaft, driving connections independent of the main clutch including a driving clutch element having a neutral position, and alternative auxiliary and reverse driving positions for driving the pattern cam shaft, control means for said secondary clutch and said clutch element normally operative to maintain the clutch element in neutral position and the secondary clutch in engaging position, means operative in stopping the machine for engaging the clutch element to drive the pattern cam shaft auxiliary driving connections, and a connection operative while the clutch element is engaged to disengage the secondary clutch.

18. In an automatic machine, means for operating upon a shoe including an operating cam shaft, a shoe supporting jack relatively movable to transfer the point of operation along the shoe, supporting and actuating mechanism for the jack including a pattern cam shaft, a driving and stopping mechanism for the machine comprising power means for driving and for automatically stopping both of said shafts at the completion of an operating cycle of the machine, a reverse power driving means for the pattern cam shaft, a manual controller, and connections controlled thereby for connecting the pattern cam shaft to be driven in a reverse direction independently of said operating shaft.

19. In an automatic machine, means for operating upon a shoe including an operating cam shaft, a shoe supporting jack relatively movable to transfer the point of operation along the shoe, supporting and actuating mechanism for the jack including a pattern cam shaft, a driving and stopping mechanism for the machine comprising a main clutch and connections therefrom for driving both shafts, a secondary clutch in the connections to the pattern cam shaft, connections independent of the main clutch including a reversing clutch for driving the pattern cam shaft in a reverse direction, automatic means normally operative for controlling the positions of said clutches, a manual controller having normal running and pattern cam shaft reverse positions, and connections therefrom operative for said reverse position to engage the reverse clutch and to prevent engagement of the secondary clutch.

20. In an automatic machine, means for operating upon a shoe including an operating cam shaft, a shoe supporting jack relatively movable to transfer the point of operation along the shoe, supporting and actuating mechanism for the jack including a pattern cam shaft, a driving and stopping mechanism for the machine including a main driving clutch and connections therefrom for driving each of said operating and pattern cam shafts, and automatic means for stopping both of said shafts at the completion of an operating cycle of the machine including means to disengage said main driving clutch, reverse power driving means for the pattern cam shaft, manual control means, and a plurality of clutches controlled thereby shiftable to permit independent manual operation of said shafts, and alternatively for connecting the pattern cam shaft to be driven in a reverse direction independently of said operating cam shaft.

21. In an automatic machine, means for operating upon a shoe including an operating cam shaft, a shoe supporting jack relatively movable to transfer the point of operation along the sole margin of a shoe, supporting and actuating mechanism for the jack including a pattern cam shaft, and a driving and stopping mechanism for the machine comprising a main clutch and connections therefrom for driving both shafts, a normally engaged secondary clutch in the connections to the pattern cam shaft, auxiliary mechanism operable to perform an auxiliary operation after the completion of the operation on the shoe, reverse driving connections to the pattern cam shaft, driving connections independent of the main clutch including clutching means having a normally inoperative, and alternative auxiliary and reverse driving positions, means operative in stopping the machine for engaging said clutching means to drive the auxiliary mechanism, and manual control means for said clutching means and said secondary clutch having a normal machine running and stop position, and shiftable to engage said clutching means to reverse the pattern cam shaft and to disengage the secondary clutch, and alternatively shiftable to disengage both said clutching means and said secondary clutch.

22. In an automatic machine, means for operating upon a shoe including an operating cam shaft, a shoe supporting jack relatively movable to transfer the point of operation along the sole margin of a shoe, supporting and actuating mechanism for the jack including a pattern cam shaft, and a driving and stopping mechanism for the machine comprising a main clutch and connections therefrom for driving both shafts, a secondary clutch in the connections to the pattern cam shaft, auxiliary connections operative in stopping the machine to drive the pattern cam shaft, reverse driving connections for the pattern cam shaft, driving means independent of the main clutch including a clutch element having neutral and alternative pattern cam shaft auxiliary and reverse driving positions, a shift lever for said clutch element, means for shifting said shift lever and clutch element between said neutral and alternative driving positions, a second shift lever for said secondary clutch, and a V-shaped cam and follower connection between said shift levers arranged so that for a neutral position of the first-mentioned clutch shift lever and clutch element, the follower is located in the bottom of the V-shaped cam to engage the secondary clutch, and for said alternative driving positions of said first-mentioned clutch shift lever and clutch element, the follower is engaged with a side of the V-shaped cam to disengage said secondary clutch.

23. In an automatic machine, means for operating upon a shoe including an operating cam shaft, a shoe supporting jack relatively movable to transfer the point of operation along the sole margin of a shoe, supporting and actuating mechanism for the jack including a pattern cam shaft, and a driving and stopping mechanism for the machine comprising a main clutch and connections therefrom for driving both shafts, a secondary clutch in the connections to the pattern cam shaft, auxiliary connections operative on stopping the machine to perform an auxiliary operation, reverse driving connections for the pattern cam shaft, driving means independent of the main clutch including a clutch element having neutral and alternative pattern cam shaft auxiliary and reverse driving positions, a shift lever for said clutch element, means for shifting said shift lever and clutch element between said neutral and alternative driving positions, a second shift lever for said secondary clutch, and a V-shaped cam and follower connection between said shift levers arranged so that for a neutral position of the first-mentioned clutch shift lever and clutch element, the follower is located in the bottom of the V-shaped cam to engage the secondary clutch, and for said alternative driving positions of said first-mentioned clutch shift lever and clutch element, the follower is engaged with a side of the V-shaped cam to disengage said secondary clutch, means controlled automatically by the stop mechanism for shifting the first-mentioned clutch shift lever and clutch element between neutral and auxiliary driving position, a manual control lever, and connections controlled thereby for shifting said first-mentioned clutch shifting lever and clutch element from said neutral position alternatively to a manual control position in which both said auxiliary clutch element and secondary clutch are disengaged, and to a pattern cam shaft reverse driving position in which said secondary clutch is disengaged.

24. In an automatic machine, means for operating upon a shoe, a shoe supporting jack relatively movable to transfer the point of operation along the sole margin of a shoe, supporting and actuating mechanism for the jack including a pattern cam shaft, driving and stopping mechanism for the machine comprising driving connections to the pattern cam shaft and a secondary clutch in said connections, auxiliary connections operative on stopping the machine to perform an auxiliary operation, driving connections including a clutch element having neutral, and alternative auxiliary and pattern cam shaft reverse driving positions, a shift lever for said clutch element, and a second shift lever for said secondary clutch, said clutch levers having a V-shaped cam and follower connection therebetween arranged so that in a neutral position of the first-mentioned clutch shift lever and clutch element the follower engages the bottom of its V-shaped cam to engage the secondary clutch, and movement of said first-mentioned clutch shifting lever from said neutral position in either direction acts to disengage the secondary clutch, and manual control means for said first-mentioned clutch shifting lever having a normal machine running position in which the clutch element is in neutral position and the clutch is engaged, a second position in which said clutch element and clutch are both disengaged, and a pattern cam shaft reverse position in which the clutch element is shifted to reverse position and said clutch is disengaged.

25. In an automatic machine, means for operating upon a shoe including an operating cam shaft, a shoe supporting jack relatively movable to transfer the point of operation along the sole margin of a shoe, supporting and actuating mechanism for the jack including a pattern cam shaft, and a driving and stopping mechanism for the machine comprising a main clutch and connections therefrom for driving both shafts, a secondary clutch in the connections to the pattern cam shaft, auxiliary connections operative on stopping the machine to perform an auxiliary operation, reverse driving connections for the pattern cam shaft, an auxiliary driving clutch having a neutral position and alternative auxiliary and pattern cam shaft reverse driving positions, an auxiliary clutch shifting lever, means operative in stopping the machine for rocking said lever to shift the auxiliary clutch to auxiliary driving position, and thereafter to disengage the auxiliary driving clutch, a secondary clutch shifting lever, an actuating connection between said clutch shifting levers whereby the secondary clutch is engaged only for said normally inoperative position of the auxiliary clutch and its shifting lever, a manual control element having alternative machine running, pattern shaft reverse, and machine manual control positions, and a lost motion connection between the manual control element and the auxiliary clutch shifting lever arranged for said machine running position of the manual control element to permit movement of the auxiliary clutch shifting lever between normally inoperative and auxiliary engaging positions, and arranged for the pattern cam shaft reverse position to engage the auxiliary clutch with said reverse driving connections and to disengage the secondary clutch, and arranged for said manual control position to disengage both of said auxiliary and secondary clutches.

26. In an automatic machine, welt shoe sewing mechanism, welt slashing mechanism, a shoe supporting jack relatively movable to transfer the point of operation along the shoe, supporting and actuating mechanism for the jack including a pattern cam shaft, a jack feed lever, cam and follower connections between the pattern cam shaft and feed lever, means for adjusting the operating relationship of said cam and follower connections to effect movement of the feed lever in accordance with the size of shoe being operated upon, and means controlled by the movements of said cam and follower connections in accordance with said adjusted relationship in feeding the shoe to render the welt slashing mechanism operative and inoperative.

27. In an automatic machine, welt shoe sewing mechanism, welt slashing mechanism, a shoe supporting jack relatively movable to transfer the point of operation along the shoe, supporting and actuating mechanism for the jack including a pattern cam shaft, a jack feed lever, linkage connections for actuating the feed lever comprising two links pivoted together, one link being connected with the feed lever, and actuating connections with the other of said links including a cam on the cam shaft, a pivoted guide link for controlling the path of the pivotal connection between said links during their movement, an adjustable pivot for said guide link, a connection arranged to be controlled from the shoe for adjusting the pivot of said guide link in accordance with the size of the shoe to be operated upon, and means controlled by movement of said linkage connections in feeding the shoe including a cam on one of said links for rendering the welt slashing mechanism operative and inoperative.

28. In an automatic machine, welt shoe sewing mechanism, welt slashing mechanism, a shoe supporting jack, means for relatively moving the jack and welt shoe sewing mechanism to transfer the point of operation about the sole margin of a shoe including a pattern cam shaft, a cam, and linkage connections therefrom for effecting said relative movement, means for adjusting said connections to effect said relative movement in accordance with the size of shoe being operated upon, and means for rendering said welt slashing mechanism operative and inoperative including an actuating element supported to move with said connections in accordance with the adjustment thereof, and a control element for the welt slashing mechanism arranged to be acted upon by said actuating element.

29. A shoe sewing machine having, in combination, stitch forming devices including an operating cam shaft, a device for tensioning the thread, a driving and stopping mechanism for the machine including start and stop clutching means for said shaft and a clutch control rod shiftable axially between machine running and stop position, means tending to shift said rod to stop position, latching means for locking the rod in running position, and a thread break stop mechanism including a thread engaging element responsive to failure of the tension on the thread, connections actuable to impart a rotational movement to said control rod and thereby to release the latch, and means rendered operative by a movement of said thread engaging element induced by failure of the thread tension for actuating said connections.

30. In an automatic shoe machine having sewing mechanism including a device for tensioning the thread, a shoe supporting jack, and means for imparting relative positioning movements to the sewing mechanism and jack to transfer the point of operation about the sole margin of a shoe, the combination of a driving and stopping mechanism for the machine including a starting and stopping control rod shiftable axially between running and stop positions including an abutment on the rod and a latch engaging therewith to support the rod in running position, means for withdrawing the latch to stop the machine, and a thread break stop mechanism including a thread engaging element responsive to failure of the tension on the thread, and connections controlled by movement of said element upon failure of the thread to impart a rotational movement to said control rod and thereby to disengage the abutment from the latch to stop the machine.

31. In an automatic machine, means for operating upon a shoe including an operating cam shaft, a shoe supporting jack relatively movable to transfer the point of operation along the sole margin of a shoe, supporting and actuating mechanism for the jack including a pattern cam shaft, and driving and stopping mechanism for the machine including a control element shiftable between running and stop positions, a latch bar engageable with said element for latching said element in running position, connections rendered operative by the shifting of said element to stop position to disconnect both of said cam shafts from the driving mechanism, an auxiliary mechanism including a rock shaft to which is imparted a rocking and return movement in stopping the machine, connections from the rock shaft for imparting an incremental movement to the pattern cam shaft including a cam block movable with the cam shaft, a pawl lever and a pawl supported from the rock shaft, said pawl being arranged to be moved laterally by said block, and thereafter by the rocking movement of the rockshaft to engage behind and advance the block and pattern cam shaft, and a latch release lever to which the latch bar is attached arranged to be acted upon by said pawl during the lateral movement thereof to disengage the latch bar from the control element.

32. In an automatic machine, means for operating upon a shoe including an operating cam shaft, a shoe supporting jack relatively movable to transfer the point of operation along the sole margin of a shoe, supporting and actuating mechanism for the jack including a pattern cam shaft, and driving and stopping mechanism for the machine including a control element shiftable between running and stop positions, a latch for latching said element in running position, connections rendered operative by the shifting of said element to stop position to disconnect both of said cam shafts from the driving mechanism, a normally stationary eccentric, a rock shaft and connections from the eccentric for imparting a rocking and return movement to the rock shaft, connections from the rock shaft for imparting an incremental movement to the pattern cam shaft including a block movable with the pattern cam shaft, a pawl lever and a pawl supported from the rock shaft, said pawl being arranged to be moved laterally by said block, and thereafter by the rocking movement of the rock shaft to engage behind and advance the block and pattern cam shaft, a treadle release lever connected with the latch and having an extension engaging with said pawl, whereby the lateral movement of the pawl is effective to withdraw the latch, mechanism operative in stopping the machine and arranged to be thrown into operation by the withdrawal of said latch to drive the eccentric, and means controlled from the rock shaft to stop the eccentric at the end of one revolution.

33. In an automatic machine, means for operating upon a shoe, a shoe supporting jack relatively movable to transfer the point of operation along the sole margin of a shoe, supporting and actuating mechanism for the jack including a pattern cam shaft, and driving and stopping mechanism for the machine including a treadle, a treadle rod having running and stopping positions, a latch for latching the treadle rod in running position, a stop motion clutch rendered operative by movement of the treadle rod to stop position, a normally stationary eccentric, a rock shaft and connections from the eccentric for imparting a rocking and return movement to the rock shaft, an eccentric clutch, an eccentric clutch control rod arranged to have imparted thereto an axial reiprocatory movement by the stop motion to engage the eccentric clutch, connections from the rock shaft for imparting an incremental movement to the pattern shaft including a cam block movable with the pattern shaft, an arm on the rock shaft and a pawl pivoted to said arm arranged to be moved laterally by said block and thereafter by the rocking movement of the rock shaft to engage behind and advance the block and pattern cam shaft, a treadle release lever connected with the latch and having an extension engaging with said pawl whereby said lateral movement of the pawl is effective to withdraw the latch, and connections rendered operative in stopping the machine for imparting lateral positioning movements to the eccentric clutch control rod whereby the reciprocating movement thereof is effective to engage the eccentric clutch, and at the end of one revolution of the eccentric to disengage the eccentric clutch, comprising an eccentric rod positioning lever supported co-axially with the machine stop lever, means tending to rock the positioning lever with the stop lever, a swinging dog on the eccentric control rod positioning lever, and an arm on the rock shaft arranged for operative engagement with the dog during the return movement of the rock shaft to return the positioning lever and thereby to disengage the eccentric clutch.

34. An inseam shoe sewing machine having, in combination, stitch forming and work feeding devices, a cam shaft and suitable connections for actuating said devices, a thread tension device, a machine stop motion means including a stop motion clutch and automatic means comprising an element to which motion is imparted for controlling said clutch to stop the cam shaft, a connection actuated by the motion of said element in stopping the machine to actuate the thread tension device to release the thread tension, holding means for holding the thread tension device in its released condition, and means operative in starting the machine to free the thread tension device from said holding means.

35. An inseam shoe sewing machine having, in combination, stitch forming and work feeding devices including a take-up lever, a cam shaft and suitable connections for actuating said devices, a thread tension device, a machine stop motion means including a stop motion clutch and automatic means comprising an element to which motion is imparted for controlling said clutch to stop the cam shaft, a connection actuated by the motion of said element in stopping the machine to actuate the thread tension device to release the thread tension, a latch to hold the tension device in tension releasing position, and means actuated from the cam shaft upon again starting the machine to actuate the latch to free the tension device.

36. An inseam shoe sewing machine having, in combination, stitch forming and work feeding devices including a take-up lever, a cam shaft and suitable connections for actuating said devices, a thread tension device, a machine stop motion means including a stop motion clutch and automatic means comprising an element to which motion is imparted for controlling said clutch to stop the cam shaft, a connection actuated by the motion of said element in stopping the machine to actuate the thread tension device to release the thread tension, a latch to hold the tension device in tension releasing position, and means actuated by the take-up lever during its thread giving stroke upon again starting the machine to actuate the latch to free the tension device.

37. An inseam shoe sewing machine having, in combination, stitch forming and work feeding devices including a take-up lever, a cam shaft and suitable connections for actuating said devices, a thread tension device, a machine stop motion means including a stop motion clutch, and automatic means comprising an element to which motion is imparted for controlling said clutch to stop the cam shaft, a connection actuated by the motion of said element in stopping the machine to actuate the thread tension device to release the thread tension, a thread clamping and cutting device, means operative in stopping the machine for clamping and cutting the thread subsequent to the release of the thread tension, and means actuated from the cam shaft upon again starting the machine to free the tension device.

38. In an automatic machine, inseam shoe sewing mechanism comprising stitch forming and work feeding devices, a sewing cam shaft, suitable connections for actuating said devices, a thread tension device, means for clamping the thread, and means for cutting the thread, a shoe supporting jack relatively movable to transfer the point of operation about the shoe, supporting and actuating mechanism for the jack, a machine stop motion means including a stop motion clutch, and automatic means comprising an element to which motion is imparted for controlling said clutch to stop the cam shaft, auxiliary mechanism rendered operative by the motion of said element in stopping the machine to perform an auxiliary operation after the machine is stopped, a connection actuated by the motion of said element in stopping the machine to actuate the thread tension device to release the thread tension, a connection controlled from the cam shaft in stopping the machine to render said thread clamping means operative to grip the thread, and a connection actuated by said auxiliary mechanism for rendering said thread cutting means operative to sever the gripped thread from the work.

39. In an automatic machine, inseam shoe sewing mechanism comprising stitch forming and work feeding devices, a sewing cam shaft and suitable connections for actuating said devices, a thread tension device, means for clamping the thread, means for cutting the thread, a shoe supporting jack relatively movable to transfer the point of operation about the shoe, supporting and actuating mechanism for the jack including a pattern cam shaft, and driving and stopping mechanism for the machine including a main clutch and connections therefrom for driving both cam shafts, a stop motion clutch for the operating cam shaft, and automatic clutch shifting means including an element to which motion is imparted for controlling said stop motion clutch to stop the sewing cam shaft, auxiliary mechanism operative in stopping the machine including a one revolution eccentric, connections rendered operative by the movement of said element in stopping the machine for actuating the tension device to release the thread tension, and for causing said eccentric to rotate through one revolution, means controlled from the sewing cam shaft in stopping the machine for actuating said clamping means to clamp the thread, and means controlled by the eccentric to actuate the thread cutting means to sever the gripped thread from the work.

40. In an automatic machine, inseam stitch forming and work feeding devices including a take-up lever, a cam shaft and suitable connections for actuating said devices, a thread tension device, a shoe supporting jack relatively movable to transfer the point of operation about the shoe, supporting and actuating mechanism for the jack including a pattern cam shaft, a driving and stopping mechanism for the machine comprising a stop motion clutch, and automatic means including an actuating element to which motion is imparted for controlling said clutch to stop the sewing cam shaft, auxiliary mechanism operative in stopping the machine including a one revolution eccentric, connections rendered operative by the movement of said element in stopping the machine for actuating the tension device to release the thread tension, and for causing said eccentric to rotate through one revolution, a latch to hold the tension device in tension release position, thread clamping means operative in stopping the machine to clamp the thread, thread cutting mechanism, and connections from the eccentric for actuating the same to cut the thread, and means actuated by the take-up lever during its thread giving stroke upon again starting the machine to actuate the latch to free the tension device.

41. In an automatic machine, welt shoe sewing mechanism including a hook needle, a looper, a thread finger, means acting when rendered operative to cooperate with the thread finger to grip the thread, a shoe supporting jack, and supporting and actuating means for the jack arranged to present the shoe to the sewing mechanism and to transfer the point of operation along the sole margin of the shoe, means operative in stopping the machine for relatively moving the thread gripping device and thread finger to grip the thread, auxiliary mechanism operative in stopping the machine to move the jack away from the sewing mechanism and to return the shoe to its starting position, and means controlled from said auxiliary mechanism to sever the welt and thread.

42. In an automatic machine, shoe sewing mechanism including a sewing cam shaft, a hook needle, a thread gripping device and a thread cutting knife arranged to cut the gripped thread between the gripper and the work, a shoe supporting jack, and supporting and actuating means for the jack arranged to present the shoe to the sewing mechanism and to transfer the point of operation along the sole margin of a shoe, including a pattern cam shaft, and a driving and stopping mechanism for the machine comprising a stop motion clutch, means actuated by said clutch in stopping the machine to reverse the sewing cam shaft, auxiliary mechanism rendered operative in stopping the machine to impart an additional increment of movement to the pattern cam shaft, means actuated by the reverse movement of the sewing cam shaft to grip the thread, and connections actuated by said auxiliary mechanism for actuating the thread cutting knife to sever the gripped thread from the work.

43. In an automatic machine, welt shoe sewing mechanism including a hook needle, a device operative in stopping the machine to grip the thread, a thread severing knife, a shoe supporting jack and actuating and supporting mechanism for the jack arranged for imparting positioning movements thereto to present the shoe to the sewing mechanism and to transfer the point of operation along the sole margin of a shoe, a driving and stopping mechanism for the machine including auxiliary mechanism operative in stopping the machine to move the jack away from the sewing mechanism, and means controlled by said auxiliary mechanism for actuating the knife to sever the thread.

44. In a chainstitch welt shoe sewing machine having a hook needle arranged to enter the work from the outside of the work and to lay the chain on the welt, a looper, a thread finger, and a gripper device operative in stopping the machine to grip the thread at a point removed from the work, a welt guide, a welt severing knife, a thread severing knife separate from but supported to move with the welt severing knife and arranged to engage and cut an unsupported portion of the thread stretched between the gripper device and the work, and means operative in stopping the machine for advancing said knives as a unit to sever the welt and to sever the gripped thread.

45. In an automatic machine, welt shoe sewing mechanism including a hook needle, a looper, a thread finger, a thread gripping device arranged to cooperate with the thread finger when rendered operative to grip the thread, means operative in stopping the machine for imparting abnormal movement to the thread finger to cause the gripping device cooperating therewith to grip the thread, a welt guide, a welt severing knife, a thread severing knife separate from the welt severing knife but supported to move as a unit therewith to engage and to cut an unsupported portion of the thread stretched between the gripping device and the work, and means operative in stopping the machine for actuating said knives to sever the welt and to sever the gripped thread between the gripping device and the work.

46. In an automatic machine, shoe sewing mechanism including a sewing cam shaft, a hook needle, a looper, a thread finger, a thread gripping device rendered operative by an abnormal movement of the thread finger to grip the thread, a thread cutting knife, a shoe supporting jack, and means including a pattern mechanism for imparting relative positioning movements to the sewing mechanism and to the jack to position the shoe with respect to the sewing mechanism and to transfer the point of operation along the sole margin of the shoe, and a driving and stopping mechanism for the machine including means operative in stopping the machine to reverse the sewing cam shaft, auxiliary mechanism acting on the pattern mechanism to move the jack away from the sewing mechanism, means actuated by the reverse movement of the sewing cam shaft for imparting an abnormal movement to the thread finger to grip the thread, and mechanism actuated from said auxiliary mechanism for actuating the thread cutting knife to sever the gripped thread from the work.

47. In an automatic machine, sewing mechanism including a sewing cam shaft, a hook needle, a thread gripping device and a thread severing knife, a shoe supporting jack, and means including a pattern mechanism for imparting relative positioning movements to the sewing mechanism and to the jack to position the shoe with respect to the sewing mechanism and to transfer the point of operation along the sole margin of a shoe, and a driving and stopping mechanism for the machine including means operative in stopping the machine to reverse the sewing cam shaft, auxiliary mechanism rendered operative in stopping the machine and acting on the pattern mechanism to move the jack away from the sewing mechanism, means actuated by the reverse movement of the sewing cam shaft for rendering the gripping device operative to grip the thread, and connections actuated by said auxiliary mechanism for actuating the thread cutting knife to sever the gripped thread from the work.

48. In an automatic machine, welt shoe sewing mechanism including a sewing cam shaft, a hook needle, a thread gripping device, a thread cutting knife arranged to sever the thread from the work, a welt guide, a welt severing knife, a shoe supporting jack, and means including a pattern mechanism for imparting relative positioning movements to the sewing mechanism and to the jack to position the shoe with respect to the sewing mechanism and to transfer the point of operation along the sole margin of the shoe, and a driving and stopping mechanism for the machine including means operative in stopping the machine to reverse the sewing cam shaft, auxiliary mechanism operative in stopping the machine for actuating the pattern mechanism to move the jack away from the sewing mechanism, means actuated by the reverse movement of the sewing cam shaft for causing the gripping device to grip the thread, and connections actuated by said auxiliary mechanism for actuating the thread cutting knife and the welt cutting knife to sever the gripped thread and the welt from the work.

49. A welt sewing machine having, in combination, stitch forming devices including a needle, a welt guide arranged for positioning the welt adjacent the sewing point, a welt cutting knife, a welt advancing finger, a slide for the welt advancing finger, means tending yieldingly to hold the slide and welt advancing finger in retracted position, a mechanism operative in stopping the machine for actuating the knife to sever the welt comprising a rock shaft, a spring-pressed pawl on the rock shaft and a cooperating abutment on the slide, said pawl and abutment being arranged so that rocking movement of the shaft in one direction operates to position the pawl in operating relationship to the abutment, and a subsequent rocking movement of the shaft in the opposite direction causes the pawl to advance and thereafter to release the slide.

50. A welt sewing machine having, in combination, stitch forming devices including a needle, a welt guide arranged for guiding the welt adjacent the point of operation of the needle, a welt severing knife, a welt feeding finger, a slide on which the welt feeding finger is supported, spring means for maintaining said slide in a retracted position, means operative in stopping the machine for actuating the knife to sever the welt, and connections operative in stopping the machine for actuating the feeding finger to advance the severed end of the welt through the welt guide comprising a rotatable block, a pawl pivoted on the block for a limited movement between extended and contracted positions, spring means for maintaining the pawl in an extended position, and an abutment on the slide, said pawl and abutment being arranged for a rocking movement of the block in one direction to move the pawl past the abutment into operative relation thereto, and by rocking movement of the block in the opposite direction to engage said abutment to advance the feed finger and thereafter to release the same, and means operative in stopping the machine for imparting a rocking and return movement to said block.

51. A welt sewing machine having, in combination, stitch forming devices including a needle, a welt guide arranged for guiding the welt adjacent the point of operation of the needle, a welt cutting knife mounted to sever the welt in advance of and close to the sewing point, a welt feeding finger, a slide on which the feed finger is supported, spring means for maintaining the slide and feed finger in a retracted position, mechanism including a part having an actuating and return movement for actuating the knife to sever the welt, and connections operated from said part including a rotatable block connected to have imparted thereto a rocking and return movement by said part, a pawl pivotally supported for a limited movement on the block, and an abutment on the slide, said pawl and abutment being constructed and arranged so that the rocking movement of the block is effective to position the pawl in operating relationship to the abutment, and the return movement of the block is effective to cause the pawl to advance and thereafter to release the slide and feed finger.

ALFRED R. MORRILL.